US007459093B1

United States Patent
Fu

(10) Patent No.: US 7,459,093 B1
(45) Date of Patent: Dec. 2, 2008

(54) MEMS MIRROR MADE FROM TOPSIDE AND BACKSIDE ETCHING OF WAFER

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 107 days.

(21) Appl. No.: 11/456,562

(22) Filed: Jul. 10, 2006

Related U.S. Application Data

(60) Provisional application No. 60/792,049, filed on Apr. 13, 2006.

(51) Int. Cl.
*C23F 1/00* (2006.01)
*B44C 1/22* (2006.01)

(52) U.S. Cl. ................. 216/2; 216/41; 216/58; 216/83; 438/689; 438/706; 359/290; 359/291

(58) Field of Classification Search ............. 216/2, 216/41, 58, 83, 84; 438/689, 706; 359/290, 359/291
See application file for complete search history.

(56) References Cited

U.S. PATENT DOCUMENTS

| | | | | |
|---|---|---|---|---|
| 6,369,931 | B1 * | 4/2002 | Funk et al. | 359/223 |
| 6,872,319 | B2 * | 3/2005 | Tsai | 216/2 |
| 2002/0041455 | A1 * | 4/2002 | Sawada et al. | 359/879 |
| 2005/0054128 | A1 * | 3/2005 | Gasparyan et al. | 438/29 |

* cited by examiner

*Primary Examiner*—Shamim Ahmed
(74) *Attorney, Agent, or Firm*—Patent Law Group LLP; David C. Hsia

(57) ABSTRACT

A process for constructing a micro-electro-mechanical system (MEMS) device includes etching the topside of a silicon wafer to form a first support layer having asymmetric pads. The backside of the silicon wafer is etched to form a top layer with a mirror, beam structures extending from the mirror, and rotating comb teeth extending from the beam structures. Before or after the backside of the silicon wafer is etched, the topside of the silicon wafer is bonded to a glass wafer that forms a second support layer. Prior to bonding the silicon wafer to the glass wafer, the glass wafer may be etched to form a recess and/or a cavity that accommodates mobile elements in the silicon wafer. Due to the asymmetry of the pads in the first support layer below the rotating comb teeth in the top layer, oscillation can be initiated.

43 Claims, 37 Drawing Sheets

US 7,459,093 B1

MEMS MIRROR MADE FROM TOPSIDE AND BACKSIDE ETCHING OF WAFER

CROSS REFERENCE TO RELATED APPLICATIONS

This application claims the benefit of U.S. Provisional Application No. 60/792,049, filed Apr. 13, 2006, which is incorporated herein by reference. This application is related to U.S. application Ser. No. 11/367,104, filed Mar. 3, 2006, which is incorporated herein by reference.

FIELD OF INVENTION

This invention relates to micro-electro-mechanical system (MEMS) devices, and more particularly to MEMS scanning mirrors.

DESCRIPTION OF RELATED ART

U.S. Pat. No. 6,595,055 discloses a micromechanical component having a frame layer and an oscillating body suspended in an opening in the frame layer. At least one lateral surface of the oscillating body is arranged in relation to at least one inner lateral surface of the opening so that a capacitance formed between them is varied by an oscillation of the oscillating body. This allows the oscillating body to be oscillated by periodically varying a voltage applied between the frame layer and the oscillating body.

The frame layer is mounted on a supporting wafer. The supporting wafer is implemented so that, in comparison to the influence of the voltage applied between the frame layer and the oscillating body, the supporting wafer has a negligible physical influence on the oscillation of the oscillating body.

SUMMARY

In one embodiment of the invention, a method for constructing a micro-electro-mechanical system (MEMS) device includes etching the topside of a silicon wafer to approximately half of its thickness to form a first support layer. The first support layer includes asymmetric pads for supporting a device layer formed by etching the backside of the silicon wafer. A glass wafer may be etched to form a second support layer with a recess and/or a cavity that accommodates for mobile elements in the silicon wafer. The silicon wafer is then turned upside down and bonded with the glass wafer. The backside of the silicon wafer, which is the topside of the bonded structure, is etched to form the device layer with a mirror, beam structures extending from the mirror, and rotating comb teeth extending from the beam structures. Due to the asymmetry of the pads in the first support layer below the rotating comb teeth in the device layer, oscillation can be initiated. Thus, the support layer can assert a physical influence on the mirror.

In another embodiment of the invention, a method for constructing a MEMS device includes etching the topside of a silicon wafer to approximately half of its thickness to form a first support layer. The first support layer includes a perimeter pad that holds various elements together until the silicon wafer is bonded to a glass wafer. The perimeter pad includes two asymmetric sections. The backside of the silicon wafer is etched to form the device layer with a mirror, beam structures extending from the mirror, and rotating comb teeth extending from the beam structures. The topside of the silicon wafer is bonded to the glass wafer. Prior to bonding the silicon wafer to the glass wafer, the glass wafer may be etched to form a second support layer with a cavity in a recess that accommodates for various mobile elements from above. The perimeter pad is etched to release and electrically insulate various elements. Due to the asymmetry portions of the perimeter pad in the first support layer below the rotating comb teeth in the device layer, oscillation can be initiated. Thus, the support layer can assert a physical influence on the mirror.

BRIEF DESCRIPTION OF THE DRAWINGS

Use of the same reference numbers in different figures indicates similar or identical elements.

DETAILED DESCRIPTION OF THE INVENTION

In a typical conventional process for forming a MEMS device, the topside of a first wafer is etched to form part of the device, the backside of a second wafer is bonded on the topside of the first wafer, and the topside of the second wafer is etched to complete the device. The etching of the first wafer is aligned to fiduciary marks on the first wafer. The etching of the second wafer is also aligned to the fiduciary marks on the first wafer. Thus, there is no direct alignment between features on the first and the second wafers. Typically the features on the first and the second wafers have similar dimensions. Thus, both wafers are etched at the same rate to form those features.

In embodiments of the invention, a single silicon wafer is etched on both sides to form a device. This saves cost as only one wafer is used instead of two. This also improves yield since the process does not require fusion bonding between silicon wafers, which typically has a low yield.

In embodiments of the invention, a first surface of the silicon wafer is etched and then bonded to a surface of a glass wafer. A second surface of the silicon wafer is then etched by aligning features on the second surface with features on the first surface of the silicon wafer since the features on the first surface are visible through the glass wafer. This improves alignment between the features on both surfaces since they are directly aligned with each other.

In embodiments of the invention, the features on the glass wafer and on the first surface of the silicon wafer have larger dimensions than the features on the second surface of the silicon wafer. This allows different etching methods and etching rates to be used to speed up the manufacturing process.

Although certain dimensions are provided in the present disclosure, these dimensions may be varied to suit various mirror rotation angles, alignment tolerances, wafer thicknesses, and etching depths.

Figure 1A:
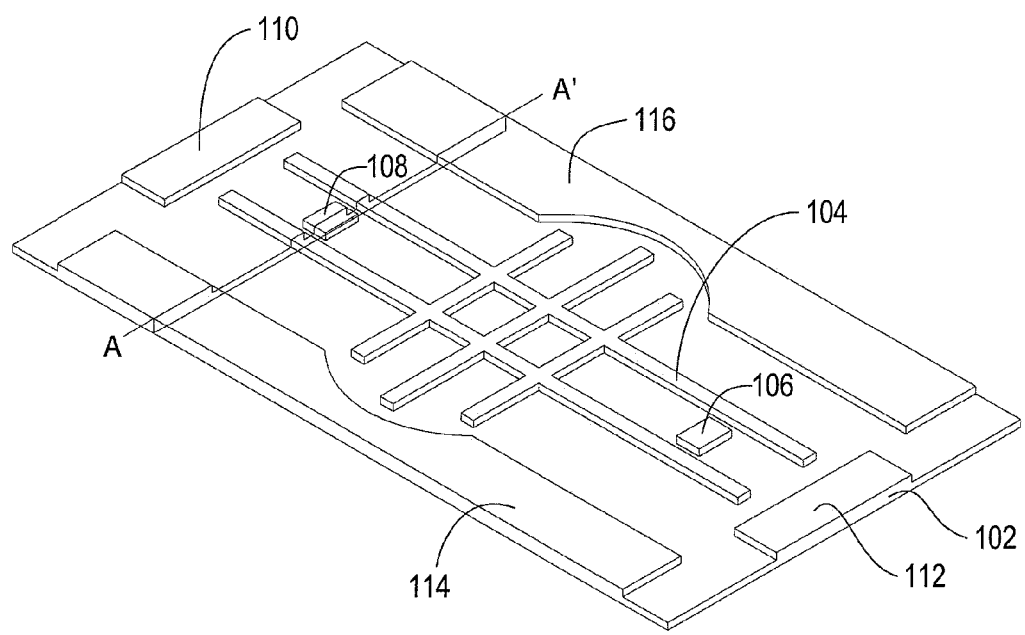
FIGS. 1A, 1B, 2A, 2B, 3A, 3B, 4A, 4B, and 4C illustrate a process for constructing a MEMS device with in-plane comb teeth from a silicon wafer and a glass wafer in one embodiment of the invention.
Figure 1B:
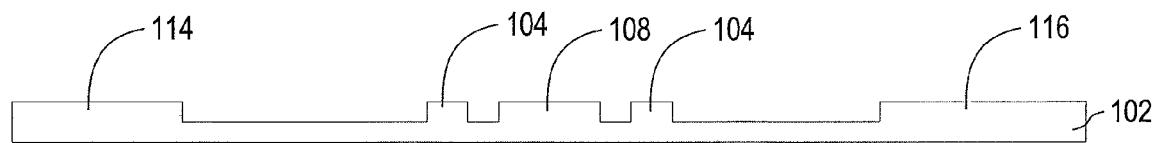
Figure 2A:
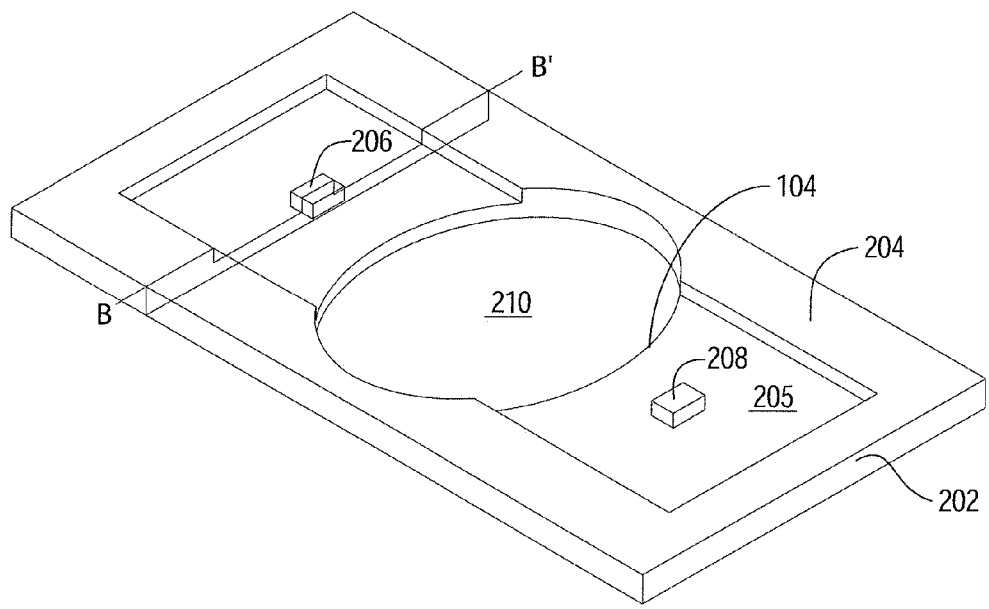

FIGS. 1A, 1B, 2A, 2B, 3A, 3B, 4A, 4B, and 4C illustrate a process for constructing a MEMS device 400 (FIG. 4A) with in-plane comb teeth in one embodiment of the invention. In MEMS device 400, the topside of a silicon wafer 102 (FIG. 1A) is etched to form a first support layer. Silicon wafer 102 is then turned upside down and bonded with a glass wafer 202 (FIG. 2A). Glass wafer 202 forms a second support layer that is transparent and nonconductive. The backside of silicon wafer 102, now the topside of the bonded structure, is then etched to form a device layer with a rotatable mirror and comb teeth actuators.

In FIG. 1A, the topside of silicon wafer 102 is etched to approximately half of its thickness to define the first support layer. After the etching, a thermal oxide layer is optionally formed over the topside of silicon wafer 102. The thermal oxide layer may act as an etch stop for a subsequent etching of the backside of silicon wafer 102. Silicon wafer 102 has a single silicon layer with an exemplary thickness of approximately 200 μm.

The first support layer includes spring pads 106, 108, 110, and 112, and asymmetric support pads 114 and 116. The first support layer may include an optional stiffening structure 104 with crossbeams along the length of the device intersecting crossbeams along the width of the device. Stiffening structure 104 adds rigidity to a mirror and beam structures extending from the mirror to be formed on the backside of silicon wafer 102. Spring pads 106, 108, 110, and 112 coincide with spring pads to be formed on the backside of silicon wafer 102. Support pads 114 and 116 coincide with stationary pads to be formed on the backside of silicon wafer 102.

FIG. 1B illustrates a cross-section of silicon wafer 102 along line AA'. Note that the width of support pad 114 is less than the width of support pad 116.

By design, features with larger (i.e., rougher) dimensions are placed on the topside of silicon wafer 102 while features with smaller (i.e., finer) dimensions are placed on the backside of silicon wafer 102. Thus, the features on the topside of silicon wafer 102 can be etched at a faster rate than the features on the backside of silicon wafer 102 to speed up the manufacturing process. In one embodiment, the dimension that controls the etch rate of the topside of silicon wafer 102 is the distance between spring pad 106 or 108 and an adjacent crossbeam from stiffening structure 104, which is about 100 μm. In one embodiment, the features on the topside of silicon wafer 102 are etched more than 2 times faster than the features on the backside of silicon wafer 102.

In FIG. 2A, the topside of glass wafer 202 is processed to define the second support layer on top of which the first support layer is to be bonded. The second support layer includes a generally rectangular recess 205 that defines a support pad 204 around the perimeter of glass wafer 202. Additional support pads 206 and 208 are formed in recess 205. Support pads 206 and 208 are made generally larger than corresponding spring pads 106 and 108 in silicon wafer 102 so that they can be easily aligned. A mirror cavity 210 is formed through glass wafer 202 near the center of recess 205. Less refined processes, including sandblasting, laser cutting, wet etching, and dry etching can be used to process glass wafer 202 since it has rough features compared to the features on silicon wafer 102.

Figure 2B:
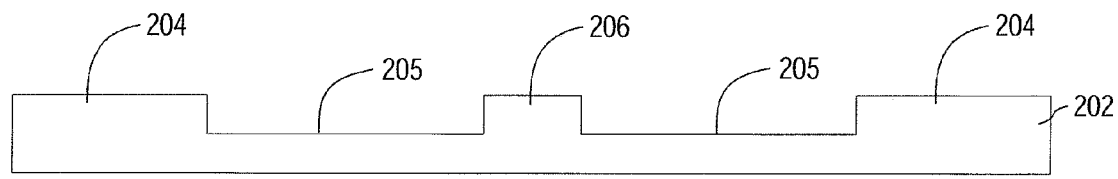

FIG. 2B illustrates a cross-section of glass wafer 202 along line BB'.

Recess 205 provides the separation between the topside of glass wafer 202 from stiffening structure 104 on the topside of silicon wafer 102. This allows the mirror to be formed on the backside of silicon wafer 102 to rotate freely. If stiffening structure 104 is absent, then recess 205 may also be absent. Mirror cavity 210 accommodates large rotation of the mirror in silicon wafer 102. If stiffening structure 104 is absent and the oscillating body has small rotation, then mirror cavity 210 may also be absent.

Figure 3A:
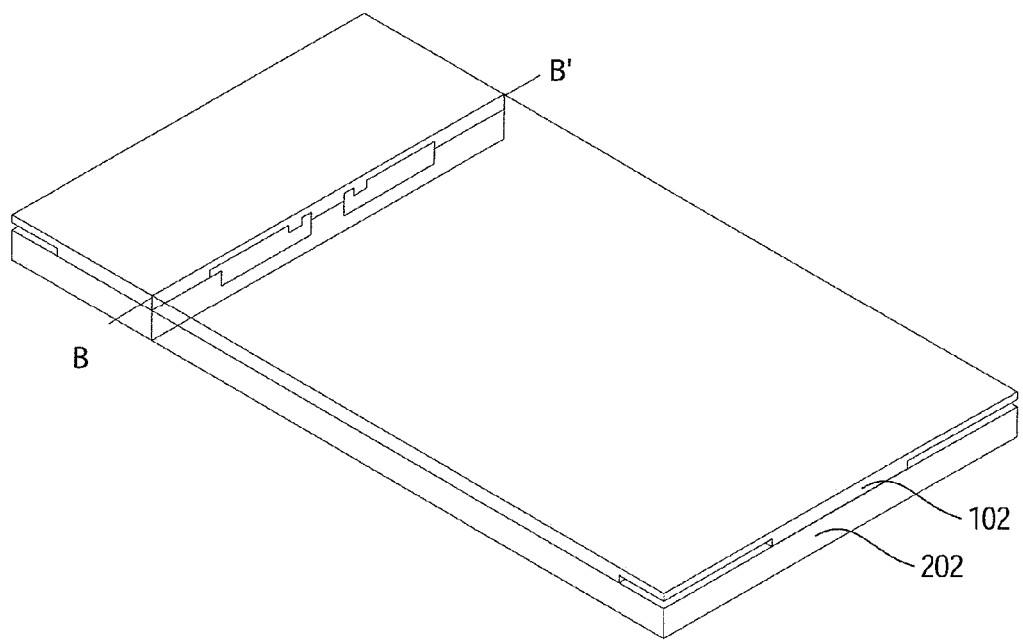

In FIG. 3A, silicon wafer 102 is turned upside down and the topside of silicon wafer 102 is bonded to the topside of glass wafer 202. Specifically, pads 110, 112, 114 and 116 of silicon wafer 102 are bonded to pad 204 of glass wafer 202. Furthermore, pads 106 and 108 of silicon wafer 102 are bonded to pads 206 and 208 of glass wafer 202.

Figure 3B:
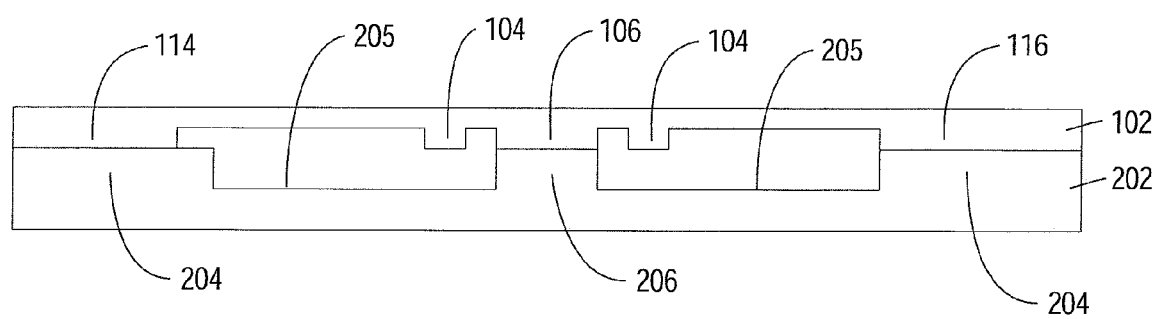

FIG. 3B illustrates a cross-section of the bonded structure along line BB'.

Figure 4A:
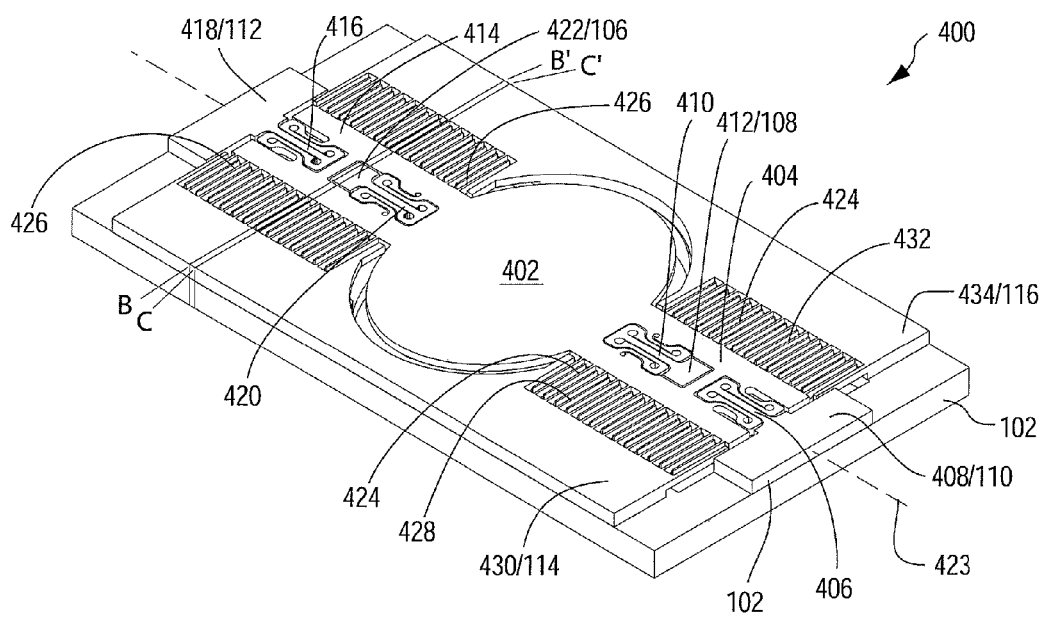

In FIG. 4A, the backside of silicon wafer 102 (the topside of the bonded structure) is etched to approximately half of its thickness (or down to the optional etch stop) to define a device layer. The features on the backside of silicon wafer 102 are aligned directly with the features on the topside of silicon wafer 102. The etching system aligns the features on the backside of silicon wafer 102 by looking through glass substrate 202 for the features on the topside of silicon wafer 102.

Instead of being a glass wafer, wafer 202 may be an opaque and nonconductive wafer, such as a ceramic wafer. When wafer 202 is opaque, alignment is accomplished through holes (e.g., mirror cavity 210) in wafer 202 that allows features on the topside on silicon wafer 102 to be visible so that features on the backside of silicon wafer 102 can be directly aligned with features on the topside of silicon wafer 102.

The device layer includes a mirror 402 having a first half connected to a proximal end of a beam structure 404. A distal end of beam structure 404 extends away from mirror 402 and is connected by a spring 406 to a spring pad 408 (located above spring pad 110). Beam structure 404 is further connected by a spring 410 to a spring pad 412 (located above spring pad 108). In one embodiment, spring 410 and spring pad 412 are located in an opening in beam structure 404.

Each spring can be a straight-shaped spring, a U-shaped spring, or a serpentine-shaped spring. In one embodiment, each spring has two serpentine sections and a straight section. Each serpentine section has one end joined to beam structure 404 and another end joined at the middle with the straight section, which in turn is joined a respective spring pad.

Mirror 402 has a second half connected to a proximal end of a beam structure 414. A distal end of beam structure 414 extends away from mirror 402 and is connected by spring 416 to a spring pad 418 (located above spring pad 112). Beam structure 414 is further connected by a spring 420 to a spring pad 422 (located above spring pad 106). In one embodiment, spring 420 and spring pad 422 are located in an opening in beam structure 414. Springs 416 and 420 may have the same construction as springs 406 and 410.

Springs 406, 410, 416, and 420 are arranged so their rotating axes are aligned along a rotational axis 423 of mirror 402. This allows mirror 402 to rotate about rotational axis 423.

Rotating comb teeth 424 extend from both sides of beam structure 404 while rotating comb teeth 426 extend from both side of beam structure 414. On one side of rotational axis 423, rotating comb teeth 424 and 426 are interdigitated in-plane with stationary comb teeth 428 extending from a stationary pad 430 (located above support pad 114) facing a first side of beam structures 404 and 414. On the other side of rotational axis 423, rotating comb teeth 424 and 426 are interdigitated in-plane with stationary comb teeth 432 extending from a stationary pad 434 (located above support pad 116) facing a second side of beam structures 404 and 414. In one embodiment, the dimension that controls the etch rate of the backside of silicon wafer 102 is the gap between adjacent comb teeth, which is about 5 µm.

The rotating and the stationary comb teeth form an actuator that rotates mirror 402 about rotational axis 423 when a voltage difference is applied between the rotating and the stationary comb teeth. Typically a varying voltage difference is applied between the rotating and the stationary comb teeth to oscillate mirror 402.

If present, exposed portions of the optional insulator are removed after etching to free the moving elements so they can rotate about rotational axis 423. The structure release/insulator removal can be performed by wet hydrofluoric (HF) release or HF vapor release.

Figure 4B:
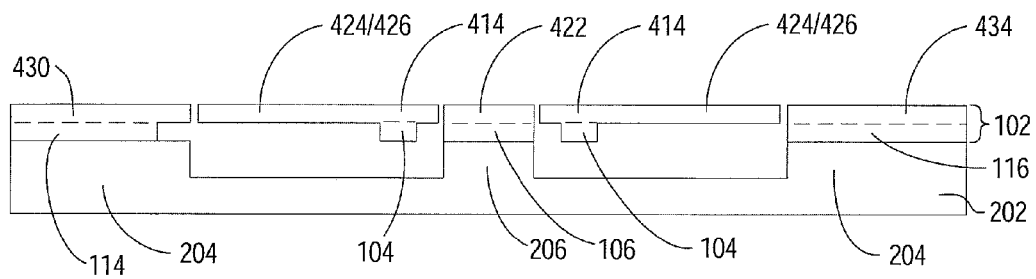
Figure 4C:
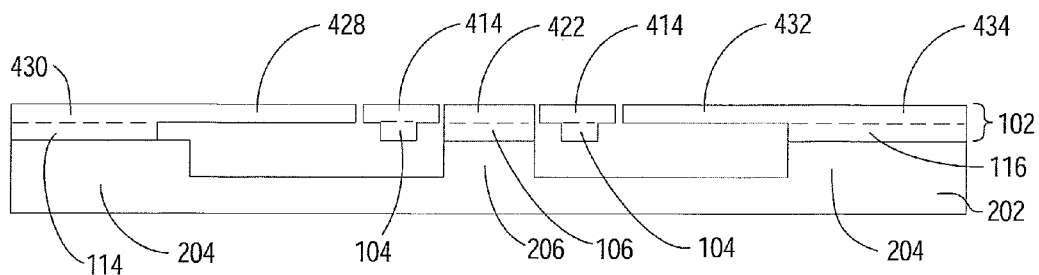

FIGS. 4B and 4C illustrate cross-sections of the bonded structure along lines BB' and CC'. Phantom lines in FIGS. 4B and 4C illustrate the demarcation between the device layer and the first support layer below the device layer. Note that rotating comb teeth 424 and 426 correspond to the lateral surface of the oscillating body in U.S. Pat. No. 6,595,055, stationary comb teeth 428 and 432 correspond to inner lateral surface of an opening in a frame layer in U.S. Pat. No. 6,595,055, and support pads 114 and 116 correspond to the supporting wafer for holding the frame layer in U.S. Pat. No. 6,595,055.

Figure 5:
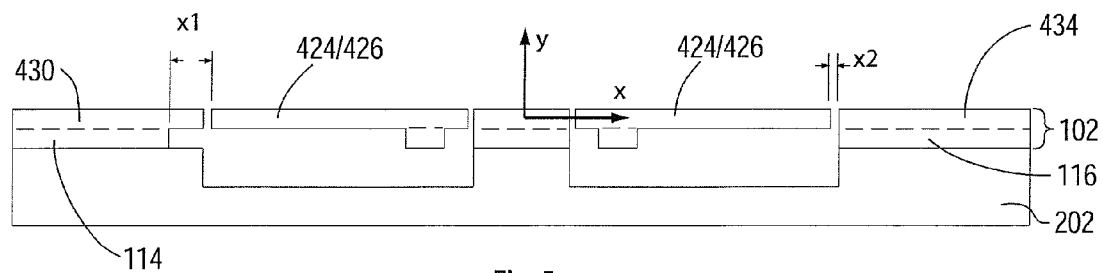
FIG. 5 illustrates an asymmetry in the MEMS device of FIG. 4A in one embodiment of the invention.

FIG. 5 further illustrates the asymmetry in the widths of support pads 114 and 116. Support pads 114 and 116 are electrically connected to stationary comb teeth 428 and 432 through stationary pads 430 and 434. As can be seen, there is a distance of x1 between support pad 114 and rotating comb teeth 424/426 while there is a distance of x2 between support pad 116 and rotating comb teeth 424/426. This asymmetry of support pads 114 and 116 creates an initial deflection of mirror 402 from the resulting asymmetric electrostatic field with the top layer. The initial deflection can be used to start the oscillation of mirror 402. Thus, unlike U.S. Pat. No. 6,595,055, the support layer asserts a physical influence on the oscillating body.

FIGS. 6A, 6B, 7A, 7B, 7C, 8A, 8B, 8C, 9A, 9B, and 9C illustrate a process for constructing a MEMS device 900 (FIG. 9A) with vertical comb teeth in one embodiment of the invention. In MEMS device 900, the topside of a silicon wafer 702 (FIG. 7A) is etched to form a first support layer with stationary comb teeth. Silicon wafer 702 is then turned upside down and bonded with glass wafer 202 (FIG. 6A), which forms a second support layer. The backside of silicon wafer 702, now the topside of the bonded structure, is then etched to form a device layer with a rotatable mirror and rotating comb teeth.

Figure 6A:
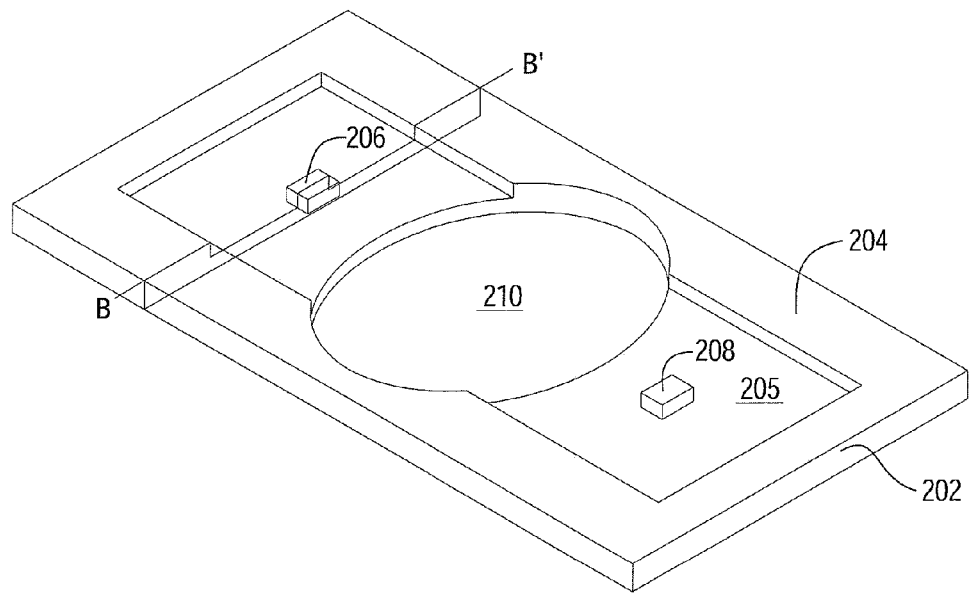
FIGS. 6A, 6B, 7A, 7B, 7C, 8A, 8B, 8C, 9A, 9B, and 9C illustrate a process for constructing a MEMS device with vertical comb teeth from a silicon wafer and a glass wafer in one embodiment of the invention.
Figure 6B:
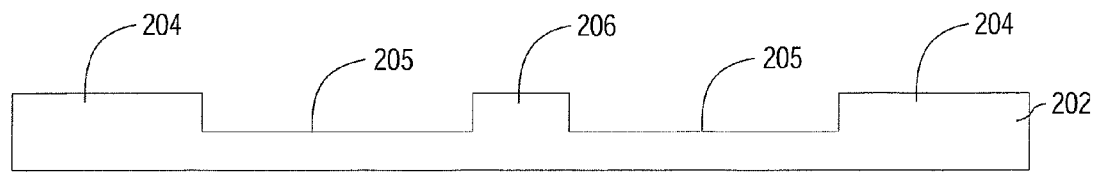

In FIGS. 6A and 6B, the topside of glass wafer 202 is processed to define the second support layer on top of which the first support layer is to be bonded. This is the same as the process shown in FIGS. 2A and 2B.

Figure 7A:
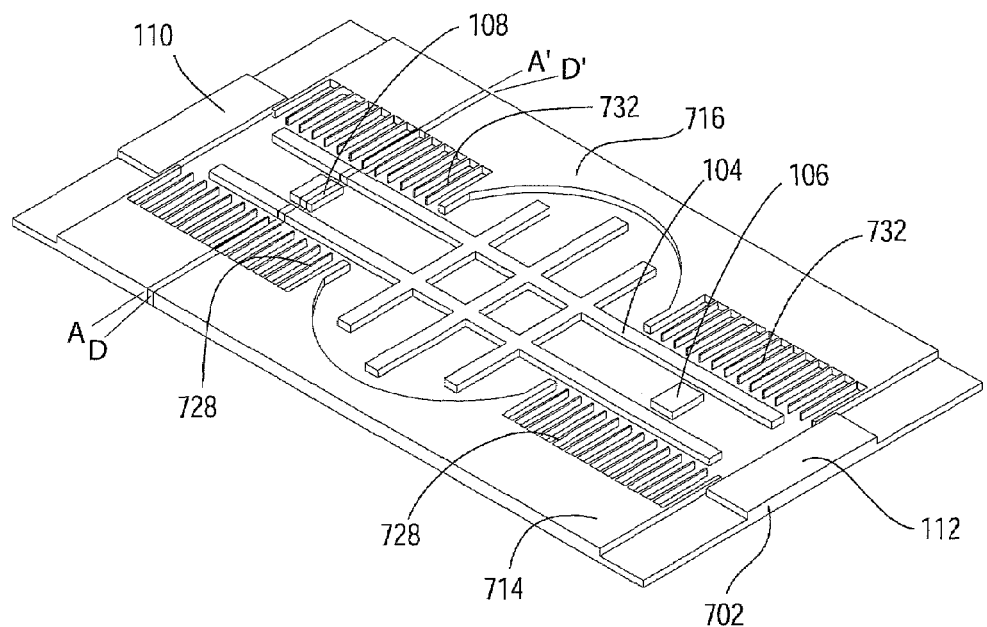

In FIG. 7A, the topside of silicon wafer 702 is etched to approximately half of its thickness to define the first support layer. After the etching, a thermal oxide layer is optionally formed over the topside of silicon wafer 702. The thermal oxide layer may act as an etch stop for a subsequent etching of the backside of silicon wafer 702. Silicon wafer 702 has a single silicon layer with an exemplary thickness of approximately 200 µm.

The first support layer includes optional stiffening structure 104 and spring pads 106, 108, 110, and 112 as described above in reference to FIG. 1A. Furthermore, the first support layer includes stationary comb teeth 728 extending from a support pad 714 located on one side of rotational axis 423, and stationary comb teeth 732 extending from a support pad 716 located on the other side of rotational axis 423.

Figure 7B:
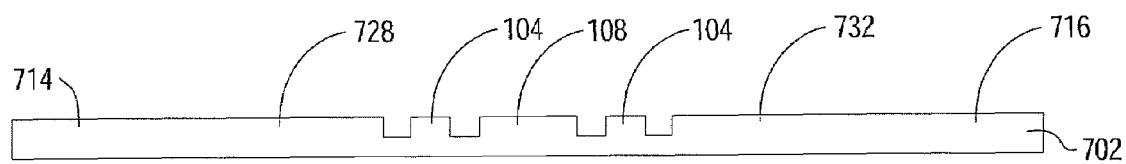
Figure 7C:
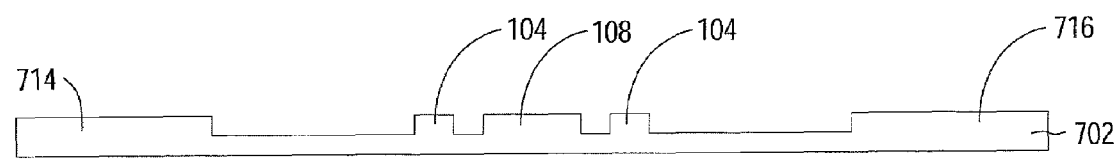

FIGS. 7B and 7C illustrate cross-sections of silicon wafer 702 along lines AA' and DD'.

Figure 8A:
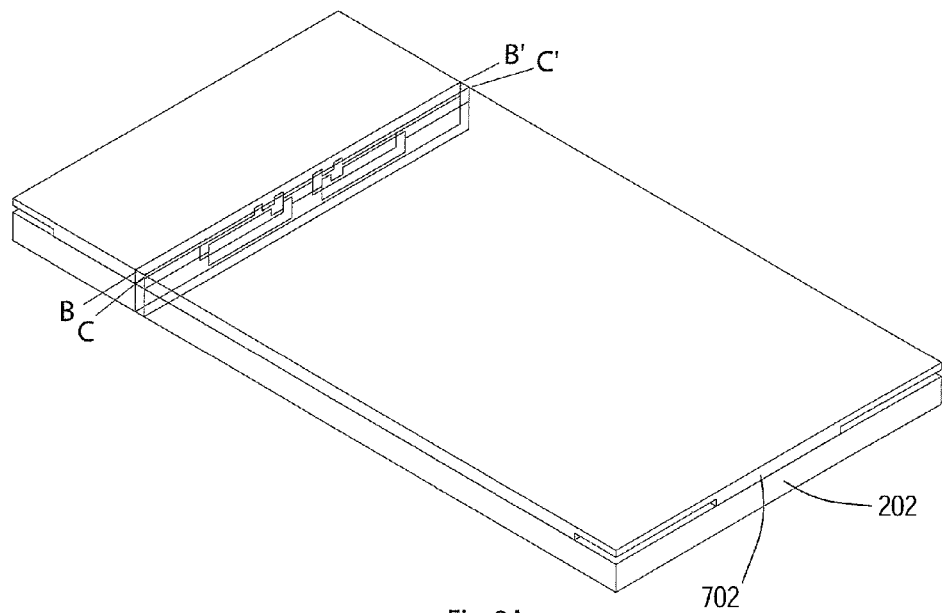

In FIG. 8A, silicon wafer 702 is turned upside down and the topside of silicon wafer 702 is bonded to the topside of glass wafer 202. Specifically, pads 110, 112, 714 and 716 of silicon wafer 702 are bonded to pad 204 of glass wafer 202. Furthermore, pads 106 and 108 of silicon wafer 702 are bonded to pads 206 and 208 of glass wafer 202.

Figure 8B:
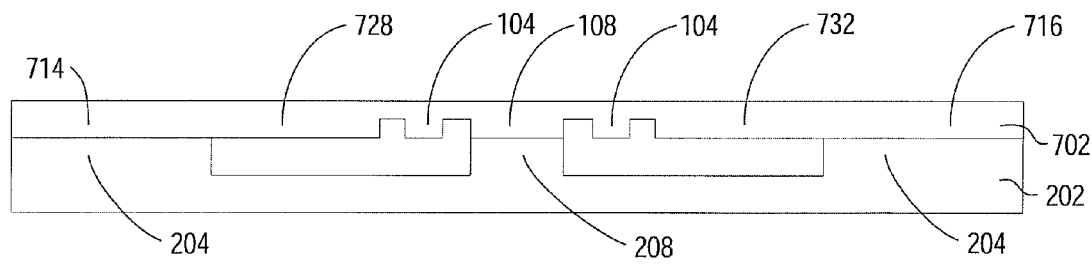
Figure 8C:
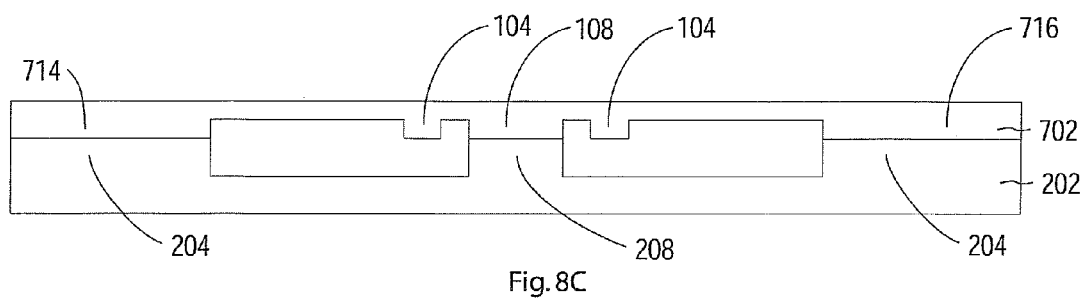

FIGS. 8B and 8C illustrate cross-sections of the bonded structure along lines BB' and CC'.

Figure 9A:
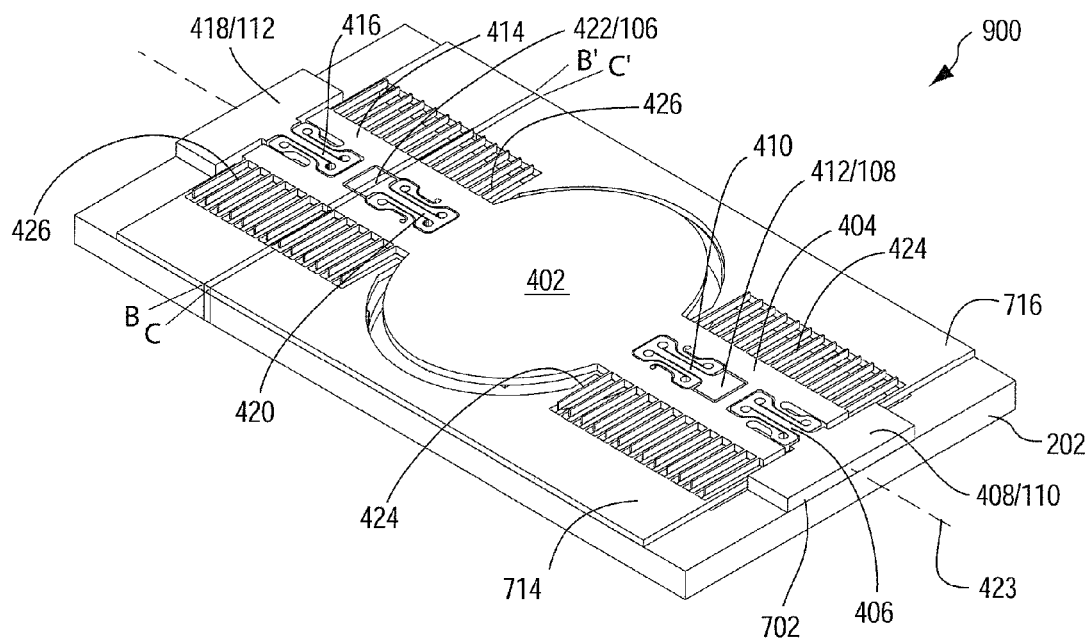

In FIG. 9A, the backside of silicon wafer 702 (the topside of the bonded structure) is etched to approximately half of its thickness (or down to the optional etch stop) to define mirror 402, beam structures 404 and 414, springs 406, 410, 416, and 420, spring pads 408, 412, 418, and 422, rotating comb teeth 424 extending from beam structure 404, and rotating comb teeth 426 extending from beam structure 414 as described above in reference to FIG. 4A. If present, portions of the optional insulator are removed after the etching to free the moving elements so they can rotate about rotational axis 423.

Note that rotating comb teeth 424 and 426 are interdigitated out-of-plane with stationary comb teeth 728 and 732. Further note that stationary comb teeth 728 extending from pad 714 are electrically insulated from stationary comb teeth 732 extending from pad 716 so that different voltages can be applied to the two sets of stationary comb teeth.

The rotating and the stationary comb teeth form an actuator that rotates mirror 402 about axis 423 or translates mirror 402 downward when a voltage difference is applied between the rotating and the stationary comb teeth. Typically a varying voltage difference is applied between the rotating and the stationary comb teeth to oscillate mirror 402. Alternatively, a constant voltage difference is applied between the rotating and the stationary comb teeth to rotate or translate mirror 402 to a fixed position.

Figure 9B:
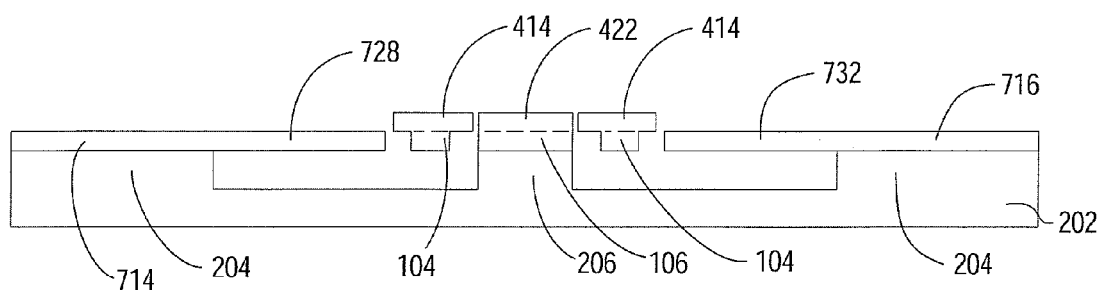
Figure 9C:
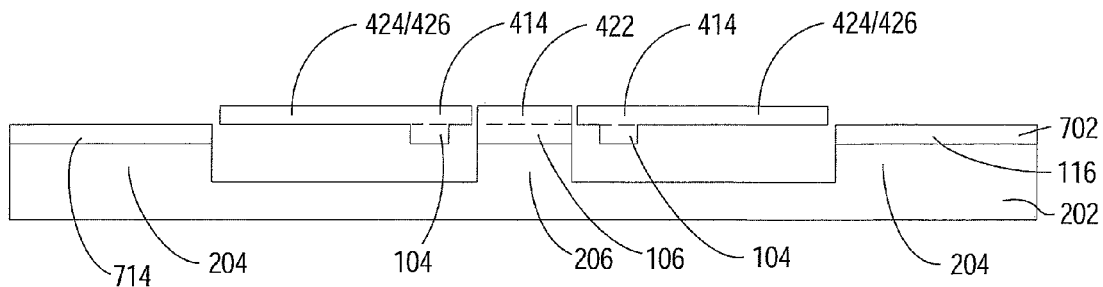

FIGS. 9B and 9C illustrate cross-sections of the bonded structure along lines BB' and CC'. Note that rotating comb teeth 424 and 426 correspond to the lateral surface of the oscillating body in U.S. Pat. No. 6,595,055, and stationary comb teeth 728 and 732 extending from support pads 714 and 716 correspond to the supporting wafer in U.S. Pat. No. 6,595,055. Unlike U.S. Pat. No. 6,595,055, the supporting wafer (including stationary comb teeth 728 and 732) asserts a physical influence on the oscillation of mirror 402.

FIGS. 10A, 10B, 11, 12A, 12B, 13A, 13B, and 13C illustrate a process for constructing a MEMS device 1300 (FIG. 13A) with in-plane comb teeth in one embodiment of the invention. MEMS device 1300 is similar to MEMS device 400 (FIG. 4A). However, the process for making MEMS device 1300 is simplified to allow greater tolerance for variations in manufacturing.

Figure 10A:
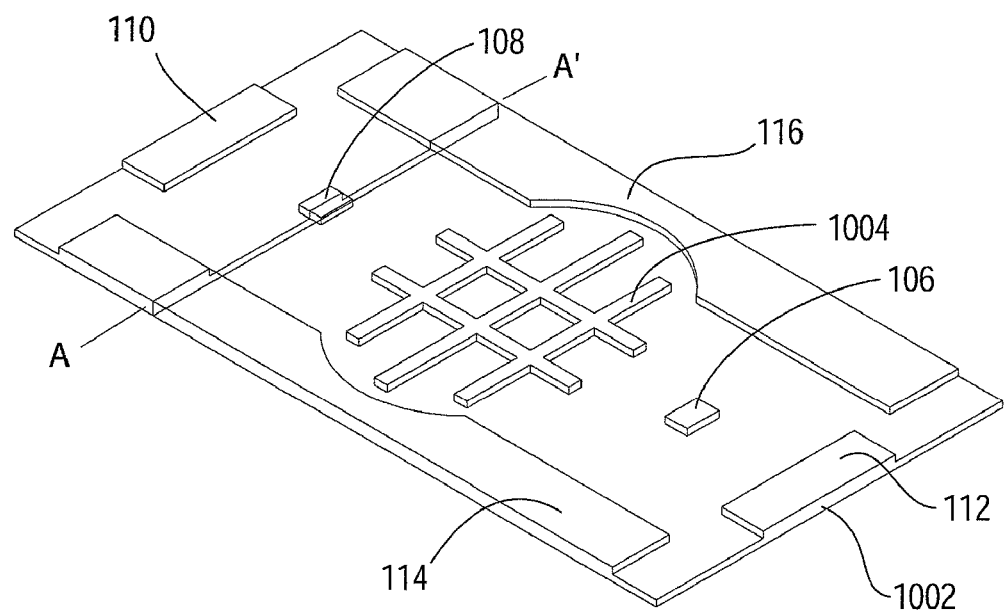
FIGS. 10A, 10B, 11, 12A, 12B, 13A, 13B, and 13C illustrate a simplified process for constructing a MEMS device with in-plane comb teeth from a silicon wafer and a glass wafer in one embodiment of the invention.

In FIG. 10A, the topside of a silicon wafer 1002 is etched to approximately half of its thickness to define a first support layer. After the etching, a thermal oxide layer is optionally formed over the topside of silicon wafer 1002. The thermal oxide layer may act as an etch stop for a subsequent etching of the backside of silicon wafer 1002. Silicon wafer 1002 has a single silicon layer with an exemplary thickness of approximately 200 μm.

The first support layer includes spring pads 106, 108, 110, and 112, and support pads 114 and 116 as described above in reference to FIG. 1A. Note that stiffening structure 104 is replaced by a stiffening structure 1004 with crossbeams underneath a mirror to be formed on the backside of silicon wafer 1002.

Figure 10B:
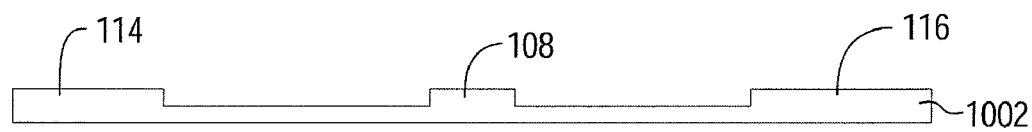

FIG. 10B illustrates a cross-section of silicon wafer 1002 along line AA'. Note that the width of pad 114 is less than the width of pad 116.

By design, features with larger (i.e., rougher) dimensions are placed on the topside of silicon wafer 1002 while features with smaller (i.e., finer) dimensions are placed on the backside of silicon wafer 1002. Thus, the features on the topside of silicon wafer 1002 can be etched at a faster rate than the features on the backside of silicon wafer 1002 to speed up the manufacturing process. In one embodiment, the features on the topside of silicon wafer 1002 are etched more than 2 times faster than the features on the backside of silicon wafer 1002. In one embodiment, the dimension that controls the etch rate of the topside of silicon wafer 1002 is the distance between the cross members of the stiffening structure 1004, which is about 30 μm.

Figure 11:
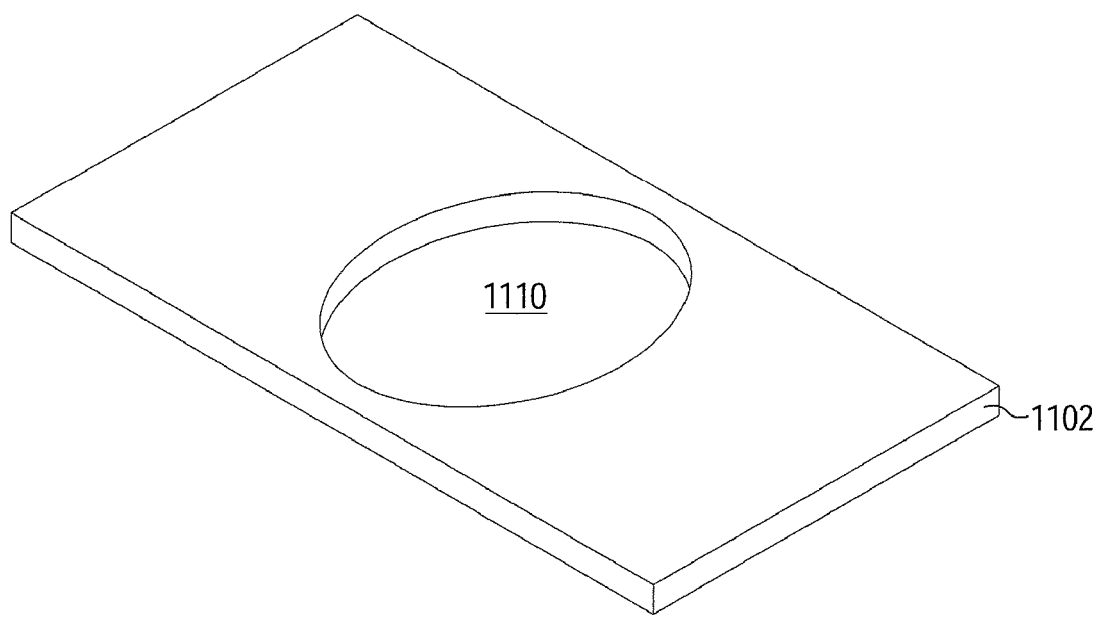

In FIG. 11, the topside of a glass wafer 1102 is processed to define a mirror cavity 1110 near the center of glass wafer 1102. Mirror cavity 1110 provides the separation between the topside of glass wafer 1002 from stiffening structure 1004 on the topside of silicon wafer 1002 and allows for large rotation of the mirror to be formed on the backside of silicon wafer 1002. If stiffening structure 1004 is absent and the mirror has small rotation, then mirror cavity 1110 may also be absent.

Less refined processes, including sandblasting, laser cutting, wet etching, and dry etching may be used to process glass wafer 1102 since the features on glass wafer 1102 do not need to be as precise as the features on silicon wafer 102. Note that glass wafer 1102 does not have any specific support pads on top of which pads 106, 108, 110, 112, 114, and 116 are bonded. This allows silicon wafer 1002 and glass wafer 1102 to be aligned with greater tolerance as long as the mirror to be formed on the backside of silicon wafer 1002 is located over mirror cavity 1110.

Figure 12A:
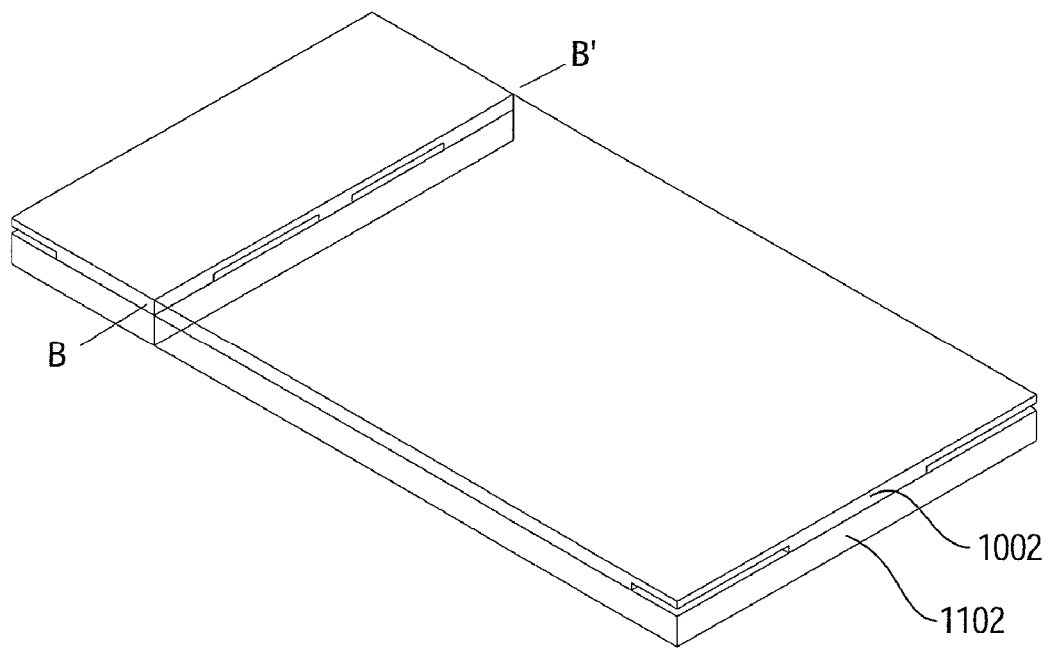
Figure 12B:
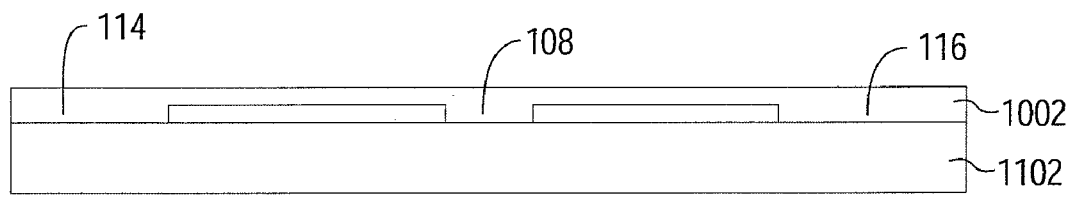

In FIG. 12A, silicon wafer 1002 is turned upside down and the topside of silicon wafer 1002 is bonded to the topside of glass wafer 11102. FIG. 12B illustrates a cross-section of the bonded structure along line BB'.

Figure 13A:
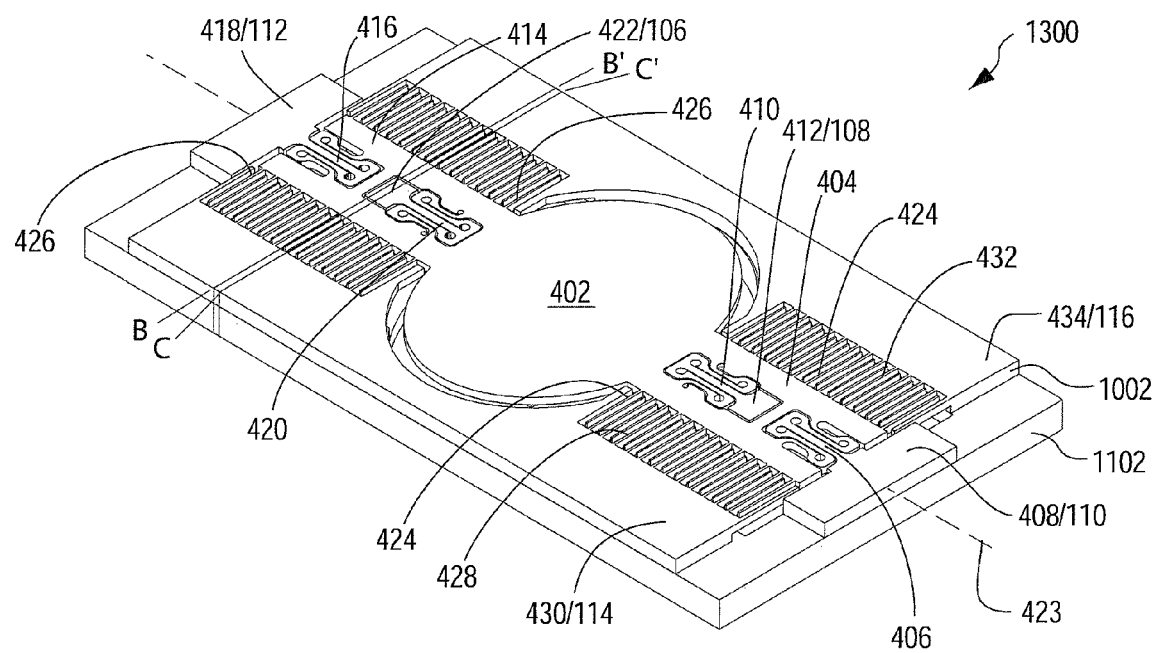

In FIG. 13A, the backside of silicon wafer 1002 (the topside of the bonded structure) is etched to approximately half of its thickness (or down to the optional etch stop) to define mirror 402, beam structures 404 and 414, springs 406, 410, 416, and 420, rotating comb teeth 424 extending from beam structure 404, rotating comb teeth 426 extending from beam structure 414, spring pads 408, 412, 418, 422, stationary comb teeth 428 extending from stationary pad 430, and stationary comb teeth 432 extending from stationary pad 434 as described above in reference to FIG. 4A. If present, portions of the optional insulator are removed after etching to free the moving elements so they can rotate about rotational axis 423.

Figure 13B:
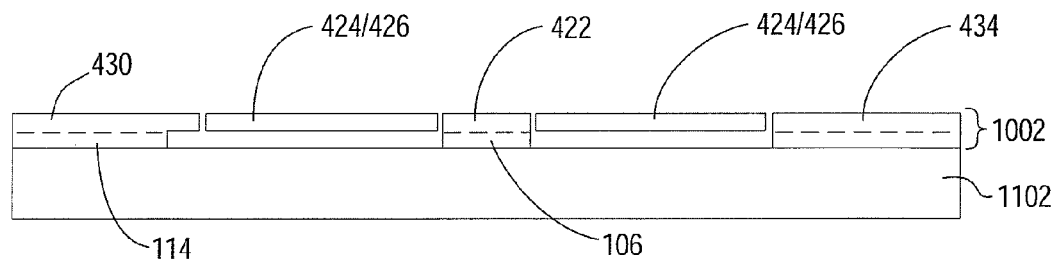
Figure 13C:
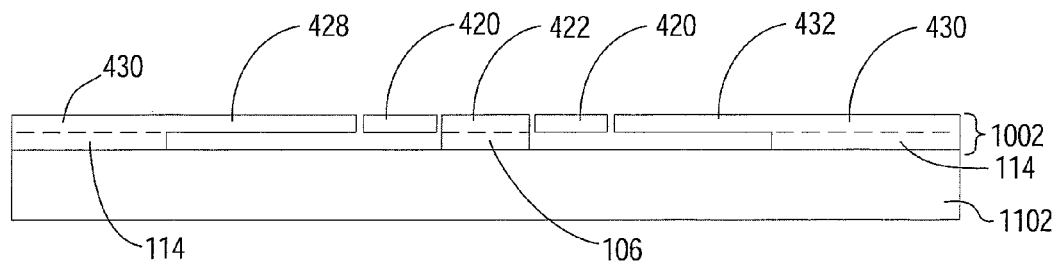

FIGS. 13B and 13C illustrate cross-sections of the bonded structure along lines BB' and CC'. Phantom lines in FIGS. 13B and 13C illustrate the demarcation between the device layer (including mirror, springs, and rotating and stationary comb teeth) and the first support layer below the device layer. Note that rotating comb teeth 424 and 426 correspond to the lateral surface of the oscillating body in U.S. Pat. No. 6,595,055, stationary comb teeth 428 and 432 correspond to inner lateral surface of the opening in a frame layer in U.S. Pat. No. 6,595,055, and support pads 114 and 116 correspond to the supporting wafer for holding the frame layer in U.S. Pat. No. 6,595,055. Similarly described above, the asymmetry of support pads 114 and pad 116 in the support layer creates an initial deflection of mirror 402 and can be used to start the oscillation of mirror 402. Thus, the support layer asserts a physical influence on the oscillating body.

FIGS. 14A, 14B, 14C, 15, 16A, 16B, 16C, 17A, 17B, and 17C illustrate a process for constructing a MEMS device 1700 (FIG. 17A) with vertical comb teeth in one embodiment of the invention. MEMS device 1700 is similar to MEMS device 900 (FIG. 9A). However, the process for making MEMS device 1700 is simplified to allow greater tolerance for variations in manufacturing.

Figure 14A:
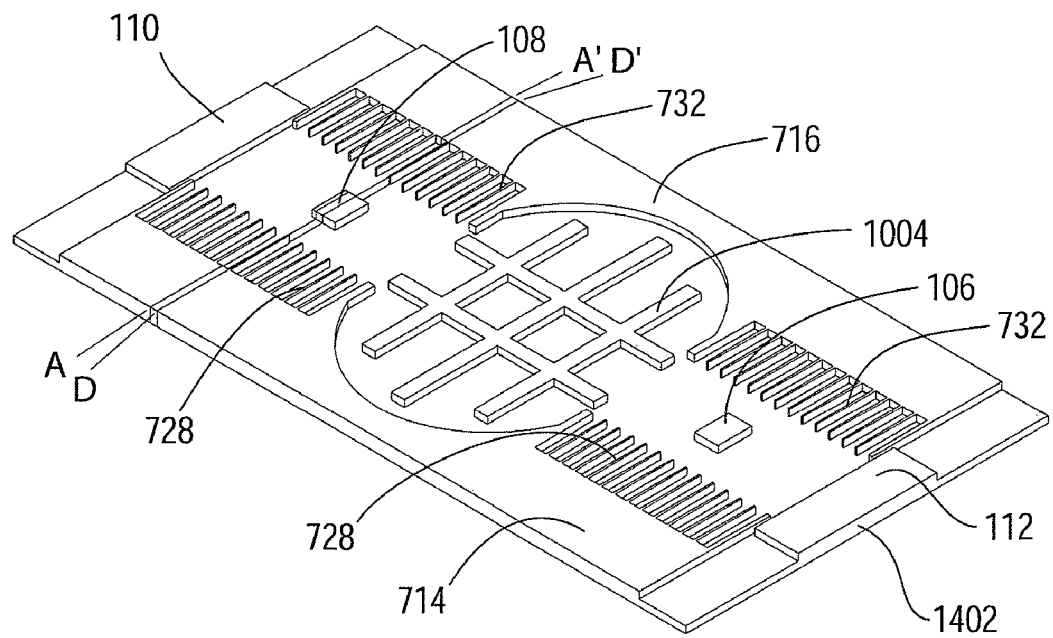
FIGS. 14A, 14B, 14C, 15, 16A, 16B, 16C, 17A, 17B, and 17C illustrate a simplified process for constructing a MEMS device with vertical comb teeth from a silicon wafer and a glass wafer in one embodiment of the invention.

In FIG. 14A, the topside of a silicon wafer 1402 is etched to approximately half of its thickness to define a first support layer. After the etching, a thermal oxide layer is optionally formed over the topside of silicon wafer 1402. The thermal oxide layer may act as an etch stop for a subsequent etching of the backside of silicon wafer 1402. Silicon wafer 1402 has a single silicon layer with an exemplary thickness of approximately 200 μm.

The first support layer includes spring pads 106, 108, 110, and 112 as described above in reference to FIG. 1A, stationary comb teeth 728 extending from support pad 714 and stationary comb teeth 732 extending from support pad 716 as described above in reference to FIG. 7A, and stiffening structure 1004 as described above in reference to FIG. 10A.

Figure 14B:
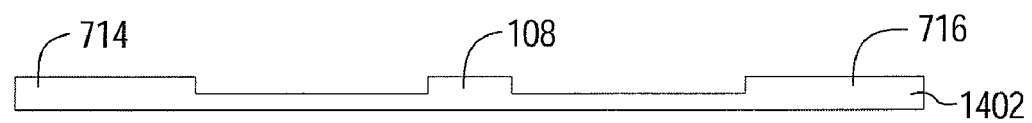
Figure 14C:
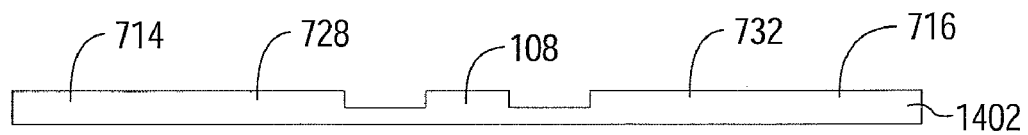

FIGS. 14B and 14C illustrate cross-sections of silicon wafer 1402 along lines AA' and DD'.

Figure 15:
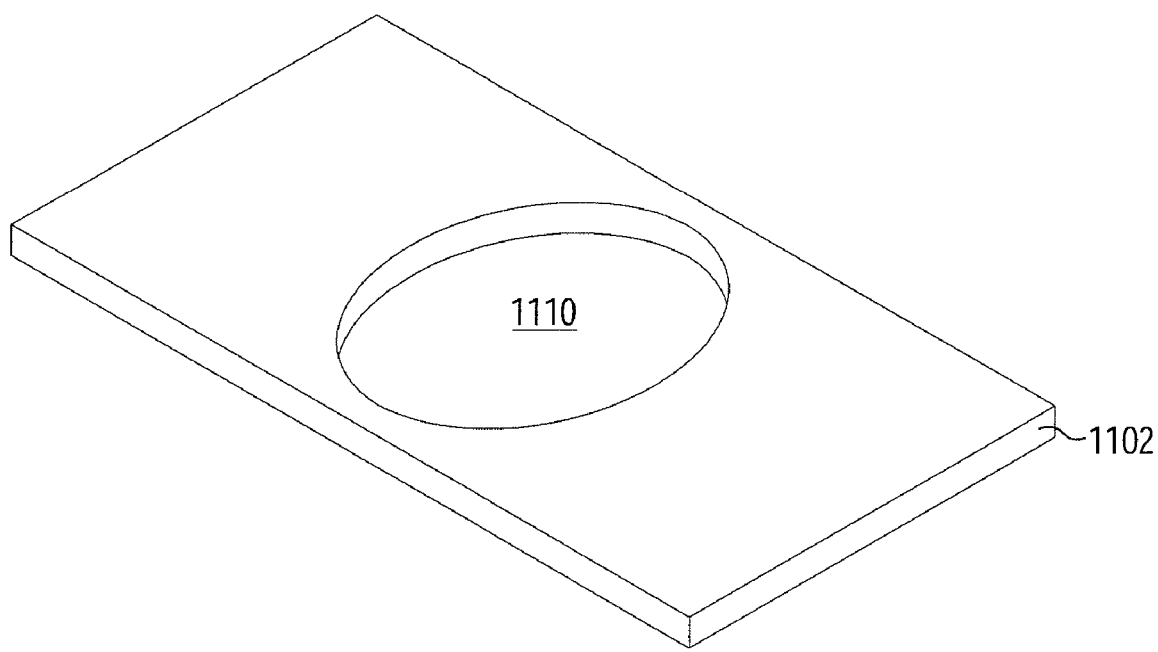

In FIG. 15, the topside of glass wafer 1102 is processed to define mirror cavity 1110 near the center of glass wafer 1102 as described above in reference to FIG. 11. Glass wafer 1102 does not have any specific support pads on top of which pads 106, 108, 110, 112, 714, and 716 are bonded. This allows silicon wafer 1402 and glass wafer 1102 to be aligned with greater tolerance as long as a mirror to be formed on the backside of silicon wafer 1402 is located over mirror cavity 1110.

Figure 16A:
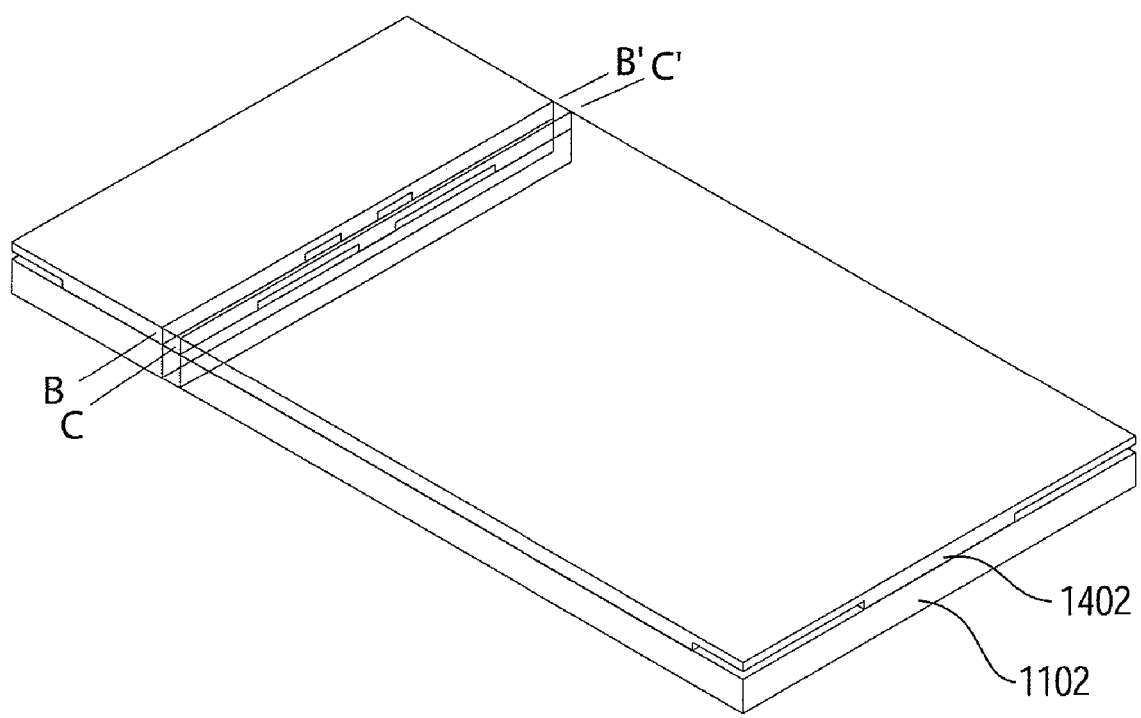
Figure 16B:
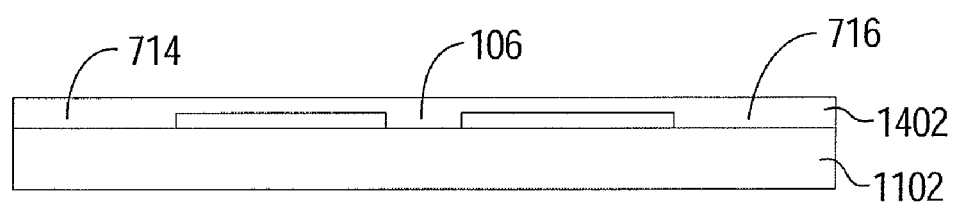
Figure 16C:
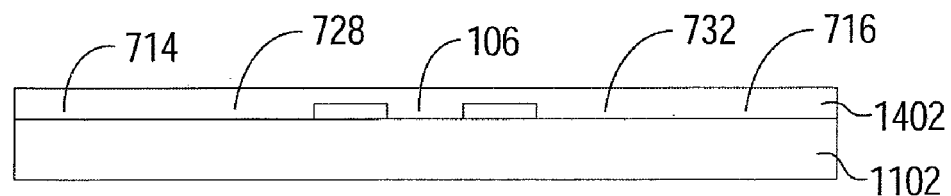

In FIG. 16A, silicon wafer 1402 is turned upside down and the topside of silicon wafer 1402 is bonded to the topside of glass wafer 1102. FIGS. 16B and 16C illustrate cross-sections of the bonded structure along line BB' and CC'.

Figure 17A:
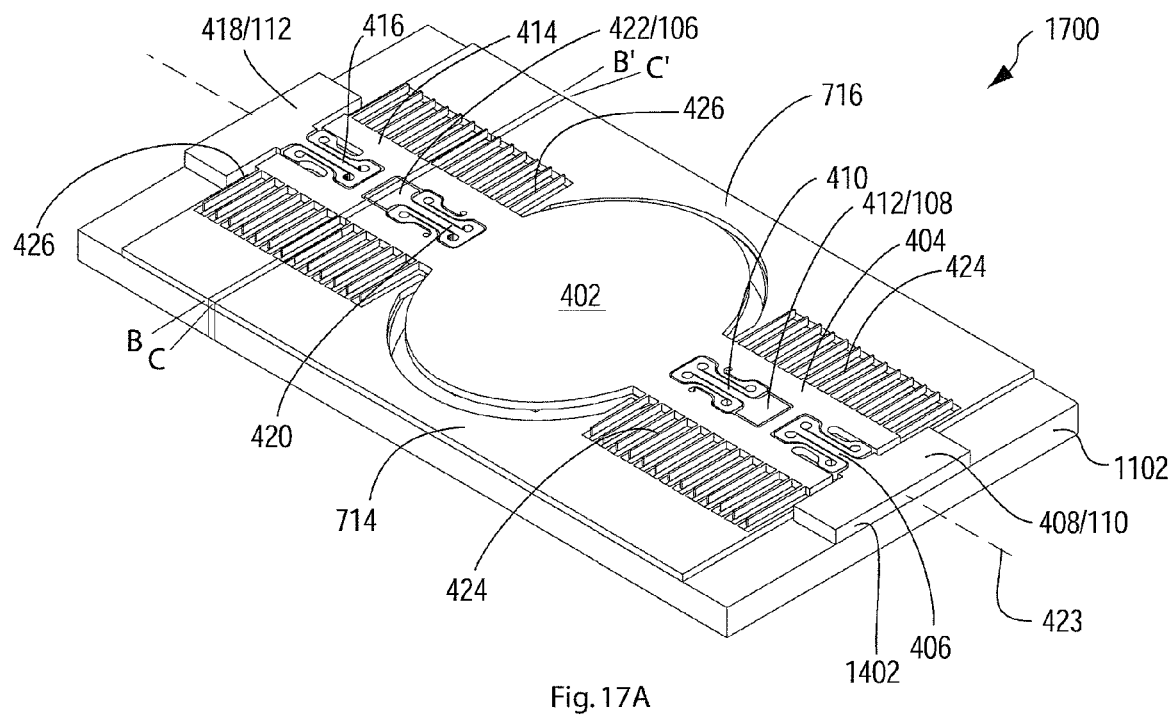

In FIG. 17A, the backside of silicon wafer 1402 (the topside of the bonded structure) is etched to approximately half of its thickness (or down to the optional etch stop) to define mirror 402, beam structures 404 and 414, springs 406, 410, 416, and 420, rotating comb teeth 424 extending from beam structure 404, rotating comb teeth 426 extending from beam structure 414, and spring pads 408, 412, 418, and 422 as described above in reference to FIG. 9A. If present, portions of the optional insulator are removed after etching to free the moving elements so they can rotate about rotational axis 423.

Figure 17B:
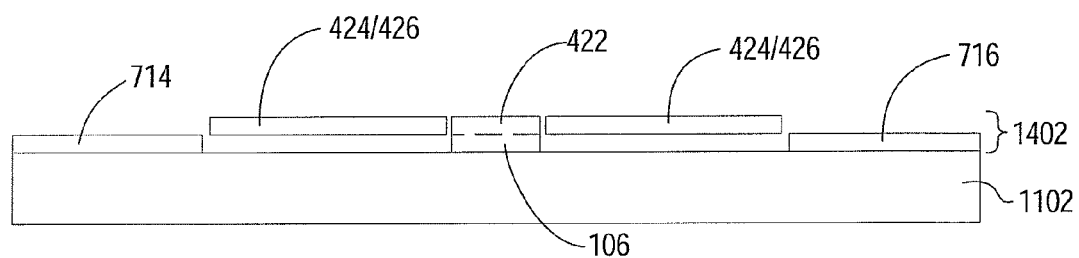
Figure 17C:
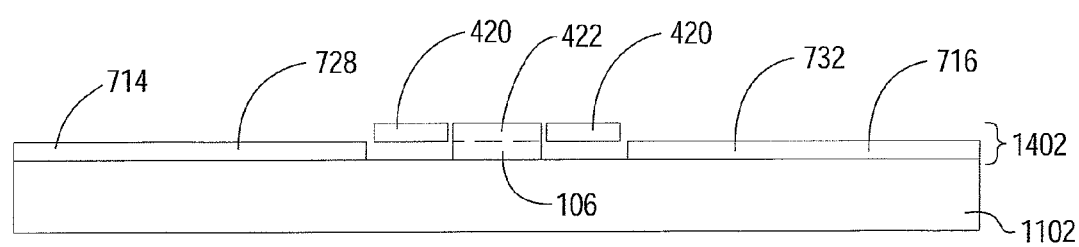

FIGS. 17B and 17C illustrate cross-sections of the bonded structure along lines BB' and CC'. Note that rotating comb teeth 424 and 426 correspond to the lateral surface of the oscillating body in U.S. Pat. No. 6,595,055, and stationary comb teeth 728 and 732 extending from support pads 714 and 716 correspond to the supporting wafer in U.S. Pat. No. 6,595,055. Thus, the support layer asserts a physical influence on the oscillating body.

FIGS. 18, 19, 20, and 21 illustrate a process for constructing a MEMS device 2100 (FIG. 21) with vertical and in-plane comb teeth in one embodiment of the invention. MEMS device 1300 is a combination of MEMS devices 400 and 900 (FIGS. 4A and 9A).

Figure 18:
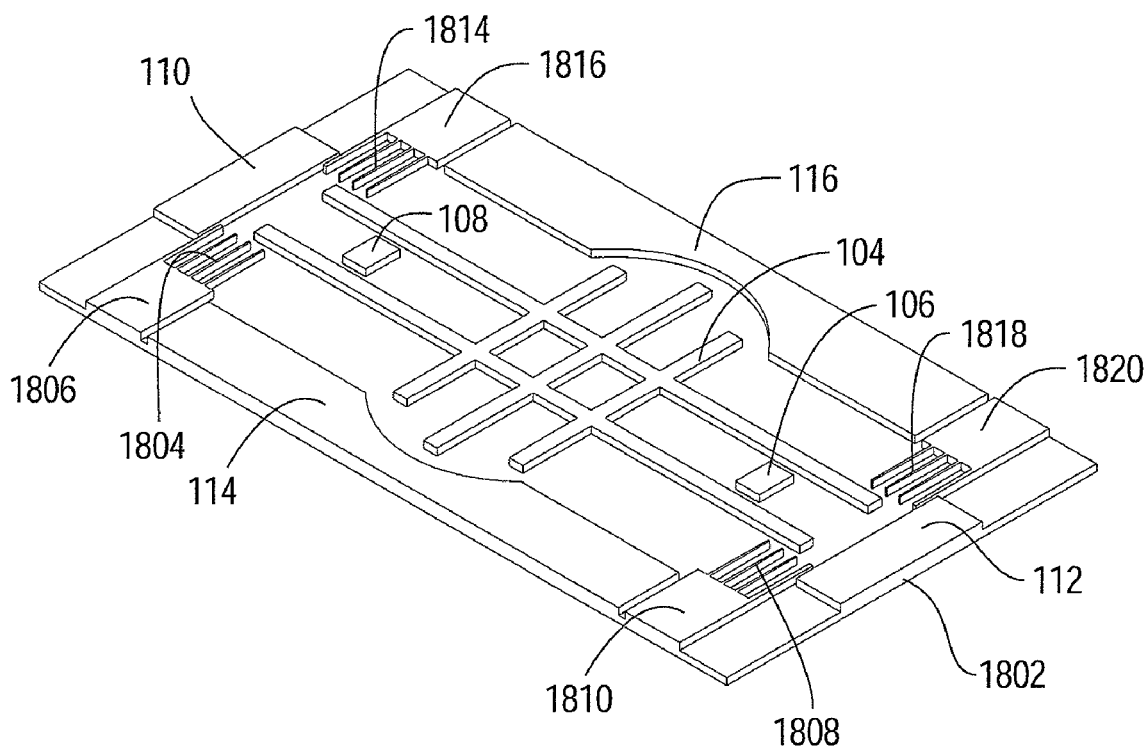
FIGS. 18, 19, 20, and 21 illustrate a process for constructing a MEMS device that is a combination of the devices in FIGS. 4A and 9A in one embodiment of the invention.

In FIG. 18, the topside of a silicon wafer 1802 is etched to approximately half of its thickness to define a first support layer. After the etching, a thermal oxide layer is optionally formed over the topside of silicon wafer 1802. The thermal oxide layer may act as an etch stop for a subsequent etching of the backside of silicon wafer 1802. Silicon wafer 1802 has a single silicon layer with an exemplary thickness of approximately 200 μm.

The first support layer includes stiffening structure 104, spring pads 106, 108, 110, and 112, and support pads 114 and 116 as described above in reference to FIG. 1A. Furthermore, besides support pad 114 along the length of the device there are stationary comb teeth 1804 extending from a support pad 1806 and stationary comb teeth 1808 extending from a support pad 1810. Similarly, besides support pad 116 along the length of the device there are stationary comb teeth 1814 extending from a support pad 1816 and stationary comb teeth 1818 extending from a support pad 1820. In one embodiment, the dimension that controls the etch rate of the topside of silicon wafer 1802 is the gap between adjacent comb teeth, which is about 20 μm.

Note that the length of stationary comb teeth 1804 and 1808 may be different (e.g., shorter) than the length of stationary comb teeth 1814 and 1818. The different comb lengths can cause an asymmetry in the electrostatic field between the first support layer and the device layer to provide another uneven vertical driving force, in addition to pads 114 and 116, for initiating the oscillation of the mirror to be formed on the backside of silicon wafer 1802. The different comb lengths can also be used for directional sensing.

Figure 19:
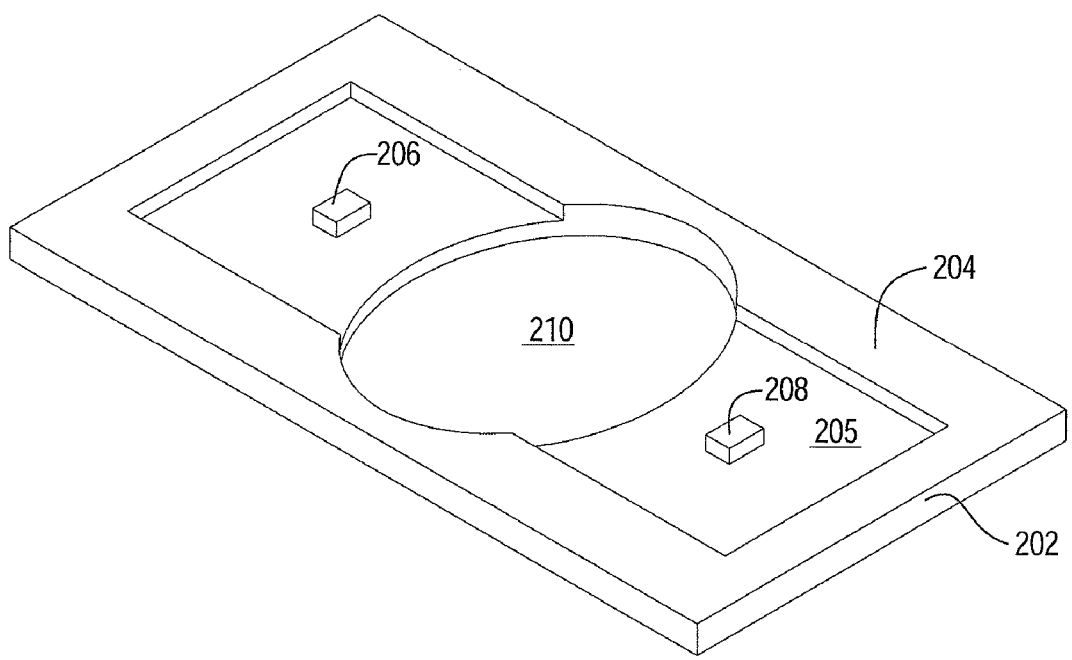

In FIG. 19, the topside of glass wafer 202 is processed to define the second support layer on top of which the first support layer is to be bonded. This is the same as the process shown in FIGS. 2A and 2B.

Figures 20, 21:
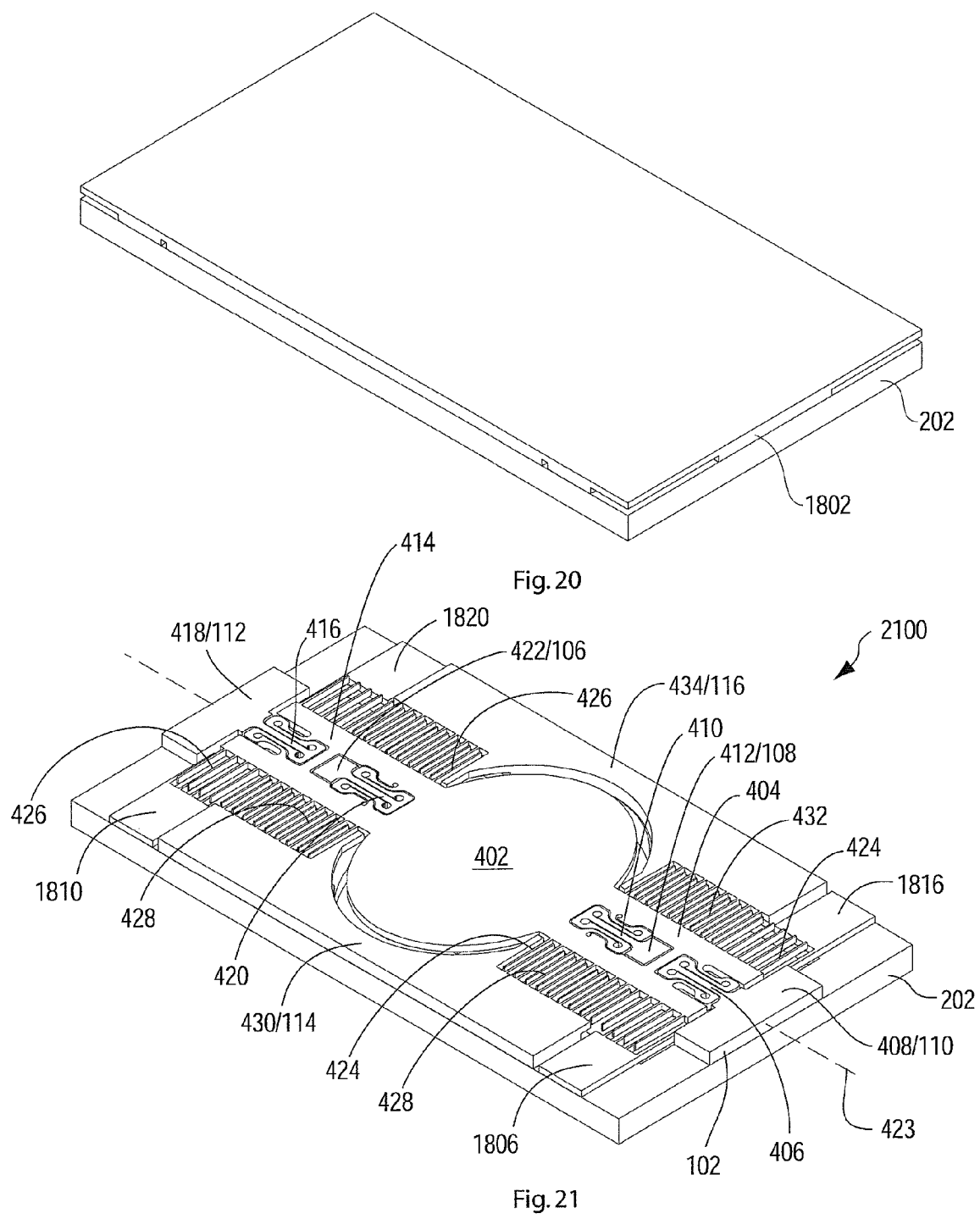

In FIG. 20, silicon wafer 1802 is turned upside down and the topside of silicon wafer 1802 is bonded to the topside of glass wafer 202.

In FIG. 21, the backside of silicon wafer 1002 (the topside of the bonded structure) is etched to approximately half of its thickness (or down to the optional etch stop) to define mirror 402, beam structures 404 and 414, springs 406, 410, 416, and 420, rotating comb teeth 424 extending from beam structure 404, rotating comb teeth 426 extending from beam structure 414, spring pads 408, 412, 418, 422, stationary comb teeth 428 extending from stationary pad 430, and stationary comb teeth 432 extending from stationary pad 434 as described above in reference to FIG. 4A. Note that stationary comb teeth 428 and 432 are not interdigitated with rotating comb teeth 424 and 426 along the entire length of beam structures 404 and 414. Instead, rotating comb teeth 424 and 426 at distal ends of beam structures 404 and 414 are interdigitated out-of-plane with stationary comb teeth 1804, 1808, 1814, and 1818 in the support layer. If present, exposed portions of the insulator are removed after etching to free the moving elements so they may rotate about rotational axis 423.

In one embodiment, the dimension that controls the etch rate of the topside of silicon wafer 102 is the gap between adjacent comb teeth, which is about 5 μm. In one embodiment, portions of rotating comb teeth 424 and 426 near the distal ends of beam structures 404 and 414 have wider gaps to match stationary comb teeth 1804, 1808, 1814, and 1818 in the first support layer. This allows the features on the topside of silicon wafer 1802 to be etched at a faster rate than the features on the backside of silicon wafer 1802. In one embodiment, the features on the topside of silicon wafer 1802 are etched more than 2 times faster than the features on the backside of silicon wafer 1802.

In this embodiment, stationary comb teeth 428 and 432 and stationary pads 430 and 434 do not extend over stationary comb teeth 1804, 1808, 1814, and 1818 and support pads 1806, 1810, 1816, and 1820. After the etching, pads 1806, 1810, 1816, and 1820 are electrically insulated from pads 430/144 and 434/166. Alternatively, pads 114, 1806, and 1810 are electrically connected, and pads 116, 1816, and 1820 are electrically connected.

Note that rotating comb teeth 424 and 426 correspond to the lateral surface of the oscillating body in U.S. Pat. No. 6,595,055, stationary comb teeth 428 and 432 correspond to inner lateral surface of the opening in a frame layer in U.S. Pat. No. 6,595,055, and stationary comb teeth 1804, 1808, 1814, and 1818 and support pads 114 and 116 correspond to the supporting wafer for holding the frame layer in U.S. Pat. No. 6,595,055. Unlike U.S. Pat. No. 6,595,055, the supporting wafer (including stationary comb teeth 1804, 1808, 1814, and 1818 and support pads 114 and 116) asserts a physical influence on the oscillation of mirror 402.

FIGS. 22, 23, 24, and 25 illustrate a process for constructing a MEMS device 2500 (FIG. 25) with in-plane comb teeth from a silicon-on-insulator (SOI) wafer in one embodiment of the invention. In MEMS device 2500, the topside of a SOI wafer 2202 (FIG. 22) is etched down to the insulator (e.g., silicon oxide) to form a first support layer. SOI wafer 2202 is then turned upside down and bonded with glass wafer 202 (FIG. 23), which forms a second support layer. The backside of SOI wafer 2202, now the topside of the bonded structure, is then etched down to the insulator to form a rotatable mirror and comb teeth actuator.

Figure 22:
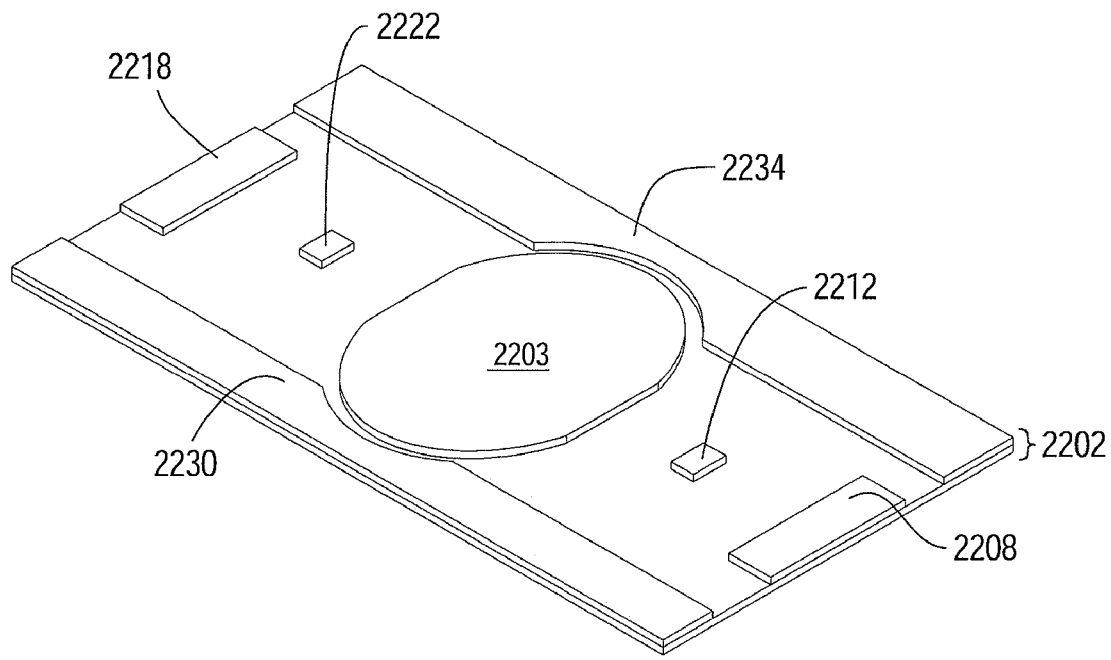
FIGS. 22, 23, 24, and 25 illustrate a process for constructing a MEMS device from a silicon-on-insulator (SOI) wafer and a glass wafer in one embodiment of the invention.

In FIG. 22, the topside of SOI wafer 2202 is etched down to the insulator, which acts as an etch stop, to define the first support layer. SOI wafer 2202 has an exemplary thickness of approximately 200 μm.

The first support layer includes a stiffening structure 2203, spring pads 2208, 2212, 2218, and 2222, and support pads 2230 and 2234. Spring pads 2208, 2212, 2218, and 2222 coincide with spring pads to be formed on the backside of SOI wafer 2202. Support pads 2230 and 2234 coincide with stationary pads to be formed on the backside of SOI wafer 2202. Note that the width of support pad 2230 is less than the width of support pad 2234.

Figure 23:
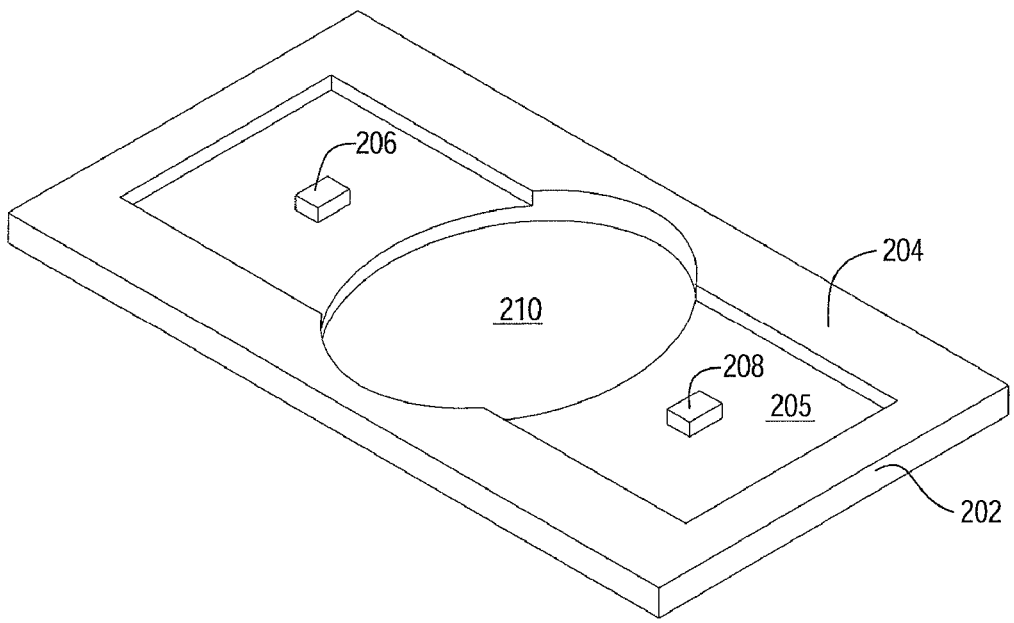

In FIG. 23, the topside of glass wafer 202 is processed to define the second support layer on top of which the first support layer is to be bonded. This is the same as the process shown in FIGS. 2A and 2B.

Figure 24:
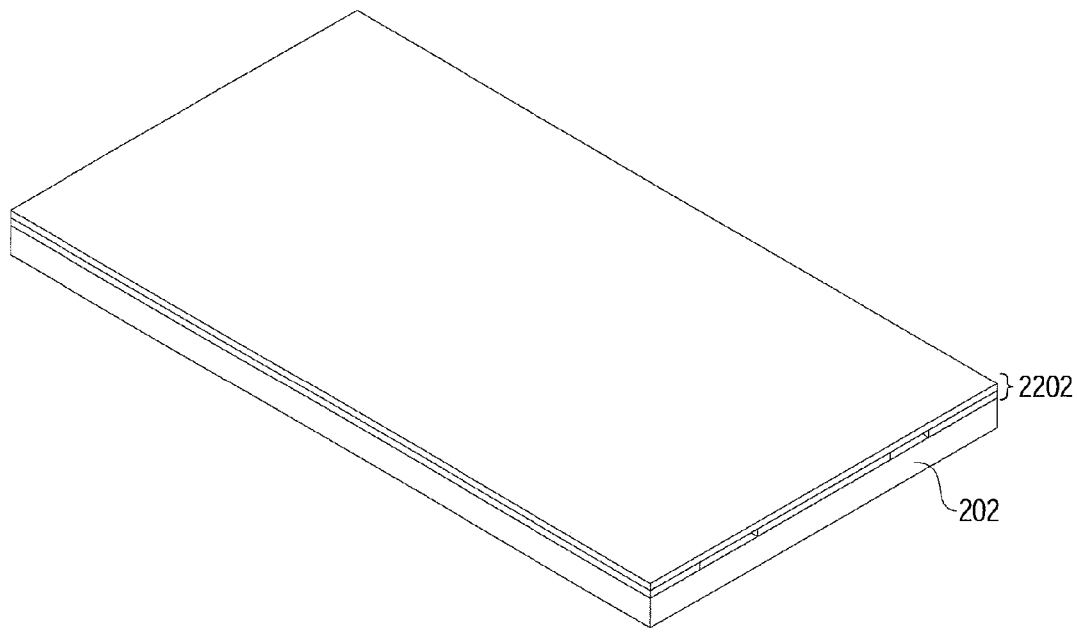

In FIG. 24, SOI wafer 2202 is turned upside down and the topside of SOI wafer 2202 is bonded to the topside of glass wafer 202. Specifically, pads 2208, 2218, 2230, and 2234 of SOI wafer 2202 are bonded to pad 204 of glass wafer 202. Furthermore, pads 2212 and 2222 of SOI wafer 2202 are bonded to pads 206 and 208 of glass wafer 202.

Figure 25:
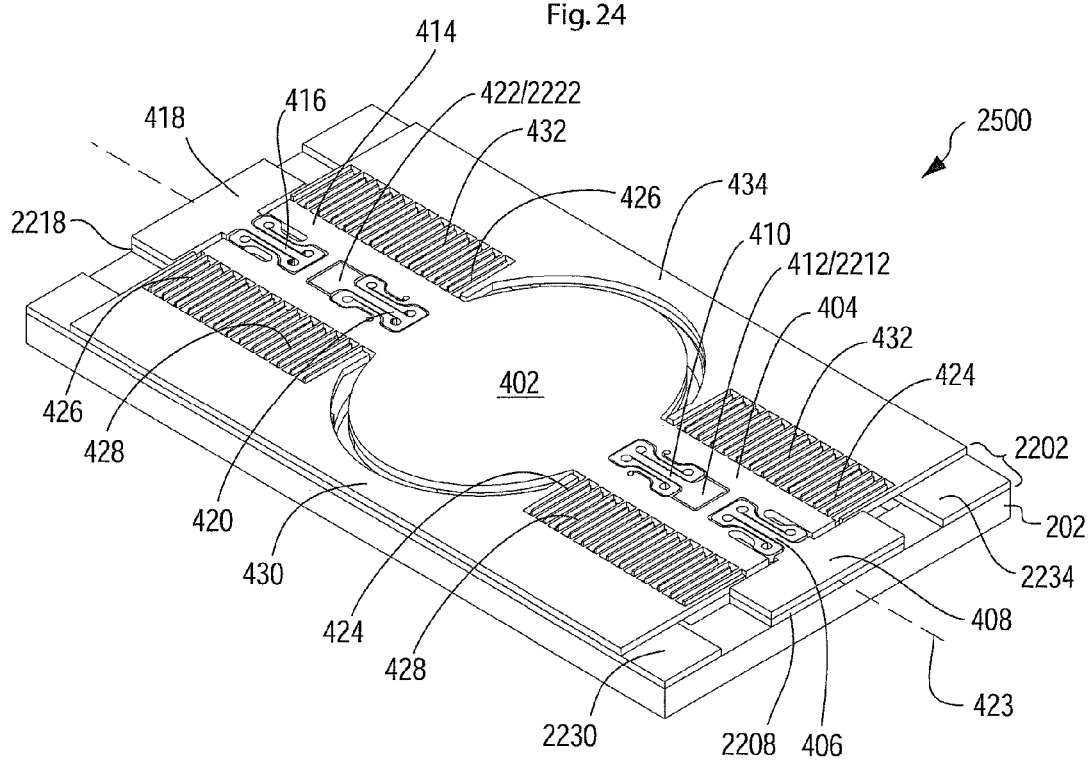

In FIG. 25, the backside of SOI wafer 2202 (the topside of the bonded structure) is etched down to the insulator to define mirror 402, beam structures 404 and 414, springs 406, 410, 416, and 420, rotating comb teeth 424 extending from beam structure 404, rotating comb teeth 426 extending from beam structure 414, spring pads 408, 412, 418, and 422, stationary comb teeth 428 extending from stationary pad 430, and stationary comb teeth 432 extending from stationary pad 434 as described above in reference to FIG. 4A. Mirror 402 overlaps stiffening structure 2203 so their combined thickness provides added rigidity. Exposed portions of the insulator are removed after etching to free the moving elements so they can rotate about rotational axis 423.

Note that rotating comb teeth 424 and 426 correspond to the lateral surface of the oscillating body in U.S. Pat. No. 6,595,055, stationary comb teeth 428 and 432 correspond to inner lateral surface of the opening in the frame layer in U.S. Pat. No. 6,595,055, and support pads 2230 and 2234 correspond to the supporting wafer for holding the frame layer in U.S. Pat. No. 6,595,055. Similar to device 400 (FIG. 4A), the asymmetry between support pads 2230 and 2234 in device 2500 causes asymmetry in the electrostatic field between the device layer and the support layer. This asymmetry creates an initial deflection of the mirror that can be used to start the oscillation of the mirror. Thus, the support layer asserts a physical influence on the oscillating body.

Figure 26:
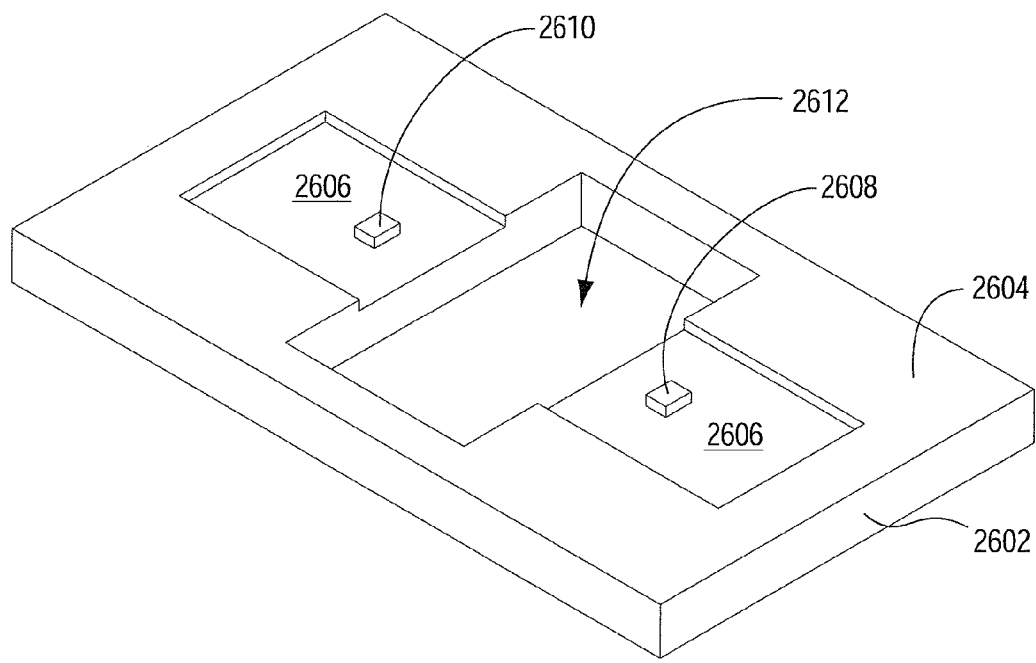
FIGS. 26, 27A, 27B, 27C, 27D, 28, 29A, 29B, 29C, 29D illustrate a process for constructing a biaxial MEMS device from a SOI wafer and a glass wafer in one embodiment of the invention.
Figure 27A:
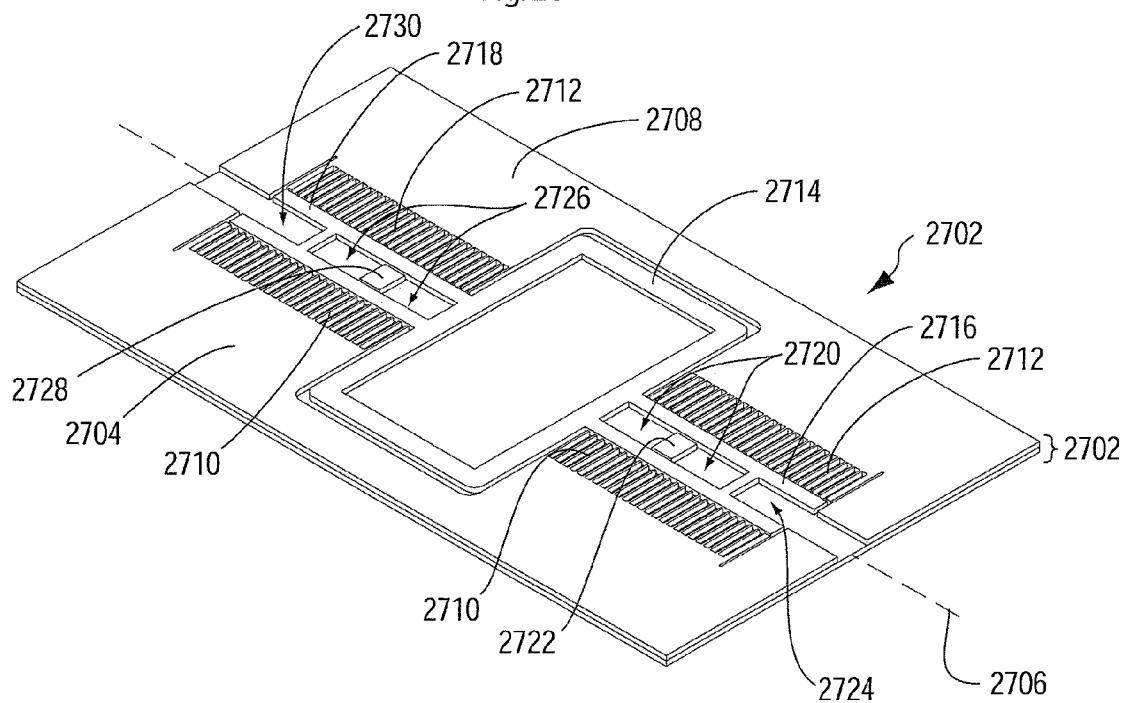
Figure 27B:
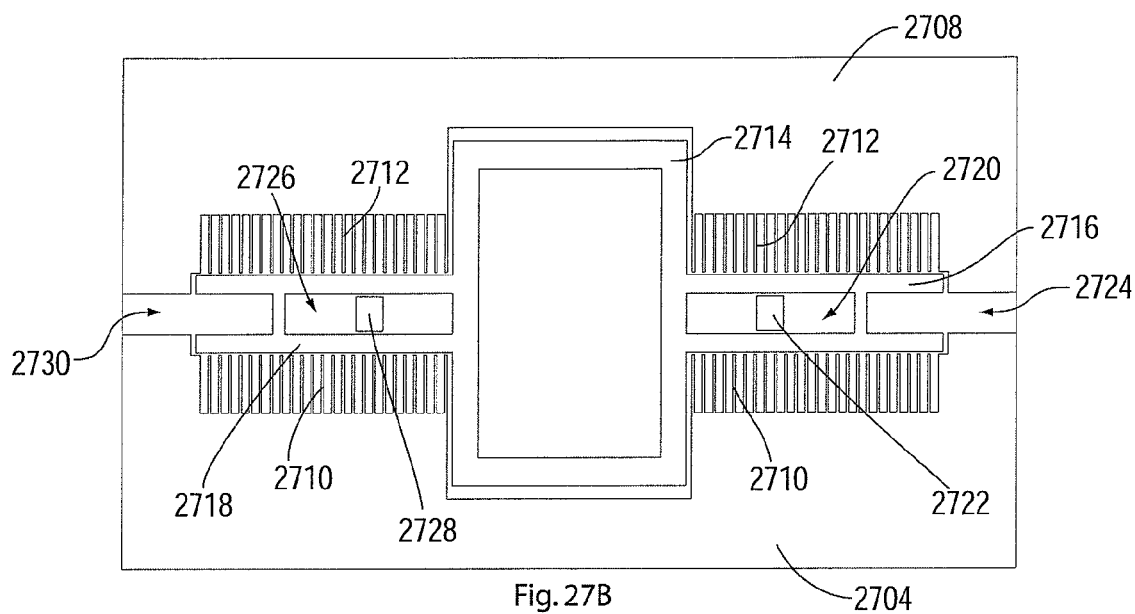
Figure 27C:
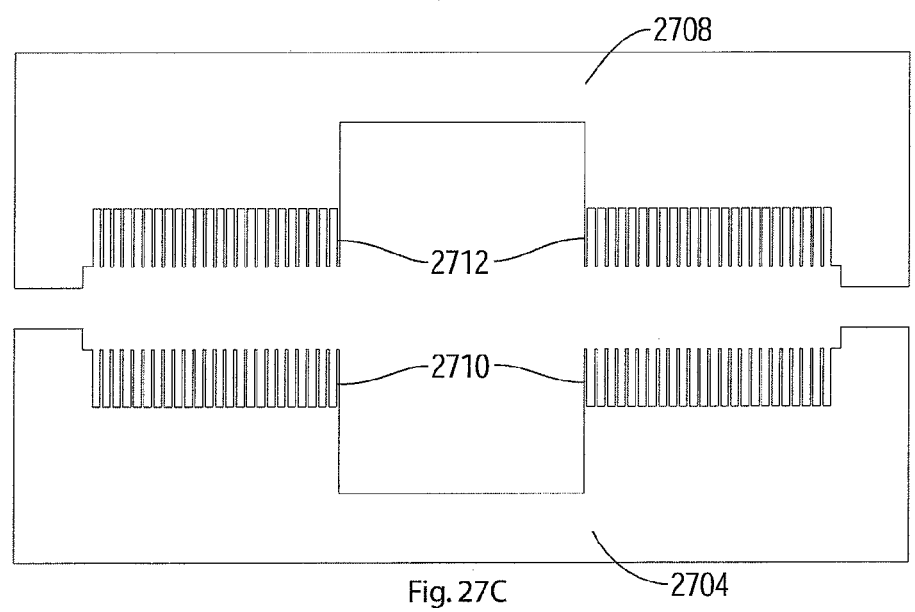
Figure 27D:
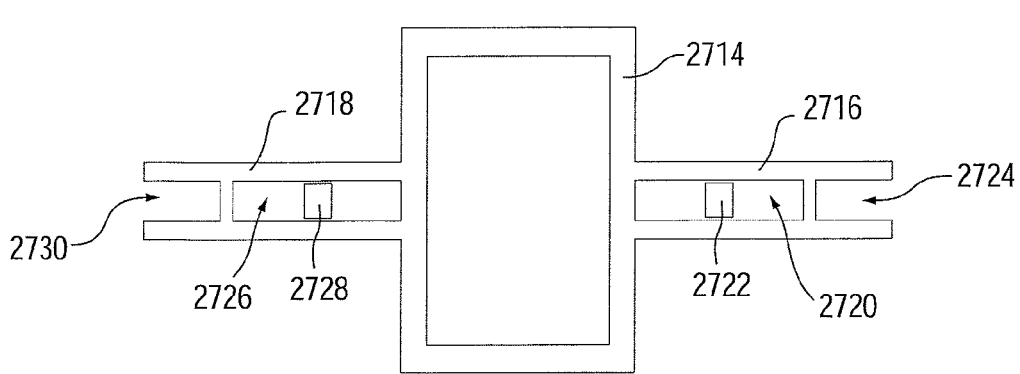
Figure 28:
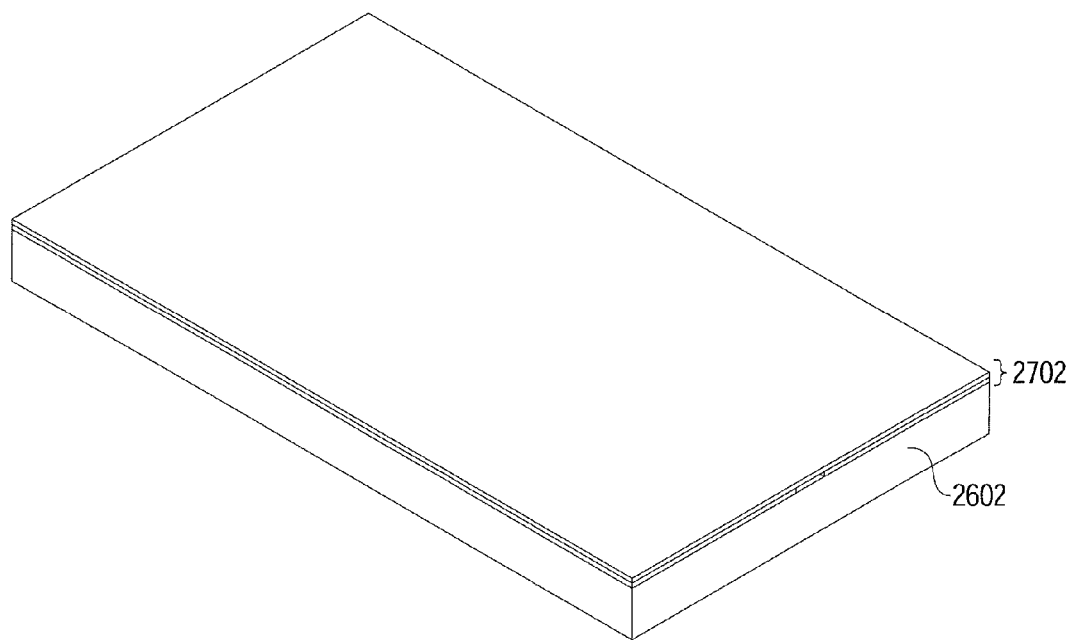
Figure 29A:
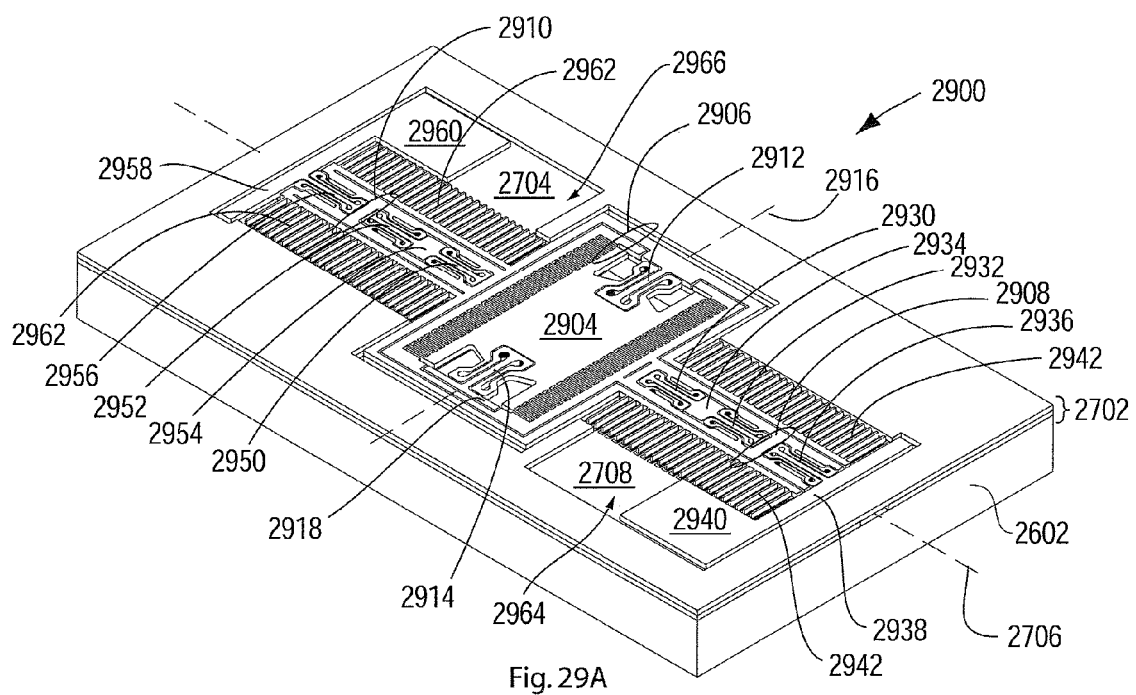

FIGS. 26, 27A, 27B, 27C, 27D, 28, 29A, 29B, 29C, and 29D illustrate a process for constructing a biaxial MEMS device 2900 (FIG. 29A) from an SOI wafer in one embodiment of the invention. MEMS device 2900 has vertical comb teeth for generating rotation about a first axis and in-plane comb teeth for generating rotation about a second axis orthogonal to the first axis. To make MEMS device 2900, the topside of an SOI wafer 2702 (FIG. 27A) is etched down to the insulator (e.g., silicon oxide) to form a first support layer having support pads, a first rotating frame, and a first set of stationary comb teeth for generating rotation about an axis 2706 (FIG. 27A). SOI wafer 2702 is then turned upside down and bonded with a glass wafer 2602 (FIG. 26), which forms a second support layer. The backside of SOI wafer 2702, now the topside of the bonded structure, is then etched down to the insulator to form a device layer having a second rotating frame on the first rotating frame, an oscillating body within the second rotating frame, a first set of rotating comb teeth for generating rotation about axis 2602, a second set of rotating comb teeth and a second set of stationary comb teeth for generating rotation about an axis 2916 (FIG. 29A).

In FIG. 26, the topside of glass wafer 2602 is processed to define the second support layer on top of which SOI wafer 2702 is bonded. The second support layer includes a generally rectangular recess 2606 that defines a support pad 2604 around the perimeter of glass wafer 2602. Additional support pads 2608 and 2610 are formed in recess 2606 to anchor spring pads from above. A mirror cavity 2612 is formed through glass wafer 2602 about the center of recess 2606. Less refined processes, including sandblasting, laser cutting, wet etching, and dry etching may be used to process glass wafer 2602 since it has rough features compared to the features on SOI wafer 2702.

Recess 2606 and mirror cavity 2612 provide the separation between the topside of glass wafer 2602 from mobile elements in SOI wafer 2702. Recess 2606 and mirror cavity 2612 also accommodate large rotation of a mirror to be formed on the backside of SOI wafer 2702.

In FIGS. 27A and 27B, the topside of SOI wafer 2702 is etched down to the insulator, which acts as an etch stop, to define the first support layer. SOI wafer 2702 has an exemplary thickness of approximately 200 μm.

The first support layer includes a support pad 2704 on one side of axis 2706 and an opposing support pad 2708 on the other side of axis 2706. Stationary comb teeth 2710 extend from support pad 2704 toward support pad 2708, and stationary comb teeth 2712 extend form support pad 2708 toward support pad 2704. Stationary comb teeth 2710 and 2712 are used in conjunction with rotating comb teeth to rotate the mirror to be formed in SOI wafer 2702 about axis 2706. For clarity, FIG. 27C shows mostly the components described in the present paragraph.

The first support layer further includes a first rotating frame 2714 with a beam structure 2716 extending along axis 2706 from a right outer edge of frame 2714, and a beam structure 2718 extending along axis 2706 from a left outer edge of frame 2714. Beam structure 2716 defines an opening 2720 for accommodating a spring pad 2722. Beam 2716 has a U-shaped distal end that defines an opening 2724. Similarly, beam structure 2718 defines an opening 2726 for accommodating a spring pad 2728. Beam structure 2718 has a U-shaped distal end that defines an opening 2730. For clarity, FIG. 27D shows mostly the components described in the present paragraph.

In FIG. 28, SOI wafer 2702 is turned upside down and the topside of SOI wafer 2702 is bonded to the topside of glass wafer 2602. Referring back to FIGS. 26 and 27A, support pads 2704 and 2708 of SOI wafer 2702 are bonded to support pad 2604 of glass wafer 2602. Furthermore, spring pads 2722 and 2728 of SOI wafer 2702 are bonded to spring pads 2608 and 2610 of glass wafer 2602, respectively. Stationary comb teeth 2710 and 2712 now extend over recess 2606. Rotating frame 2714 with beam structures 2716 and 2718 of SOI wafer 2702 are suspended over recess 2606 and mirror cavity 2612.

Figure 29B:
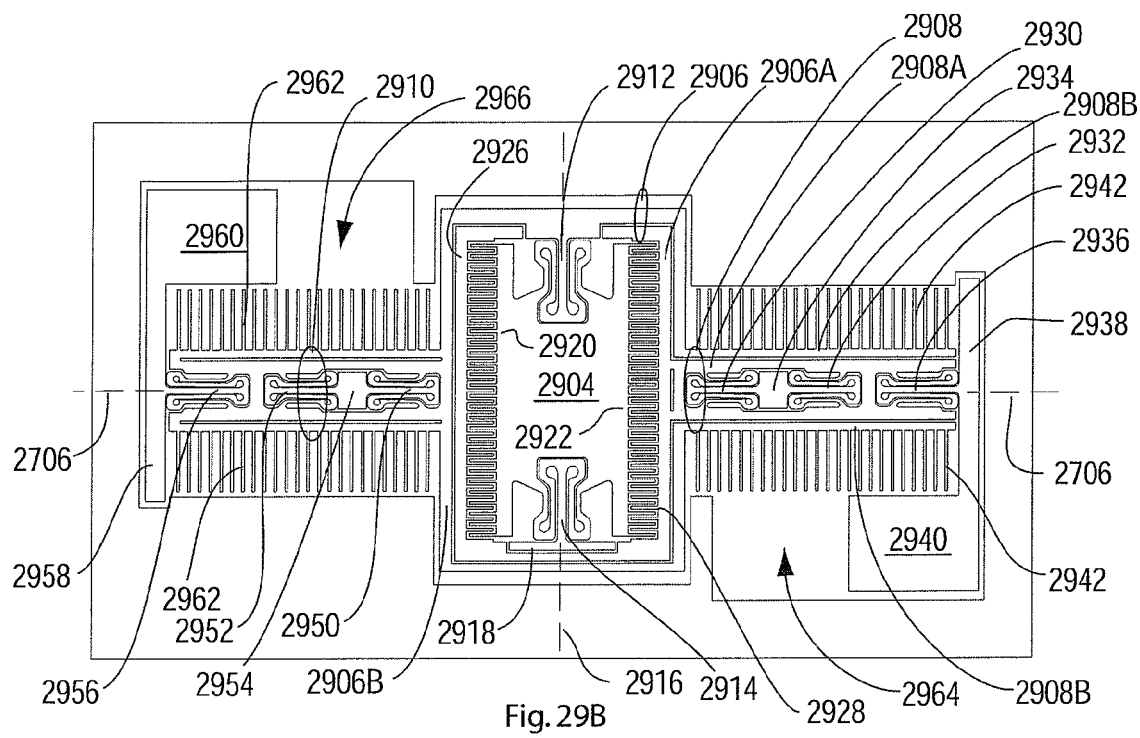

In FIGS. 29A and 29B, the backside of SOI wafer 2702 (the topside of the bonded structure) is etched down to the insulator to define the device layer. The device layer includes a mirror 2904 within a second rotating frame 2906. Mirror 2904 is connected by springs 2912 and 2914 along axis 2916 to frame 2906.

Figure 29C:
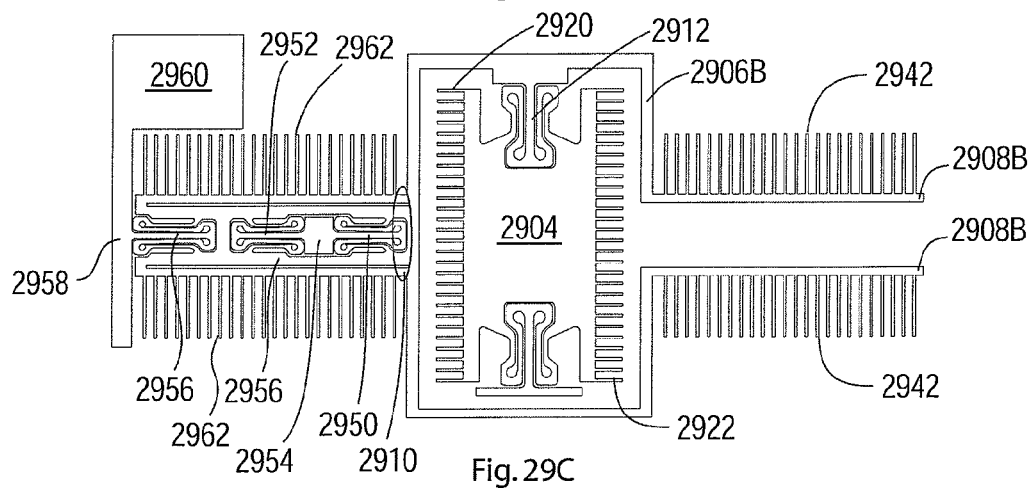
Figure 29D:
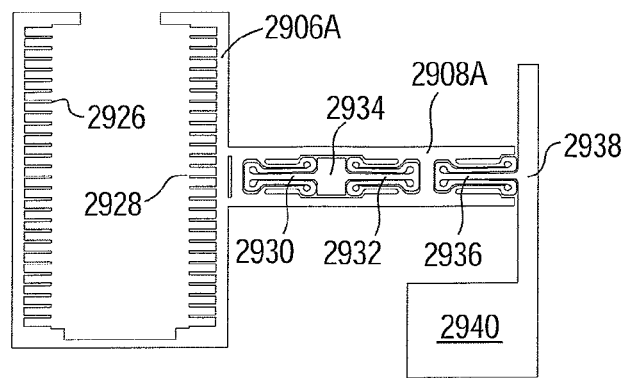

Referring to FIGS. 29B, 29C, and 29D, frame 2906 consists of an inner frame 2906A, an outer frame 2906B, and a spring pad 2918 that are electrically insulated from each other by trenches in the silicon. Mirror 2904 is connected by spring 2912 to outer frame 2906B, and by spring 2914 to spring pad 2918. Rotating comb teeth 2920 extend along a left edge of mirror 2904 on one side of axis 2916 while rotating comb teeth 2922 extend along a right edge of mirror 2904 on the other side of axis 2916. Stationary comb teeth 2926 extend from an inner left edge of inner frame 2906A to be interdigitated with rotating comb teeth 2920. Stationary comb teeth 2928 extend from an inner right edge of inner frame 2906A to be interdigitated with rotating comb teeth 2922. Comb teeth 2926, 2928, 2920, and 2922 are used to rotate mirror 2094 about axis 2916.

A first beam structure 2908 extends along axis 2706 from frame 2906. Beam structure 2908 has an inner beam 2908A extending from an outer right edge of inner frame 2906A. Beam structure 2908 further has outer beams 2908B extending from an outer right edge of outer frame 2906B. Inner beam 2908A and outer beams 2908B are electrically insulated from each other by trenches in the silicon. Within an opening in inner beam 2908A, two springs 2930 and 2932 connect beam structure 2908 to a spring pad 2934 along axis 2706. A spring 2936 connects the distal end of beam structure 2908 to a spring pad 2938 along axis 2706. Spring pad 2938 includes a large pad area 2940 for receiving a bond wire. Rotating comb teeth 2942 extend from outer top and outer bottom edges of outer beams 2908B on both sides of axis 2706.

Similarly, a second beam structure 2910 extends along axis 2706 from an outer left edge of outer frame 2906B. Within an opening in beam structure 2910, two springs 2950 and 2952 connect beam structure 2910 to a spring pad 2954 along axis 2706. A spring 2956 connects the distal end of beam structure 2910 to a spring pad 2958 along axis 2706. Spring pad 2958 includes a large pad area 2960 for receiving a bond wire. Rotating comb teeth 2962 extend from outer top and outer bottom edges of beam structure 2910 on both sides of axis 2706. The device layer further defines windows 2964 and 2966 for accommodating wire bond access to pads 2704 and 2708 below.

Frame 2906, including spring pad 2918, coincide with frame 2714 on the topside of SOI wafer 2702. Beam structures 2908 and 2910 coincide with beam structures 2716 and 2718 on the topside of SOI wafer 2702. Spring pads 2934 and 2954 coincide with spring pads 2722 and 2728 below on the topside of SOI wafer 2702. Spring pads 2938 and 2958 overlap support pads 2704 and 2708 on the topside of SOI wafer 2702. After etching, exposed portions of the insulator are removed to allow frame 2906 and frame 2714 to rotate in unison about axis 2706 through the coupling of their springs to the spring pads. Furthermore, mirror 2904 is able to rotate about axis 2916 through the coupling of springs 2912 and 2914 to frame 2906.

To oscillate mirror 2904 about axis 2706, a varying voltage difference is applied between lower stationary comb teeth 2710/2712 and upper rotating comb teeth 2942/2962. Alternatively, a constant voltage difference is applied between lower stationary comb teeth 2710/2712 and upper rotating comb teeth 2942/2962 to rotate or translate mirror 2904 to a fixed position. The same voltage or different voltages may be applied to lower stationary comb teeth 2710 and 2712 through windows 2964 and 2966 on the top surface of the bonded structure. A voltage is applied to upper rotating comb teeth 2942 and 2962 through pad area 2960.

To oscillate mirror 2904 about axis 2916, a varying voltage difference is applied between upper stationary comb teeth 2926/2928 and upper rotating comb teeth 2920/2922. A voltage is applied to upper rotating comb teeth 2920 and 2922 through pad area 2940. A voltage is applied to upper stationary comb teeth 2926 and 2928 through pad area 2960. As can be seen, the same voltage is applied to upper rotating comb teeth 2920/2922 and upper rotating comb teeth 2942/2962 through pad area 2960.

Figure 30A:
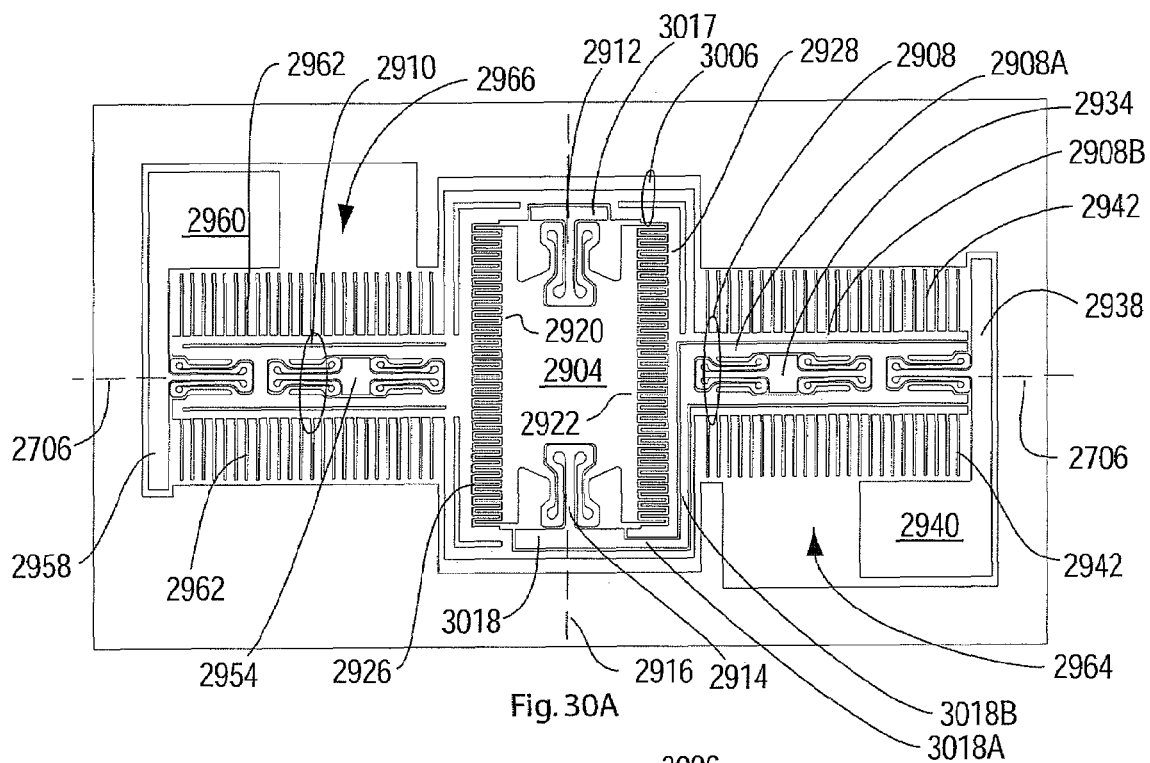
FIGS. 30A, 30B, and 30C illustrate an alternative device layer to that shown in FIGS. 29B to 29D in one embodiment of the invention.
Figure 30B:
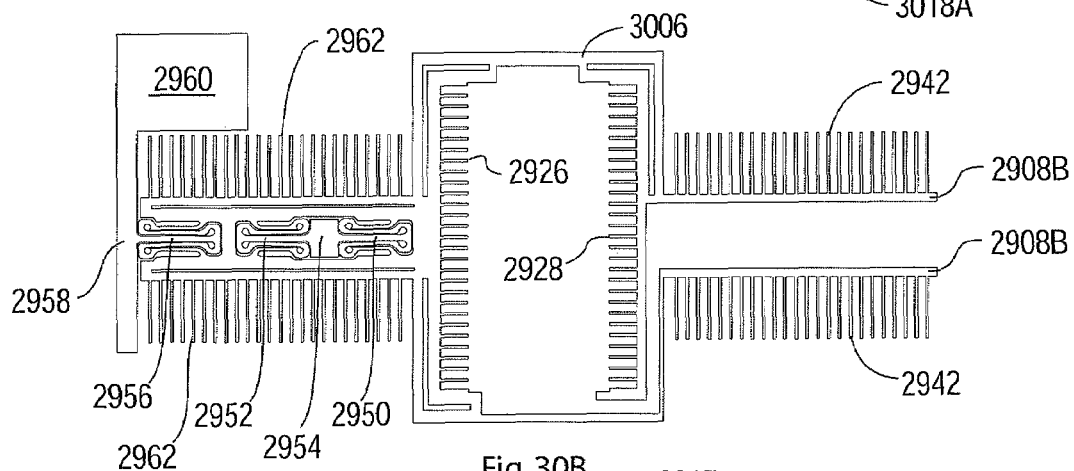
Figure 30C:
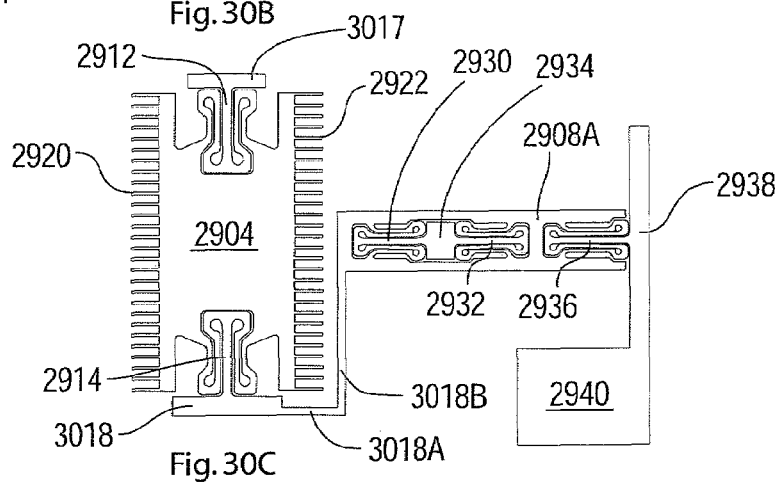

FIGS. 30A, 30B, and 30C illustrate another embodiment of device 2900 where backside of SOI wafer 2702 (the topside of the bonded structure) is etched different so that the same voltage is applied to upper stationary comb teeth 2926/2928 and upper rotating comb teeth 2942/2962 through pad area 2960 in one embodiment of the invention. Specifically, the topside of the bonded structure is etched to the insulator to define mirror 2904 within a second rotating frame 3006. Frame 3006 includes spring pads 3017 and 3018 that are electrically insulated from the remainder of the frame by trenches in the silicon. Mirror 2904 is connected by springs 2912 and 2914 to spring pads 3017 and 3018, respectively. Spring pad 3018 has a lower horizontal portion 3018A and a vertical portion 3018B.

Beam structure 2910 extends along axis 2706 from an outer left edge of frame 3006. On the other side, beam structure 2908 extends along axis 2706 from frame 3006. Specifically, inner beam 2908A is connected to vertical portion 3018B of spring pad 3018, and outer beams 2908B are connected to the outer right edge of frame 3006.

Frame 3006, including spring pads 3017 and 3018, coincide with frame 2714 in the topside of SOI wafer 2702. Beam structures 2908 and 2910 coincide with beam structures 2716 and 2718 in the topside of SOI wafer 2702. Spring pads 2934 and 2964 coincide with spring pads 2722 and 2728 in the topside of SOI wafer 2702. Spring pads 2938 and 2958 overlap support pads 2704 and 2708 in the topside of SOI wafer 2702.

To oscillate mirror 2904 about axis 2706, a varying voltage difference is applied between lower stationary comb teeth 2710/2712 and upper rotating comb teeth 2942/2962. Alternatively, a constant voltage difference is applied between lower stationary comb teeth 2710/2712 and upper rotating comb teeth 2942/2962 to rotate or translate mirror 2904 to a fixed position. The same voltage or different voltages may be applied to lower stationary comb teeth 2710 and 2712 through windows 2964 and 2966 on the top surface of the bonded structure. A voltage is applied to upper rotating comb teeth 2942 and 2962 through pad area 2960.

To oscillate mirror 2904 about axis 2916, a varying voltage difference is applied between upper stationary comb teeth 2926/2928 and upper rotating comb teeth 2920/2922. A voltage is applied to upper rotating comb teeth 2920 and 2922 through pad area 2940. A voltage is applied to upper stationary comb teeth 2926 and 2928 through pad area 2960. As can be seen, the same voltage is applied to upper stationary comb teeth 2926/2928 and upper rotating comb teeth 2942/2962 through pad area 2960.

FIGS. 31, 32A, 32B, 32C, 32D, 33, 34A, 34B, 34C, and 34D illustrate a process for constructing a biaxial MEMS device 3400 (FIG. 34A) with vertical comb teeth for generating rotation about two orthogonal axes in one embodiment of the invention. In MEMS device 3400, the topside of a SOI wafer 3202 (FIG. 32A) is etched down to the insulator (e.g., silicon oxide) to form a first support layer having a first rotating frame, a first set of stationary comb teeth for generating rotation about a first axis 3206, and a second set of stationary comb teeth for generating rotation about a second axis 3207 orthogonal to axis 3206. SOI wafer 3202 is then turned upside down and bonded with glass wafer 2602 (FIG. 31), which forms a second support layer. The backside of SOI wafer 3202, now the topside of the bonded structure, is then etched down to the insulator to form a device layer having a second rotating frame over the first rotating frame, a rotatable mirror within the second rotating frame, a first set of rotating comb teeth for generating rotation about axis 3206, and a second set of rotating comb teeth for generating rotation about axis 3207.

Figure 31:
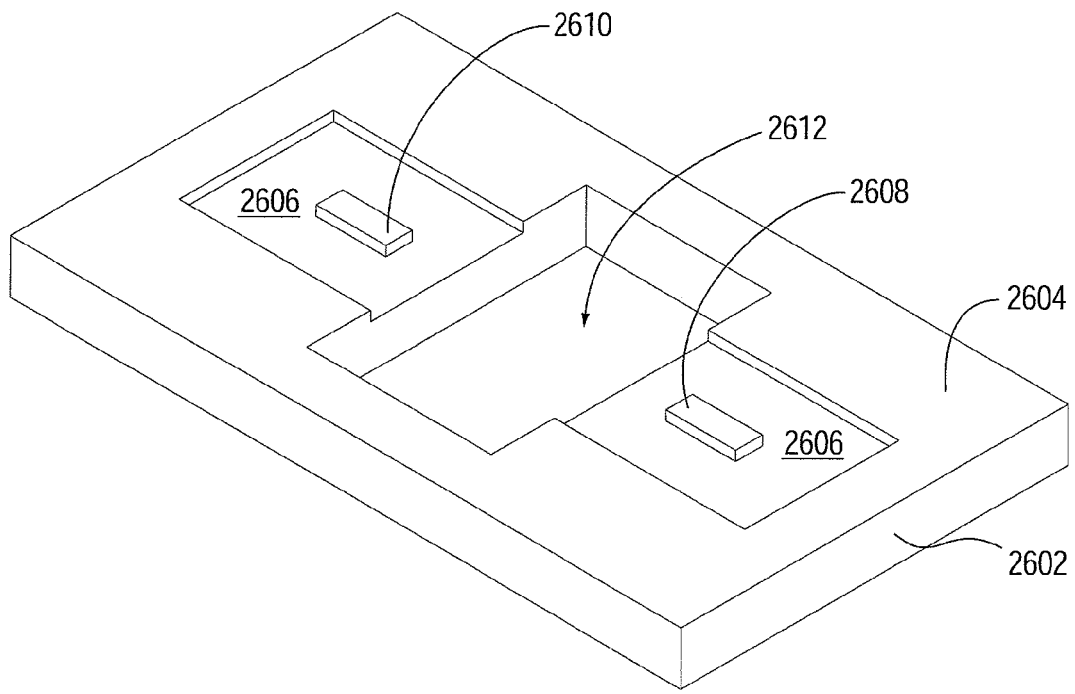
FIGS. 31, 32A, 32B, 32C, 32D, 33, 34A, 34B, 34C, and 34D illustrate a process for constructing a biaxial MEMS device from a SOI wafer and a glass wafer in one embodiment of the invention.

In FIG. 31, the topside of glass wafer 2602 is processed to define the second support layer on top of which SOI wafer 3202 is bonded. This is the same as the process shown in FIG. 26 except that spring pads 2608 and 2610 are made larger to accommodate larger spring pads.

Figure 32A:
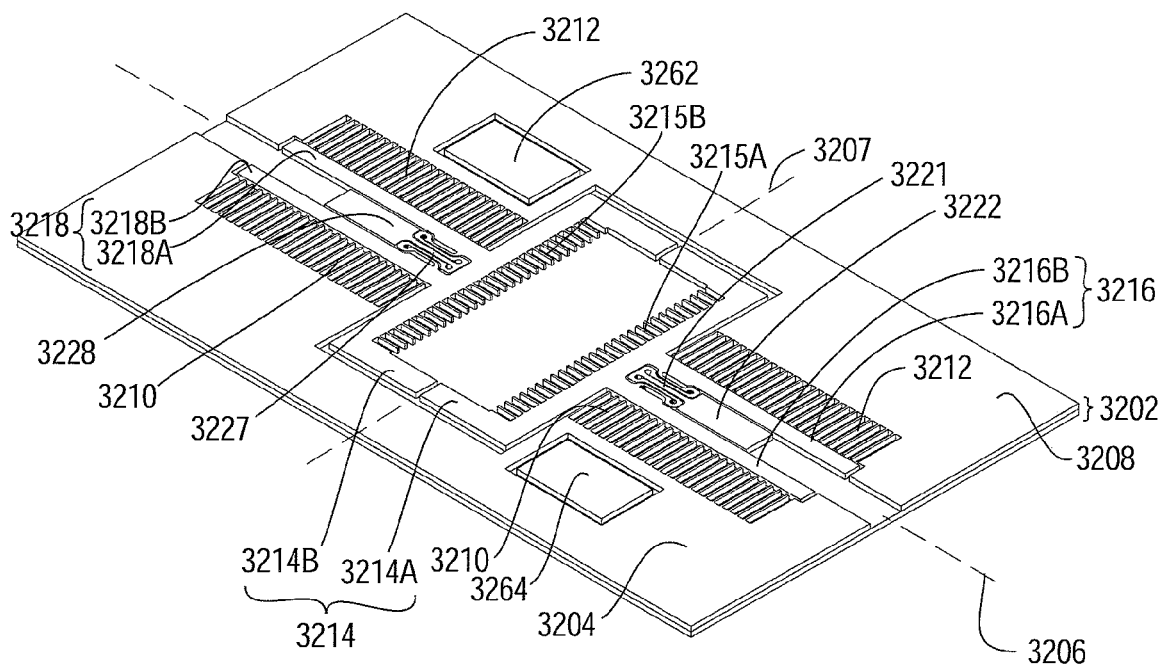
Figure 32B:
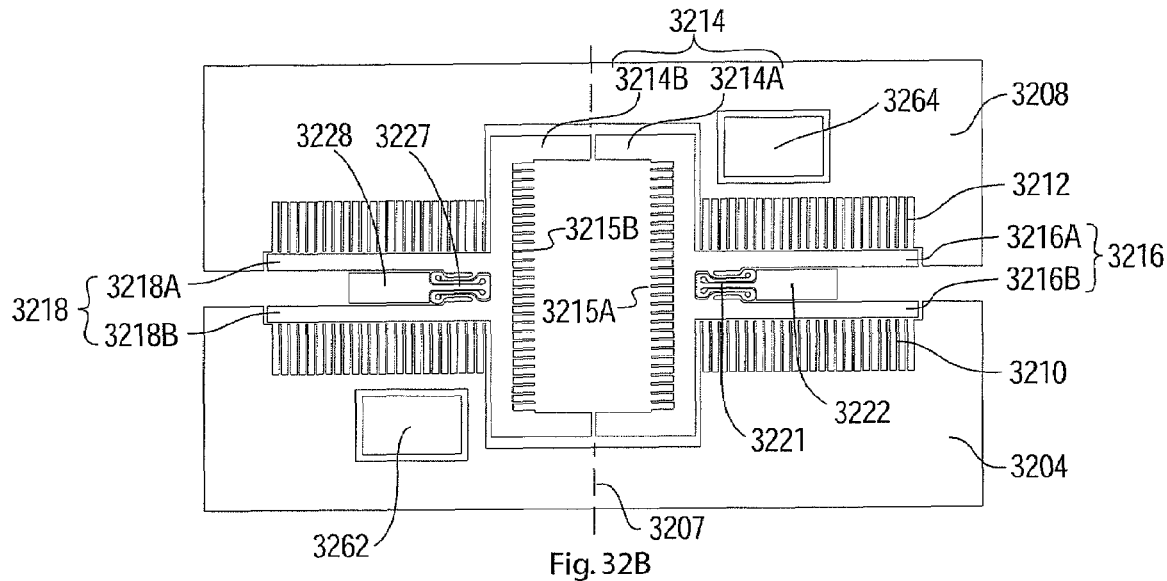

In FIGS. 32A and 32B, the topside of SOI wafer 3202 is etched down to the insulator, which acts as an etch stop, to define the first support layer. SOI wafer 3202 has an exemplary thickness of approximately 200 μm.

Figure 32C:
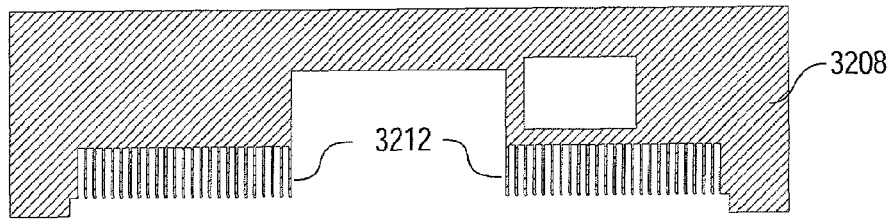
Figure 32C:
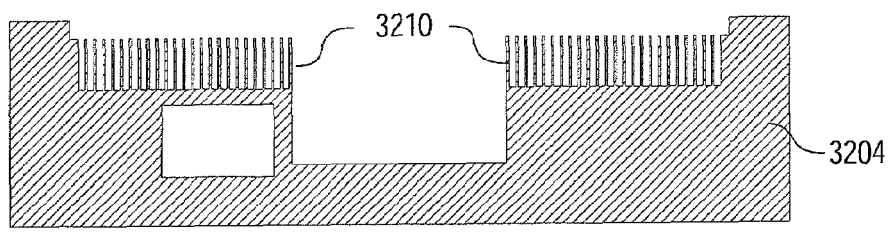

The first support layer includes a support pad 3204 on one side of axis 3206 and an opposing support pad 3208 on the other side of axis 3206. Stationary comb teeth 3210 extend from support pad 3204 toward support pad 3208, and stationary comb teeth 3212 extend form support pad 3208 toward support pad 3204. Stationary comb teeth 3210 and 3212 are used for generating rotation about axis 3206. For clarity, FIG. 32C shows mostly the components described in the present paragraph.

The first support layer further includes a first rotating frame 3214 consisting of two opposing U-shaped halves 3214A and 3214B. Halves 3214A and 3214B are electrically insulated from each other by trenches in the silicon. Stationary comb teeth 3215A extend from an inner left edge of half 3214A and rotating comb teeth 3215B extend from an inner right edge of half 3214B. Stationary comb teeth 3215A and 3215B are used for generating rotation about axis 3207.

A beam structure 3216 extends along axis 3206 from an outer right edge of frame 3214. Beam structure 3216 consists two parallel beams 3216A and 3216B. A spring 3221 extends along axis 3206 from the outer right edge of frame 3214 between beams 3216A and 3216B. Spring 3221 is connected to a spring pad 3222 also located between beams 3216A and 3216B. Similarly, a beam structure 3218 extends along rotational axis 3206 from an outer left edge of frame 3214. Beam structure 3218 consists two parallel beams 3218A and 3218B. A spring 3227 extends along axis 3206 from the outer left edge of frame 3214 between beams 3218A and 3218B. Spring 3227 is connected to a spring pad 3228 also located between beams 3218A and 3218B.

Figure 32D:
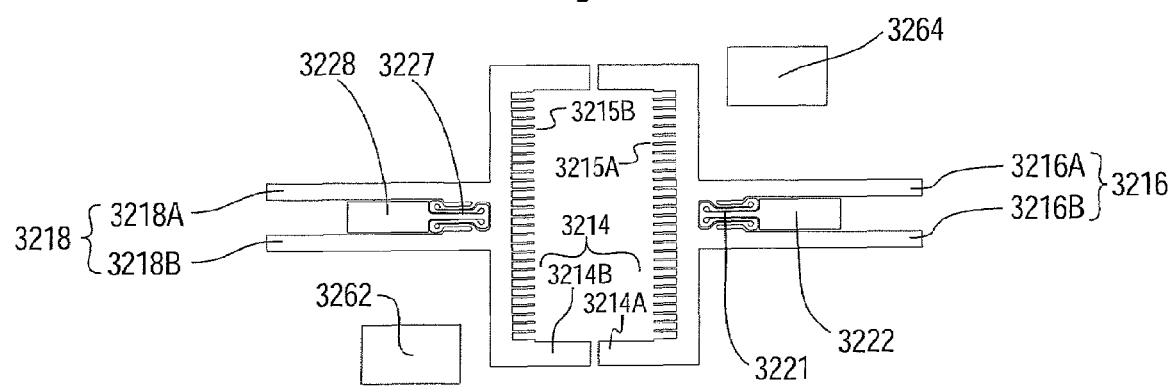

An electrically insulated bond pad 3262 is formed within pad 3208. Similarly, an electrically insulated bond pad 3264 is formed within pad 3204. For clarity, FIG. 32D shows mostly the components described in the present and the two preceding paragraphs.

Figure 33:
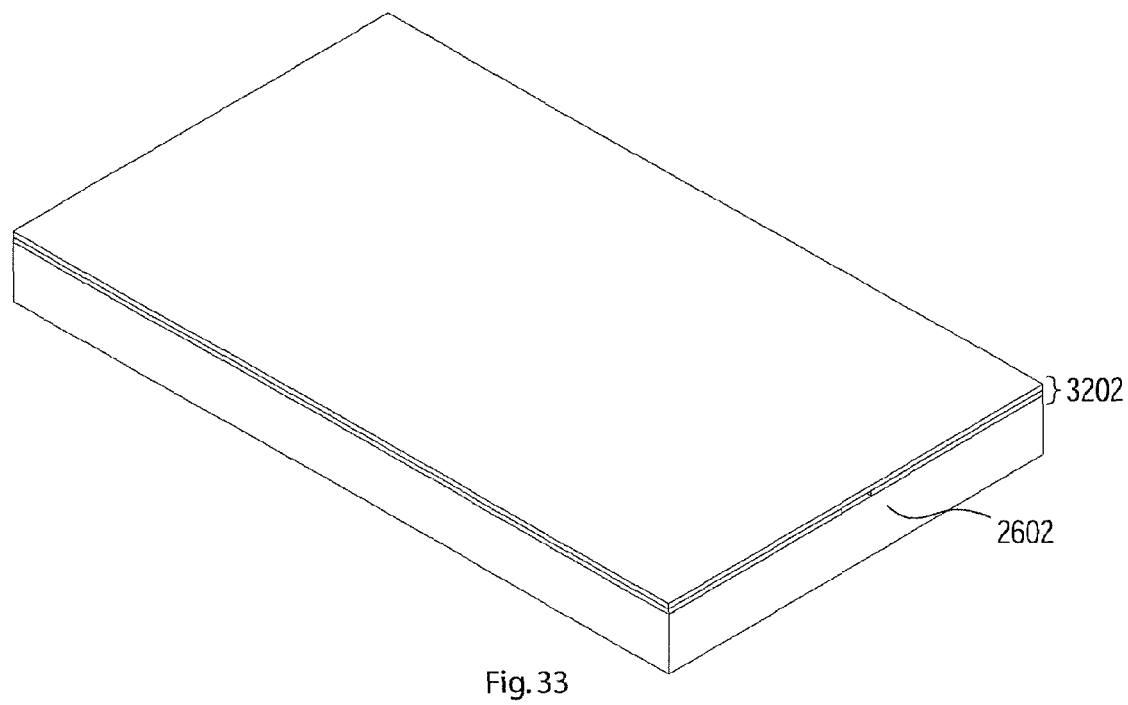

In FIG. 33, SOI wafer 3202 is turned upside down and the topside of SOI wafer 3202 is bonded to the topside of glass wafer 2602. Referring back to FIGS. 31 and 32A, support pads 3204 and 3208 of SOI wafer 3202 are bonded to support pad 2604 of glass wafer 2602. Furthermore, spring pads 3222 and 3228 of SOI wafer 3202 are bonded to spring pads 2608 and 2610 of glass wafer 2602, respectively. Stationary comb teeth 3210 and 3212 now extend over recess 2606. Rotating frame 3214 with beam structures 3216 and 3218 of SOI wafer 3202 are suspended over recess 2606 and mirror cavity 2612.

Figure 34A:
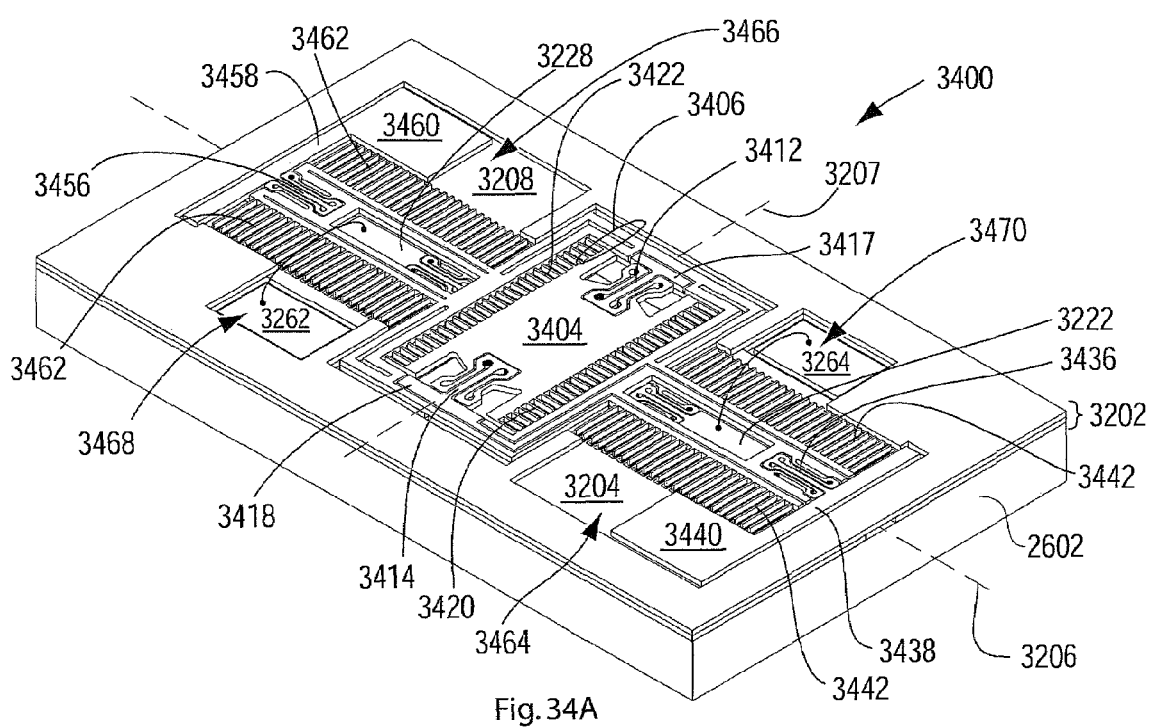
Figure 34B:
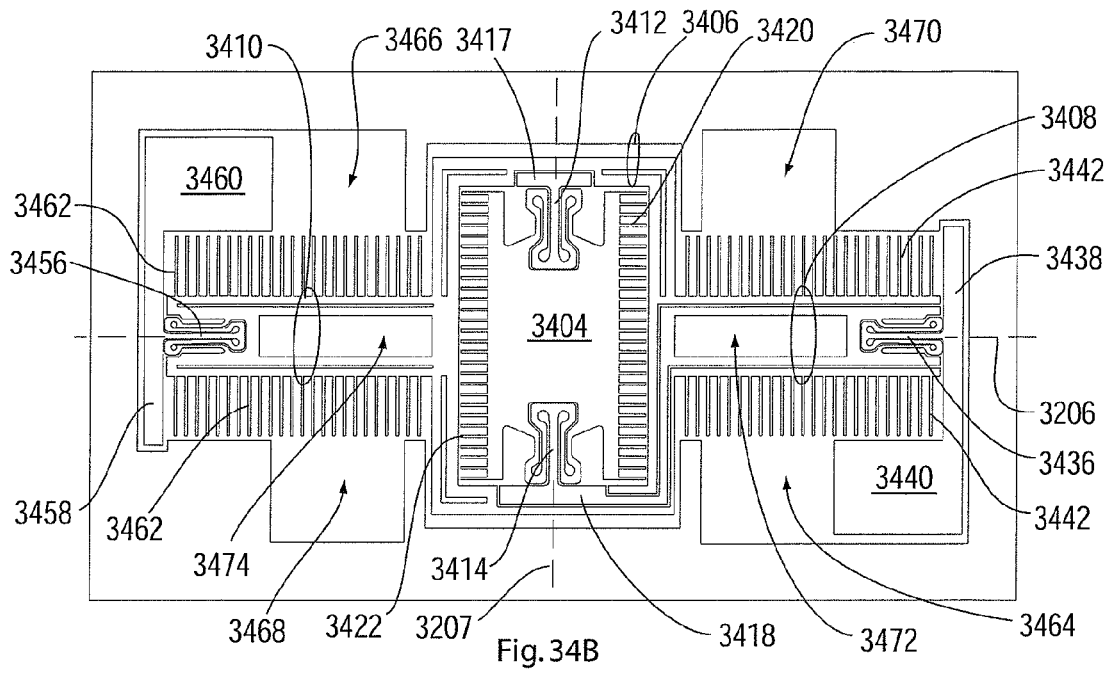

In FIGS. 34A and 34B, the backside of SOI wafer 3202 (the topside of the bonded structure) is etched down to the insulator to define a mirror 3404 within a second rotating frame 3406. Frame 3406 is generally rectangular and includes spring pads 3417 and 3418 that are electrically insulated from the remainder of the frame by trenches in the silicon.

Figure 34C:
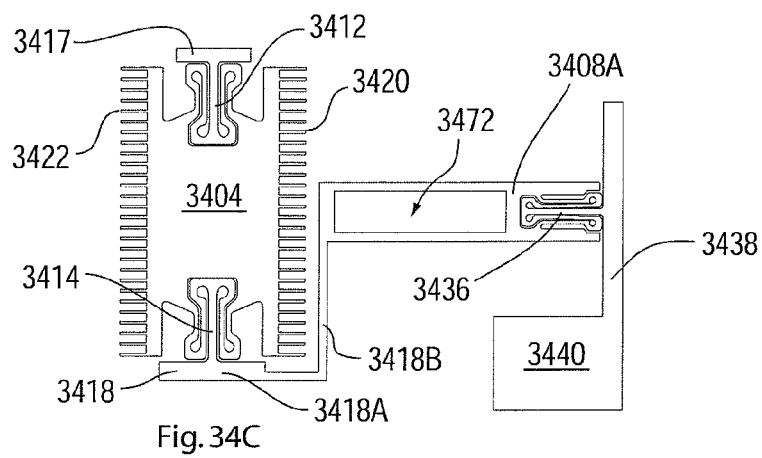
Figure 34D:
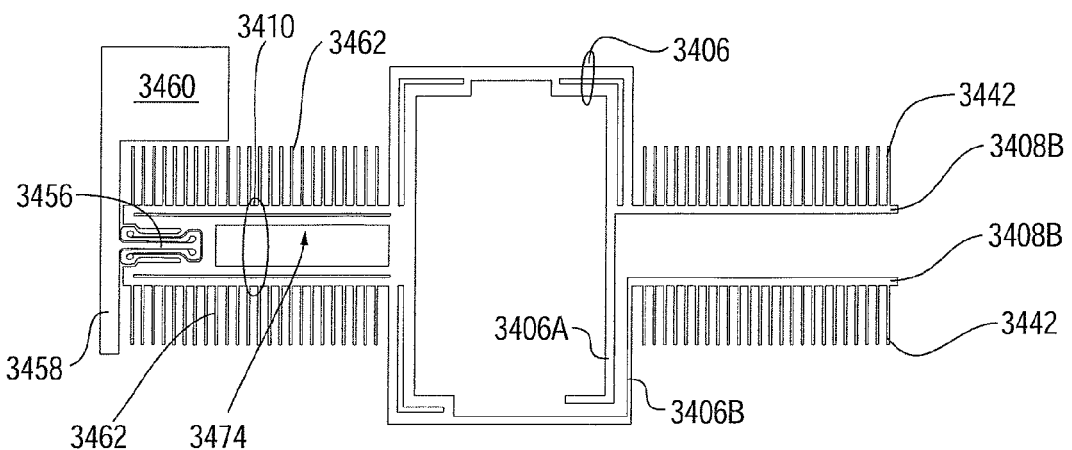

Mirror 3404 is connected by a spring 3412 to spring pad 3417, and by a spring 3414 to spring pad 3418. Spring pad 3418 has a horizontal section 3418A (FIG. 34C) and a vertical section 3418B (FIG. 34C). Rotating comb teeth 3420 extend from the outer right edge of mirror 3404 on one side of axis 3207 while rotating comb teeth 3422 extend from the outer left edge of mirror 3404 on another side of axis 3207. For clarity, FIG. 34C shows mostly the components described in the present paragraph.

A beam structure 3408 extends along axis 3206 from frame 3406. Beam structure 3408 has an inner beam 3408A (FIG. 34C) extending from an outer right edge of vertical section 3418B of spring pad 3418. Beam structure 3408 has outer parallel beams 3408B (FIG. 34D) extending from an outer right edge of frame 3406. Inner beam 3408A and outer beams 3408B are electrically insulated from each other by trenches in the silicon. Inner beam 3408A defines a window 3472 for spring pad 3222 (FIG. 32A) to receive a bond wire. A spring 3436 connects a distal end of beam structure 3408 to a spring pad 3438. Spring pad 3438 includes a large pad area 3440 for receiving a bond wire. Rotating comb teeth 3442 extend from outer top and outer bottom edges of outer beams 3408B on both sides of axis 3206.

Similarly, a second and opposite beam structure 3410 extends along axis 3206 from an outer left edge of frame 3406. Beam structure 3410 defines a window 3474 for spring pad 3228 (FIG. 32A) to receive a bond wire. A spring 3456 connects a distal end of beam 3410 to a spring pad 3458. Spring pad 3458 includes a large pad area 3460 for receiving a bond wire. Rotating comb teeth 3462 extend from outer top and outer bottom edges of beam structure 3410 on either side of axis 3206.

The device layer defines windows 3464 and 3466 to accommodate wire bond access to pads 3204 and 3208 (FIG. 32A) below, respectively. The device layer further defines windows 3468 and 3470 to accommodate wire bond access to pads 3262 and 3264 (FIG. 32A) below, respectively. In one embodiment, a wire bond is formed between spring pad 3222 and pad 3264, and a wire bond is formed between spring pad 3228 and pad 3262. This allows wire bonds to be made to the larger pads 3262 and 3264 to drive stationary comb teeth 3215A and 3215B below.

Frame 3406, including spring pads 3417 and 3418, coincide with frame 3214 in the topside of SOI wafer 3202. Beam structures 3408 and 3410 coincide with beam structures 3216 and 2318 in the topside of SOI wafer 3202. Spring pads 3438 and 3458 overlap support pads 3204 and 3208 in the topside of SOI wafer 3202. After the etching, exposed portions of the insulator are removed to allow frames 3406 and 3214 to rotate in unison about axis 3206 through the coupling of their springs to the spring pads. Furthermore, mirror 3404 rotates along axis 3207 through the coupling of springs 3412 and 3414 to spring pads 3417 and 3418.

To oscillate mirror 3404 about axis 3206, a varying voltage difference is applied between lower stationary comb teeth 3210/3212 and upper rotating comb teeth 3442/3462. Alternatively, a constant voltage difference is applied between lower stationary comb teeth 3210/3212 and upper rotating comb teeth 3442/3462 to rotate or translate mirror 3404 to a fixed position. The same voltage or different voltages may be applied to lower stationary comb teeth 3210 and 3212 through windows 3464 and 3466, respectively, from the top surface of the bonded structure. A voltage is applied to upper rotating comb teeth 3442 and 3462 through pad area 3460.

To oscillate mirror 3404 about axis 3207, a varying voltage difference is applied between lower stationary comb 3215A/B and upper rotating comb teeth 3420/3422. Alternatively, a constant voltage difference is applied between lower stationary comb teeth 3215A/B and upper rotating comb teeth 3420/3422 to rotate or translate mirror 3404 to a fixed position. The same voltage or different voltages may be applied to lower stationary comb teeth 3215A and 3215B through exposed spring pads 3222 and 3228, respectively. Alternatively, the same voltage or different voltages may be applied to lower stationary comb teeth 3215A and 3215B through exposed pads 3262 and 3264 if wire bonds are formed between pads 3262 and 3264 with spring pads 3222 and 3228, respectively. A voltage is applied to upper rotating comb teeth 3420 and 3422 through pad area 3440.

Figure 35:
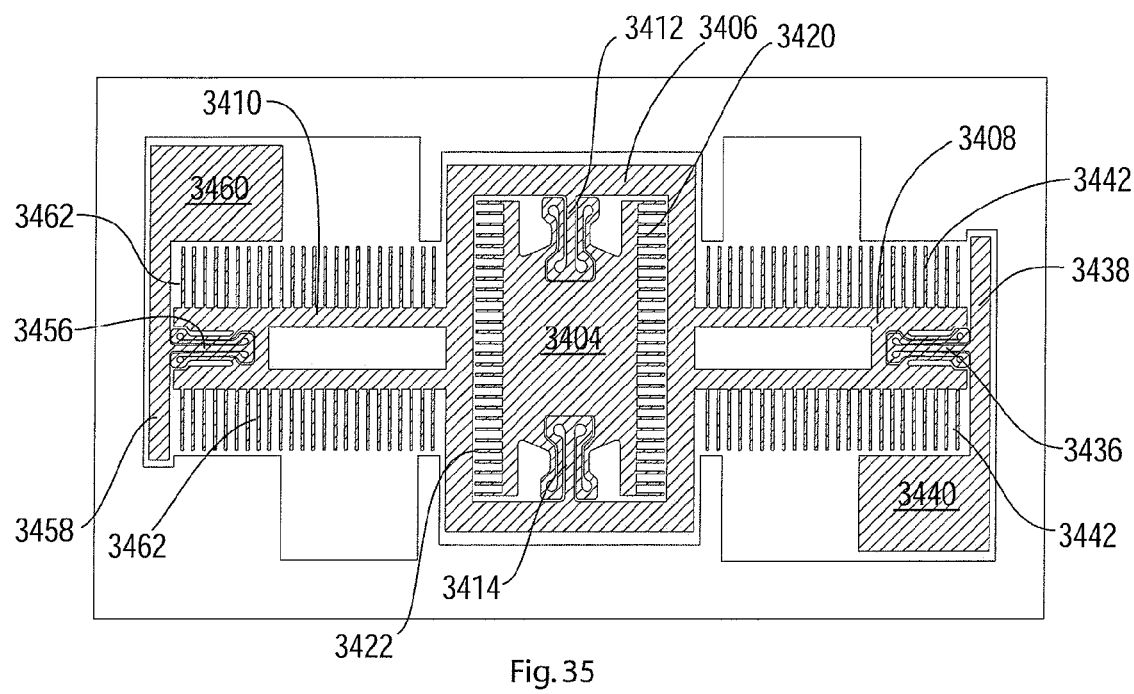
FIG. 35 illustrates an alternative device layer to that shown in FIGS. 34B to 34D in one embodiment of the invention.

FIG. 35 illustrate another embodiment of device 3400 where the backside of SOI wafer 3202 (the topside of the bonded structure) is etched different so that all the upper rotating comb teeth are electrically connected. Specifically, mirror 3404 is now coupled by springs 3412 and 3414 to frame 3406, and beam 3408 now extends from an outer right edge of frame 3406.

To oscillate mirror 3404 about axis 3206, a varying voltage difference is applied between lower stationary comb 3210/3212 and upper rotating comb teeth 3442/3462. Alternatively, a constant voltage difference is applied between lower stationary comb 3210/3212 and upper rotating comb teeth 3442/3462 to rotate or translate mirror 3404 to a fixed position. The same voltage or different voltages may be applied to lower stationary comb teeth 3210 and 3212. A voltage is applied to upper rotating comb teeth 3442 and 3462 through pad area 3440 or 3460.

To oscillate mirror 3404 about axis 3207, a varying voltage difference is applied between lower stationary comb 3215A/B and upper rotating comb teeth 3420/3422. Alternatively, a constant voltage difference is applied between lower stationary comb 3215A/B and upper rotating comb teeth 3420/3422 to rotate or translate mirror 3404 to a fixed position. The same voltage or different voltages may be applied to lower stationary comb teeth 3215A and 3215B. A voltage is applied to upper rotating comb teeth 3420 and 3422 through pad area 3440 or 3460.

Figure 36:
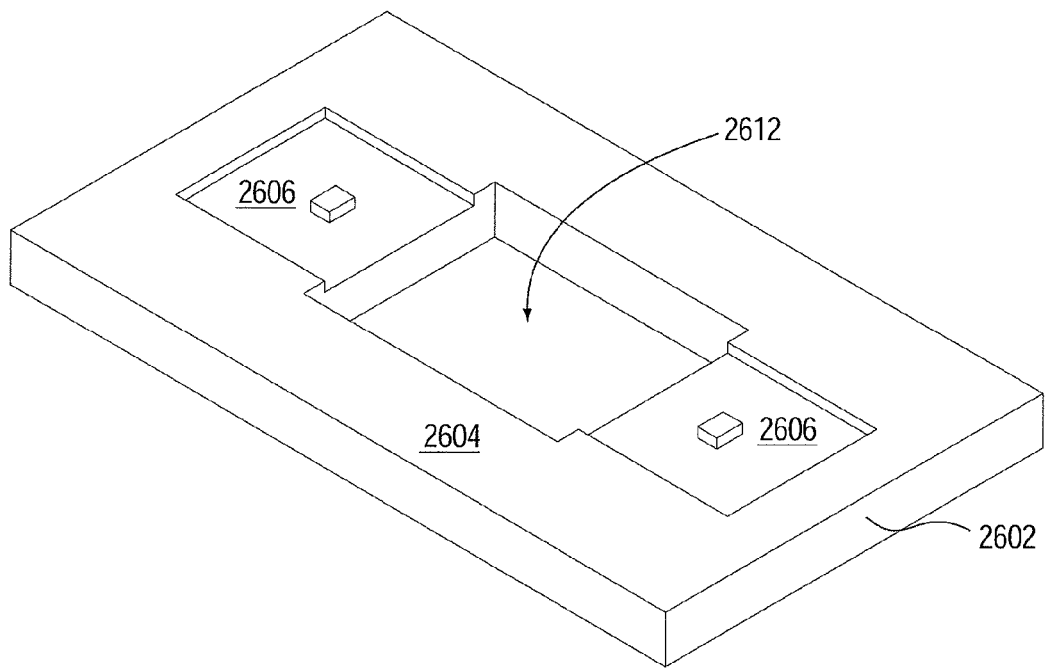
FIGS. 36, 37, 38, 39A, 39B, 39C, and 39D illustrate a process for constructing a MEMS device from a SOI wafer and a glass wafer in one embodiment of the invention.
Figure 37:
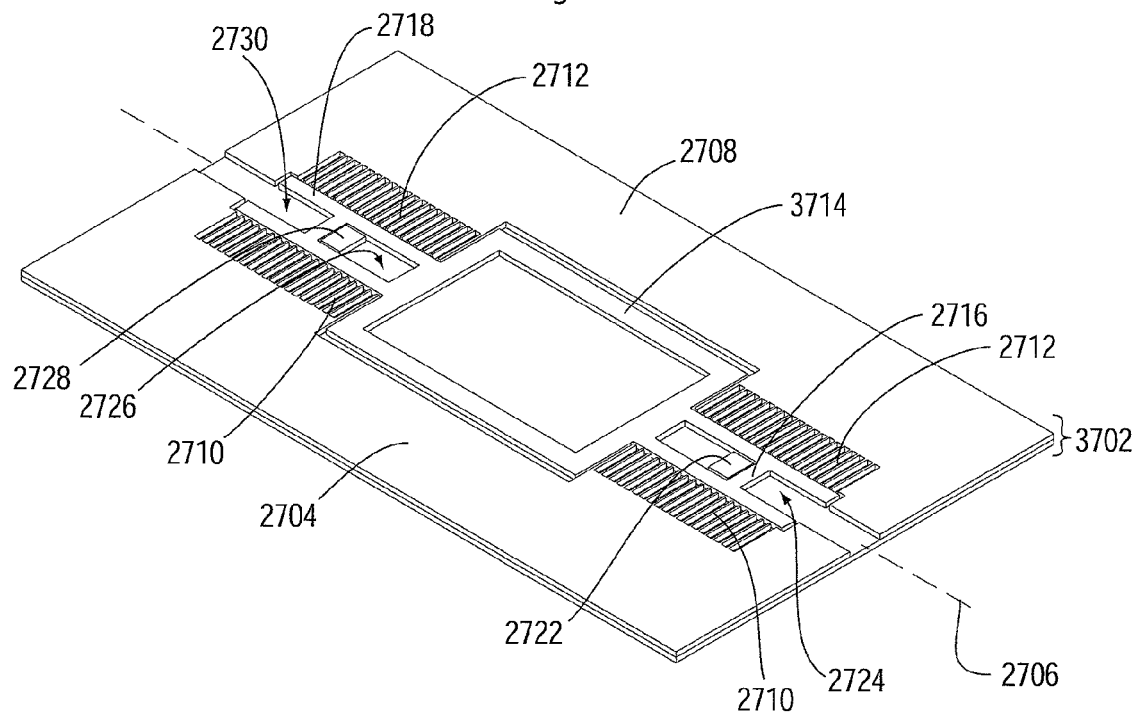

FIGS. 36, 37, 38, 39A, 39B, 39C, and 39D illustrate a process for constructing a MEMS device 3900 (FIG. 39A) with vertical comb teeth for generating a large rotation about an axis and in-plane comb teeth for generating smaller rotation about the axis in one embodiment of the invention. In MEMS device 3900, the topside of an SOI wafer 3702 (FIG. 37) is etched down to the insulator (e.g., silicon oxide) to form a first support layer having support pads, a first rotating frame, and a first set of stationary comb teeth for generating rotation about axis 2706 (FIG. 37). SOI wafer 3702 is then turned upside down and bonded with a glass wafer 2602 (FIG. 36), which forms a second support layer. The backside of SOI wafer 3702, now the topside of the bonded structure, is then etched down to the insulator to form a device layer having a second rotating frame above the first rotating frame, a mirror within the second rotating frame, a first set of rotating comb teeth for generating rotation about axis 2706, a second sets of rotating comb teeth and a second set of stationary comb teeth for generating additional rotation about axis 2706.

In FIG. 36, the topside of glass wafer 2602 is processed to define the second support layer on top of which SOI wafer 3702 is bonded. This is the same as the process shown in FIG. 26 except that mirror cavity 2616 is elongated to accommodate a different design for the first rotating frame, the second rotating frame, and the mirror.

In FIG. 37, the topside of SOI wafer 3702 is etched down to the insulator, which acts as an etch stop, to define the first support layer. This is the same as the process shown in FIG. 27A except rotating frame 2714 has been replaced with rotating frame 3714. Note that rotating frame 3714 is essentially rotating frame 2714 rotated orthogonally.

Figure 38:
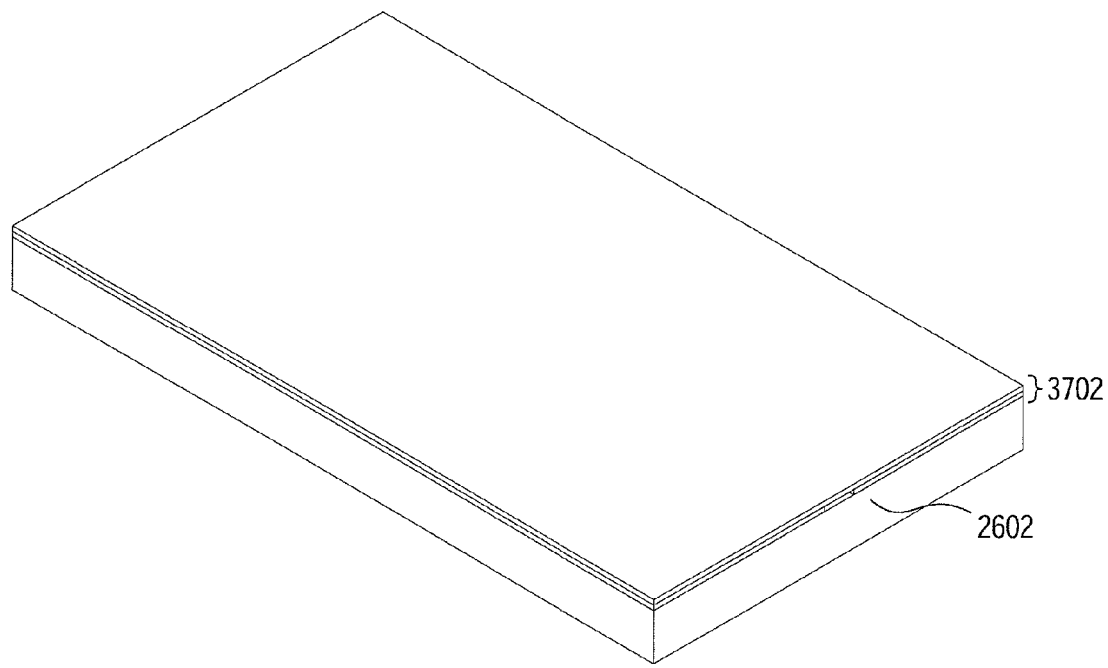

In FIG. 38, SOI wafer 2702 is turned upside down and the topside of SOI wafer 2702 is bonded to the topside of glass wafer 2602. This is the same as the process shown in FIG. 28.

Figure 39A:
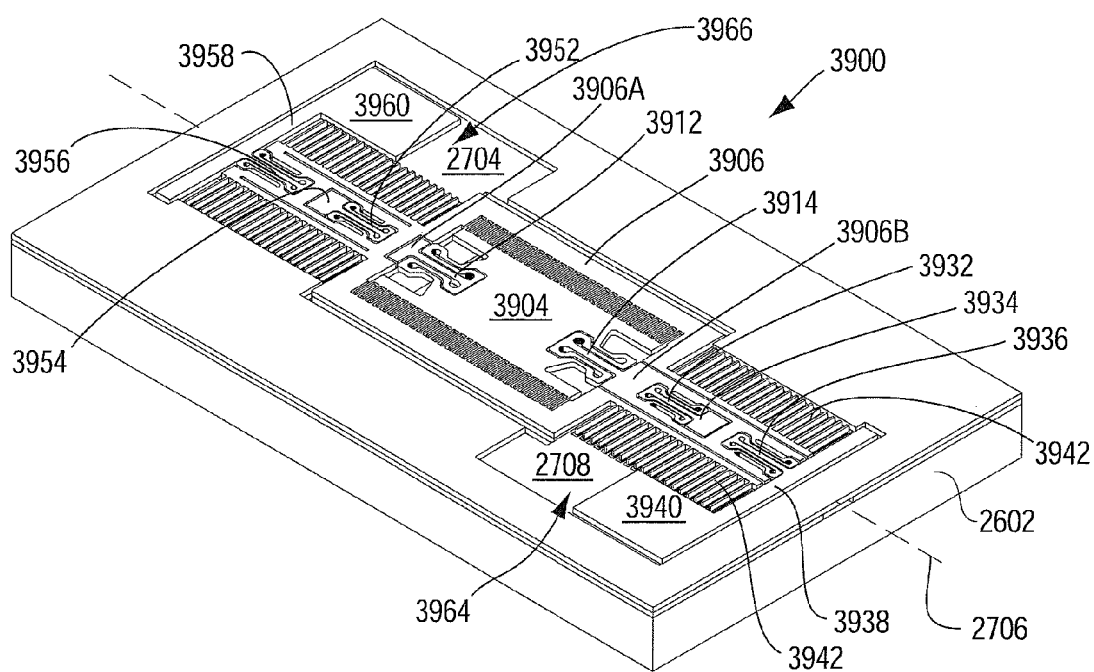
Figure 39B:
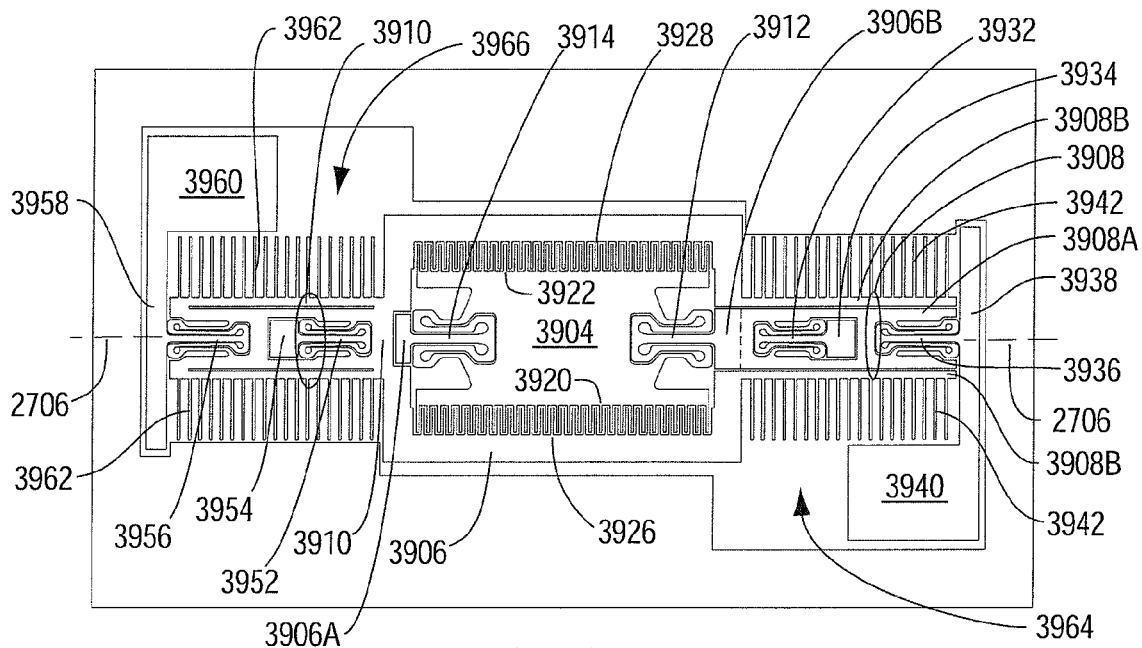

In FIGS. 39A and 39B, the backside of SOI wafer 3702 (the topside of the bonded structure) is etched down to the insulator to define the device layer. This is similar to the process shown in FIG. 29A except rotating frame 2906 and mirror 2904 have been replaced with rotating frame 3906 and mirror 3904. Note that rotating frame 3906 and mirror 3904 are essentially rotating frame 2906 and mirror 2904 rotated orthogonally.

The device layer includes mirror 3904 within rotating frame 3906. Frame 3906 includes electrically insulated spring pads 3906A and 3906B.

Mirror 3904 is connected by springs 3912 and 3914 along axis 2706 to spring pads 3906A and 3906B, respectively. Rotating comb teeth 3920 extend along a bottom edge of mirror 3904 on one side of axis 2706 while rotating comb teeth 3922 extend along a top edge of mirror 3904 on the other side of axis 2706. For clarity, FIG. 39C shows mostly the components described in the present paragraph.

Figure 39C:
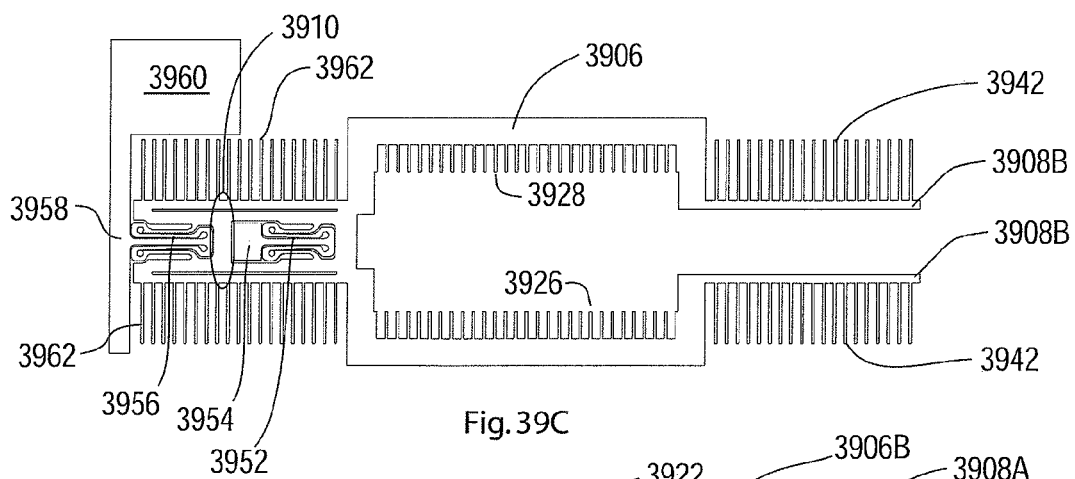
Figure 39D:
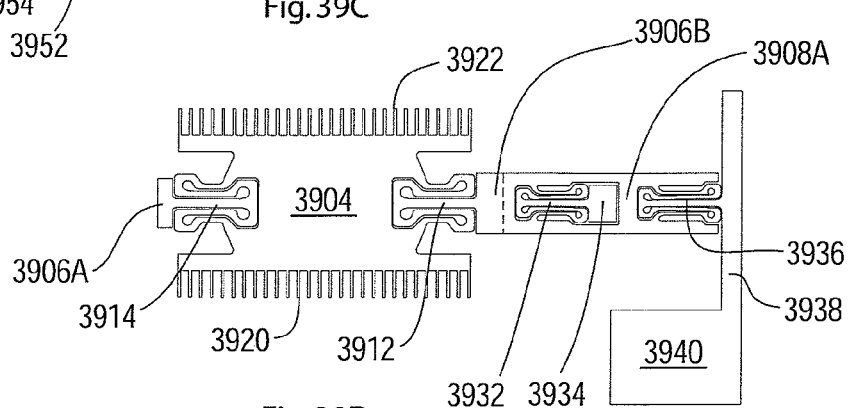

Referring to FIGS. 39B, 39C, and 39D, stationary comb teeth 3926 extend from an inner bottom edge of frame 3906 to be interdigitated in-plane with rotating comb teeth 3920. Stationary comb teeth 3928 extend from an inner top edge of inner frame 3906 to be interdigitated in-plane with rotating comb teeth 3922. Comb teeth 3926, 3928, 3920, and 3922 are used to generate smaller rotations of mirror 3094 about axis 2706.

A first beam structure 3908 extends along axis 2706 from an outer right edge of frame 3906. Beam structure 3908 has an inner beam 3908A extending from spring pad 3906B. Beam structure 3908 has outer beams 3908B extending from an outer right edge of frame 3906. Inner beam 3908A and outer beams 3908B are electrically insulated from each other by trenches in the silicon. Within an opening in inner beam 3908A, a spring 3932 connects beam structure 3908 to a spring pad 3934 along axis 2706. A spring 3936 connects the distal end of beam structure 3908 to a spring pad 3938. Spring pad 3938 includes a large pad area 3940 for receiving a bond wire. Rotating comb teeth 3942 extend from outer top and outer bottom edges of outer beams 3908B on both sides of axis 2706.

Similarly, a second beam structure 3910 extends along axis 2706 from an outer left edge of frame 3906. Within an opening in beam structure 3910, a spring 3952 connects beam structure 3910 to a spring pad 3954 along axis 2706. A spring 3956 connects the distal end of beam structure 3910 to a spring pad 3958 along axis 2706. Spring pad 3958 includes a large pad area 3960 for receiving a bond wire. Rotating comb teeth 3962 extend from outer top and outer bottom edges of beam structure 3910 on both sides of axis 3706. Upper rotating comb teeth 3942 and 3962 are interdigitated out-of-plane with lower stationary comb teeth 2710 and 2712 to generate larger rotations of mirror 3904 about axis 2706. The device layer defines windows 3964 and 3966 for accommodating wire bond access to pads 2704 and 2708 below.

Frame 3906, including spring pads 3906A and 3906B, coincide with frame 3714 in the topside of SOI wafer 3702. Beam structures 3908 and 3910 coincide with beam structures 2716 and 2718 in the topside of SOI wafer 3702. Spring pads 3934 and 3954 coincide with spring pads 2722 and 2728 in the topside of SOI wafer 3702. Spring pads 3938 and 3958 overlap support pads 2704 and 2708 in the topside of SOI wafer 3702. After the etching, exposed portions of the insulator are removed to allow frames 3906 and 2714 to rotate in unison about axis 2706 through the coupling of their springs to the spring pads. Furthermore, mirror 3904 is able to further rotate about axis 2706 through the coupling of springs 3912 and 3914 to spring pads 3906A and spring pad 3906B.

To rotate mirror 3904 to a fixed position, a steady voltage difference is applied between lower stationary comb teeth 2710/2712 and upper rotating comb teeth 3942/3962. The same voltage or different voltages may be applied to lower stationary comb teeth 2710 and 2712 through windows 3964 and 3966 on the top surface of the bonded structure. A voltage is applied to upper rotating comb teeth 3942 and 3962 through pad area 3960.

To oscillate mirror 3904, a varying voltage difference is applied between upper stationary comb teeth 3926/3928 and upper rotating comb teeth 3920/3922. A voltage is applied to upper stationary comb teeth 3926 and 3928 through pad area 3960. A voltage is applied to upper rotating comb teeth 3920 and 3922 through pad area 3940. As can be seen, the same voltage is applied to upper rotating comb teeth 3920/3922 and upper rotating comb teeth 3942/3962 through pad area 3960.

FIGS. 40, 41, 42, 43, and 44 illustrate a process for constructing a MEMS device 400 (FIG. 44) with in-plane comb teeth in one embodiment of the invention. This process is similar to the process shown in FIGS. 1A, 2A, 3A, and 4A except that the backside of silicon wafer 102 is etched before the topside of silicon wafer 102 is bonded to glass wafer 202.

Figure 40:
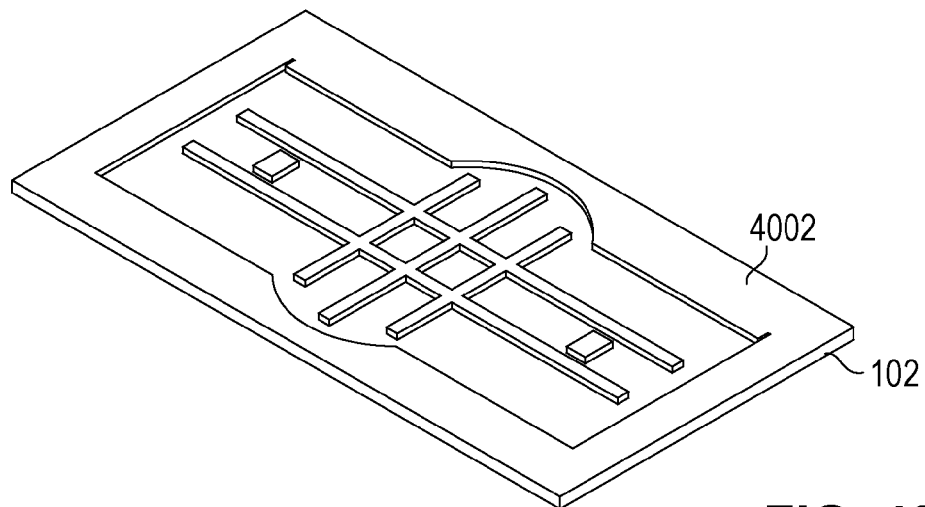
FIGS. 40, 41, 42, 43, and 44 illustrate another process for constructing a MEMS device with in-plane comb teeth from a silicon wafer and a glass wafer in one embodiment of the invention.

In FIG. 40, the topside of silicon wafer 102 is etched to approximately half of its thickness to define the first support layer as similarly described above with regards to FIG. 1A. Instead of individual spring pads 110 and 112 and asymmetric support pads 114 and 116, a perimeter pad 4002 is formed around the perimeter of the topside of silicon wafer 102. Perimeter pad 4002 will be later etched to separate spring pads 110 and 112 and asymmetric support pads 114 and 116. Perimeter pad 4002 is used to hold together the elements of silicon wafer 102 until silicon wafer 102 is bonded to glass wafer 202.

Figure 41:
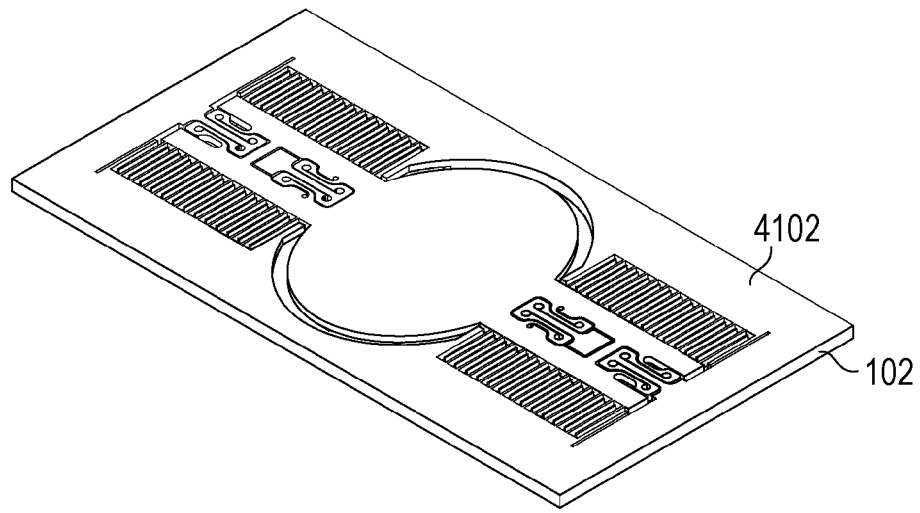

In FIG. 41, the backside of silicon wafer 102 is etched to define a device layer as similarly described above regarding FIG. 4A. Instead of individual spring pads 408 and 418 and stationary pads 430 and 434, a perimeter pad 4102 is formed around the perimeter of the backside of silicon wafer 102. Perimeter pad 4102 coincides with perimeter pad 4002 on the topside of silicon wafer 102. Perimeter pad 4002/4102 are later etched to separate pads 110/408, 112/418, 114/430, and 116/434. Perimeter pad 4002/4102 is used to hold together the elements of silicon wafer 102 until silicon wafer 102 is bonded to glass wafer 202.

Figure 42:
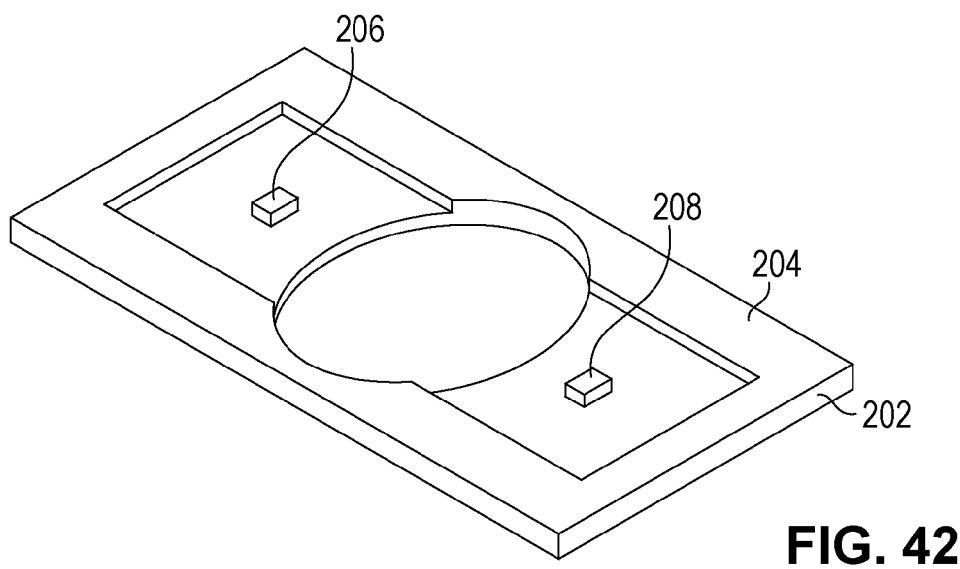

In FIG. 42, the topside of glass wafer 202 is processed to define the second support layer on top of which the first support layer is to be bonded as described above with regards to FIG. 2A.

Figure 43:
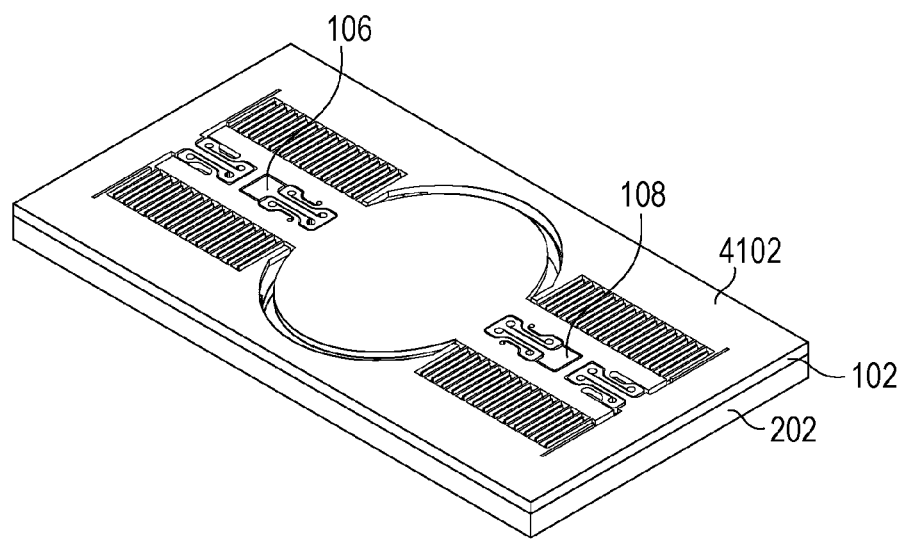

In FIG. 43, the topside of silicon wafer 102 is bonded to the topside of glass wafer 202 as similar described above with regards to FIG. 3A. Specifically, perimeter pad 4002 (FIG. 40) of silicon wafer 102 is bonded to perimeter pad 204 (FIG. 42) of glass wafer 202. Furthermore, pads 106 and 108 of silicon wafer 102 are bonded to pads 206 and 208 (FIG. 42) of glass wafer 202.

Figure 44:
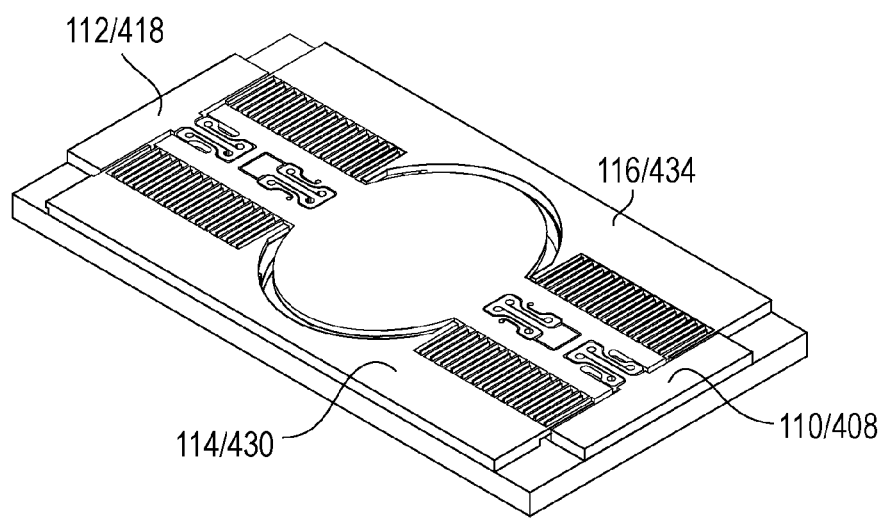

In FIG. 44, the topside of silicon wafer 102 is etched to separate pads 110/408, 112/418, 114/430, and 116/434 from perimeter pad 4102. This results in the same structure as shown in FIG. 4A as described above.

Although FIGS. 40, 41, 42, 43, and 44 illustrate a process for constructing MEMS device 400 (FIG. 4A), the same principle can be applied to the other MEMS devices described in the present disclosure. Specifically, in these other MEMS devices, the backside of the silicon wafer/SOI wafer can be first etched and then bonded to the support wafer. Again, a perimeter pad is used to hold various elements in the silicon/SOI wafer together and then later etched to separate the components after the silicon/SOI wafer has been bonded to the support wafer.

Figure 45:
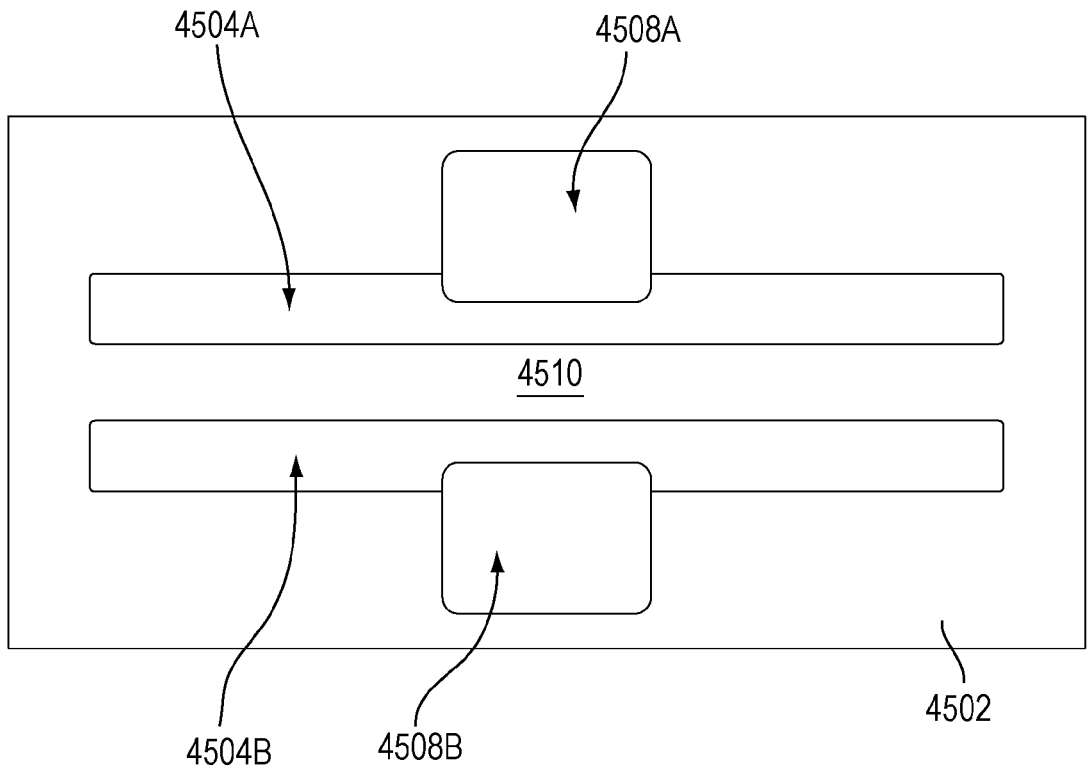
FIGS. 45, 46, 47, and 48 illustrate support substrates for the MEMS devices in embodiments of the invention.
Figure 46:
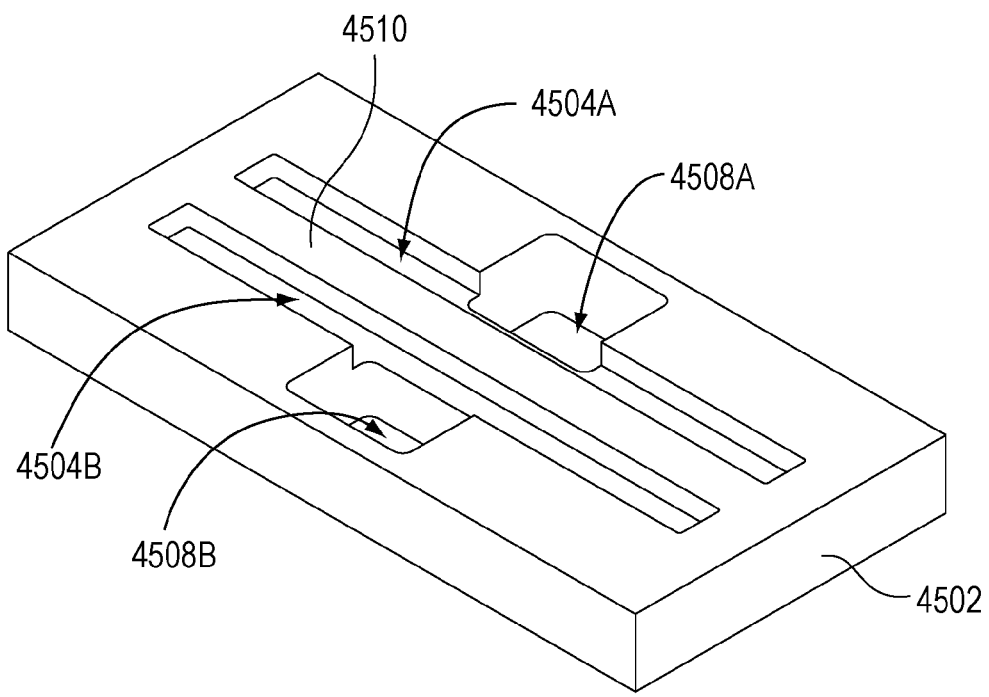

FIGS. 45 and 46 illustrate a glass wafer 4502 in one embodiment of the invention. Glass wafer 4502 can be used instead of glass wafers 202 (FIG. 2A), 1102 (FIG. 11), and 2602 (FIG. 26) in the devices described above. Glass wafer 4502 is processed to form two rectangular recesses 4504A and 4504B along the length of glass wafer 4502. Furthermore, glass wafer 4502 is processed to form two mirror cavities 4508A and 4508B near the midsection of glass wafer 4502.

Mirror cavities 4508A and 4508B and recesses 4504A and 4504B accommodate the rotation of the mirror and its beam structures in the silicon/SOI wafer. Note that mirror cavities 4508A and 4508B do not need to match the shape of the mirror. They only need to accommodate for the motion of the tips of the mirror because they have the most vertical travel into glass wafer 4502 during rotation. Surface 4510 between recesses 4504A and 4504B provides the mounting surface for spring pads from the silicon/SOI wafer. Surface 4510 is large so that it can be easily aligned with the spring pads. Less refined processes, including sandblasting, laser cutting, wet etching, and dry etching can be used to process glass wafer 4502 since it has rough features compared to the features on the silicon/SOI wafer.

Figure 47:
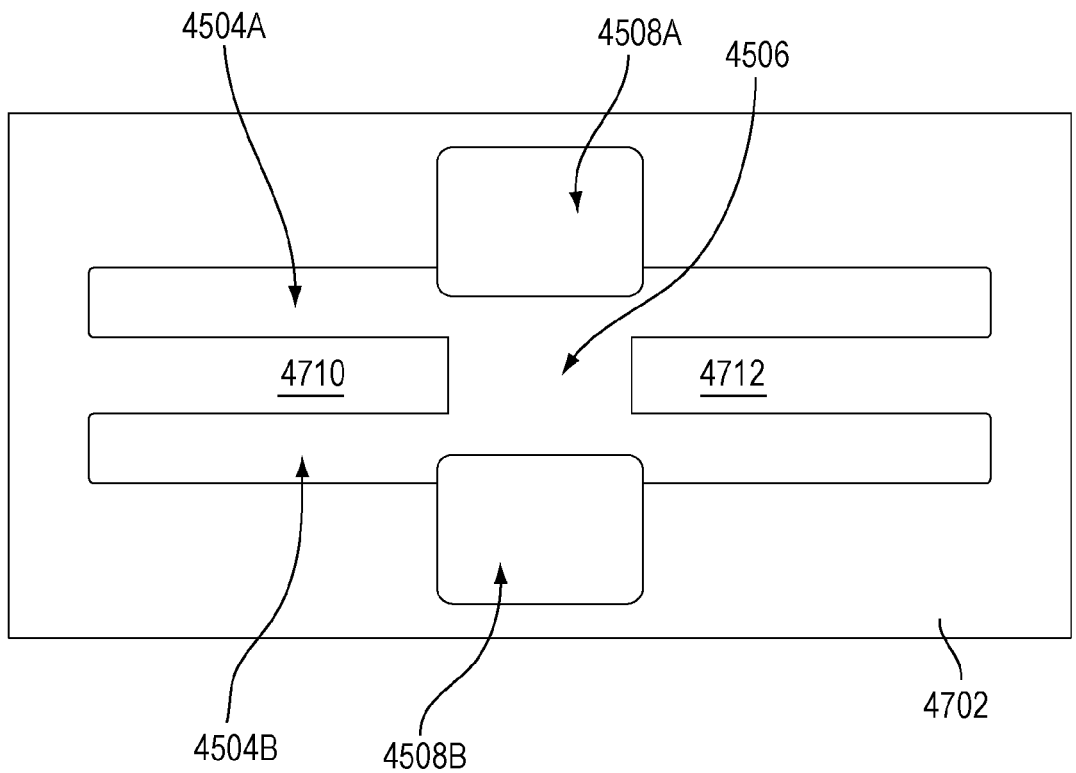
Figure 48:
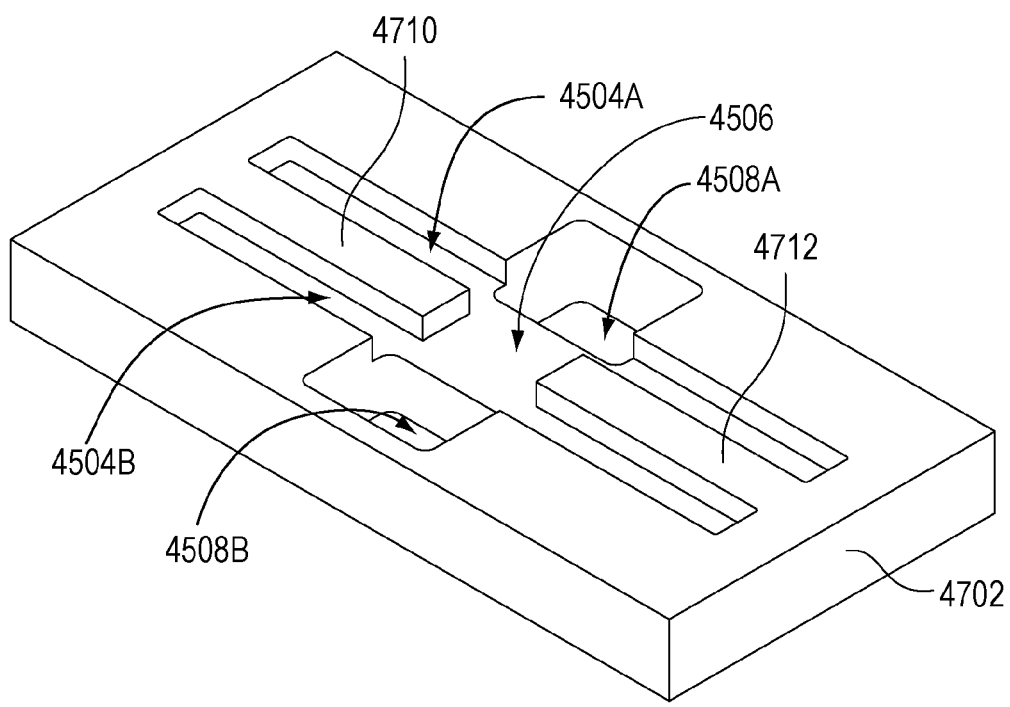

FIGS. 47 and 48 illustrate a glass wafer 4702 in one embodiment of the invention. Glass wafer 4702 can be used instead of glass wafers 4702 (FIG. 2A), 1102 (FIG. 11), and 2602 (FIG. 26) in the devices described above. Glass wafer 4702 is processed to form an H-shaped recess consisting of two rectangular recesses 4504A and 4504B along the length of glass wafer 4702 and a rectangular recess 4506 along the width of glass wafer 4702 across recesses 4504A and 4504B. Furthermore, glass wafer 4702 is processed to form two mirror cavities 4508A and 4508B on both sides of recess 4506 near the midsection of glass wafer 4702.

Recess 4506 provides the separation between the topside of glass wafer 4702 from a stiffening structure on a mirror in the topside of the silicon/SOI wafer to be mounted on glass wafer 4702. This allows the mirror to rotate freely. If the stiffening structure is absent, recess 4506 may also be absent. Mirror cavities 4508A and 4508B and recesses 4504A and 4505B accommodate the rotation of the mirror and its beam structures in the silicon/SOI wafer. Note that mirror cavities 4508A and 4508B do not need to match the shape of the mirror. Instead, they only need to accommodate for the motion of the tips of the mirror because they have the most vertical travel into glass wafer 4702 during rotation. Surfaces 4710 and 4712 between recesses 4504A and 4504B provide the mounting surface for spring pads from the silicon/SOI wafer. Surfaces 4710 and 4712 are large so that they can be easily aligned with the spring pads. Less refined processes, including sandblasting, laser cutting, wet etching, and dry etching can be used to process glass wafer 4702 since it has rough features compared to the features on the silicon/SOI wafer.

Figure 49:
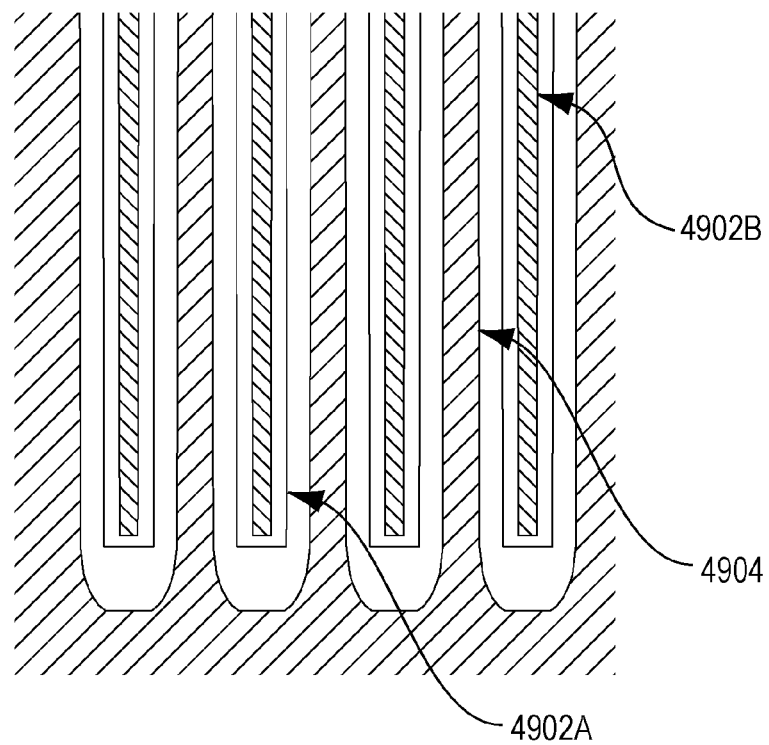
FIGS. 49 and 50 illustrate vertical comb teeth for the MEMS devices in one embodiment of the invention.
Figure 50:
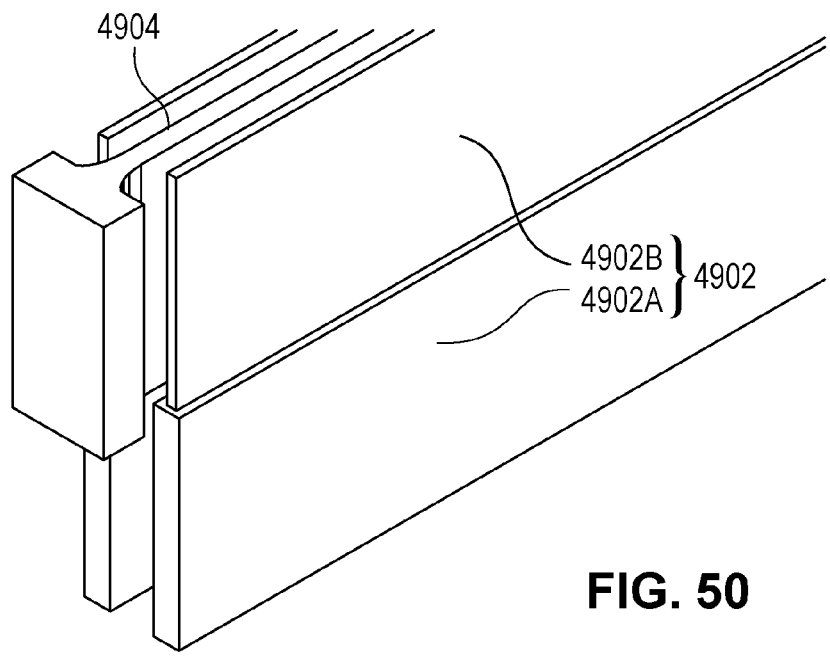

FIGS. 49 and 50 illustrate stationary comb teeth 4902 (only one is labeled) and rotating comb teeth 4904 (only one is labeled) in one embodiment of the invention. Comb teeth 4902 and 4904 can be used instead of the vertical comb teeth in the devices described above. To make comb teeth 4902, a silicon/SOI wafer is etched on one side to approximately half of its thickness to form lower stationary comb teeth 4902A. The silicon/SOI wafer is then etched on the other side to approximately half of its thickness to form rotating comb teeth 4904 that extend from beam structures of a mirror. This etching also forms top stationary comb teeth 4902B that are in-plane with rotating comb teeth 4904. Top stationary comb teeth 4902B extend upward from lower stationary comb teeth 4902A and together they forms stationary comb teeth 4902. Top stationary comb teeth 4902B are thinner than lower stationary comb teeth 4902A and rotating comb teeth 4904.

Without top stationary comb teeth 4902B, the gap between adjacent rotating comb teeth 4904 may be much larger than the finer features that are etched in the same process. This makes it difficult to control the etching of rotating comb teeth 4904 since it would etch faster than the other finer features etched in the same step. By including top stationary comb teeth 4902B between rotating comb teeth 4904, the gap between rotating comb teeth 4904 and its adjacent structure is made similar to the other finer features. This will slow down the etching of rotating comb teeth 4904 to match the etching the other finer features etched in the same step.

Note that the gap between rotating comb teeth 4904 and lower stationary comb teeth 4902A is smaller than the gap between rotating comb teeth 4904 and top stationary comb teeth 4902B. Thus, the electrostatic force between the mirror rotating comb teeth 4904 and lower stationary comb teeth 4902A is stronger than the electrostatic force between rotating comb teeth 4904 and top stationary comb teeth 4902B. Thus, the mirror will continued to be driven by voltage differences between rotating comb teeth 4904 and lower stationary comb teeth 4902A.

Various other adaptations and combinations of features of the embodiments disclosed are within the scope of the invention.

The invention claimed is:

1. A method for forming a MEMS (micro-electro-mechanical system) device, comprising:
   etching a first surface of a device wafer to form a plurality of first spring pads;
   bonding the first surface of the device to a surface of a support wafer; and
   etching a second surface on the other side of the device wafer to form a mirror, a plurality of second spring pads, and a plurality of springs coupling the mirror to the second spring pads, wherein said etching a second surface comprises looking through the support wafer for features formed on the first surface and directly aligning features to be formed on the second surface with the features on the first surface.

2. The method of claim 1, wherein the second spring pads on the second surface of the device wafer coincide with the first spring pads on the first surface of the device wafer.

3. The method of claim 1, wherein said etching a second surface of the device wafer further forms:
   a beam structure extending from the mirror, the springs connecting the beam structure to the second spring pads; and
   a plurality of rotating comb teeth extending from the beam structure.

4. The method of claim 3, wherein at least one spring is located between the mirror and another spring, and at least one spring and at least one second spring pad are located within the beam structure.

5. The method of claim 3, wherein said etching a second surface of the device wafer further forms a plurality of stationary comb teeth extending from a stationary pad, the stationary comb teeth being interdigitated in-plane with the rotating comb teeth.

6. The method of claim 1, wherein a first etch rate of said etching a first surface of the device wafer is at least 2 times greater than a second etch rate of said etching a second surface of the device wafer.

7. The method of claim 6, wherein the device wafer is selected from the group consisting of (1) a wafer consisting of a single silicon layer and (2) a silicon-on-insulator wafer.

8. The method of claim 3, prior to said bonding, further comprising:
   processing the support wafer to form a plurality of support pads on the support wafer, wherein said bonding comprises bonding the first spring pads to the support pads.

9. The method of claim 8, wherein the support pads are larger than the first spring pads.

10. The method of claim 8, wherein said processing the support wafer further forms a cavity in the support wafer, the mirror in the device wafer being located opposite the cavity in the support wafer.

11. The method of claim 8, wherein said processing the support wafer further forms a recess in the support wafer, wherein at least one of the support pads is located in the recess.

12. The method of claim 11, wherein said processing the support wafer further forms a cavity through the recess in the support wafer, wherein the mirror in the device wafer is located opposite the cavity in the support wafer.

13. The method of claim 10, 11, or 12, wherein said processing the support wafer comprises a process selected from the group consisting of sandblasting, laser cutting, wet etching, and dry etching.

14. The method of claim 10, wherein said etching a first surface of the device wafer further forms a stiffening structure, at least part of the stiffening structure being located opposite the cavity in the support wafer, the mirror on the second surface of the device wafer overlapping at least part of the stiffening structure on the first surface of the device wafer.

15. The method of claim 14, wherein said etching a first surface of the device wafer further forms a plurality of stationary comb teeth extending from a support pad, the plurality of stationary comb teeth interdigitated out-of-plane with the plurality of rotating comb teeth.

16. The method of claim 15, wherein said etching a second surface of the device wafer further forms another plurality of stationary comb teeth, the another plurality of stationary comb teeth being interdigitated in-plane with the plurality of rotating comb teeth.

17. The method of claim 12, wherein:
   said etching a first surface of the device wafer further forms a stiffening structure comprising crossbeams, the crossbeams being located opposite the cavity and the recess in the support wafer; and
   the mirror and the beam structure on the second surface of the device wafer overlapping the crossbeams on the first surface of the device wafer.

18. The method of claim 17, wherein said etching a first surface of the device wafer further forms a plurality of stationary comb teeth extending from a support pad, the plurality of stationary comb teeth being interdigitated out-of-plane with the plurality of rotating comb teeth.

19. The method of claim 18, wherein said etching a second surface of the device wafer further forms another plurality of stationary comb teeth, the another plurality of stationary comb teeth being interdigitated in-plane with the plurality of rotation comb teeth.

20. The method of claim 3, wherein:
   said etching a first surface of the device wafer further forms a support pad;
   said etching a second surface of the device wafer further forms a plurality of stationary comb teeth extending from a stationary pad, the stationary pad overlapping the support pad on the first surface of the device wafer; and
   the support pad is electrically connected to the stationary pad to assert physical influence on oscillation of the mirror.

21. The method of claim 20, wherein:
   said etching a first surface of the device wafer further forms another support pad, the support pad and the another support pad being asymmetrically about a rotational axis of the mirror;
   said etching a second surface of the device wafer further forms another plurality of stationary comb teeth extending from another stationary pad, the another stationary pad overlapping the another support pad on the first surface of the device wafer; and the another support pad is electrically connected to the another stationary pad to assert physical influence on oscillation of the mirror.

22. The method of claim 3, wherein:
the device wafer comprises a silicon-on-insulator (SOI) wafer;
said etching a first surface of the device wafer further forms a support pad;
said etching a second surface of the device wafer further forms a plurality of stationary comb teeth extending from a stationary pad, the stationary pad overlapping the support pad on the first surface of the device wafer; and
the support pad is electrically insulated from the stationary pad by an insulator in the SOI wafer, the support pad asserting physical influence on oscillation of the mirror.

23. The method of claim 1, wherein:
the device wafer comprises a silicon-on-insulator wafer and the support wafer is nonconductive;
said etching a first surface of a device wafer further forms a first frame;
said etching a second surface of the device wafer further forms:
  a second frame coinciding with the first frame on the first surface of the device wafer, the mirror being located within the second frame;
  a plurality of first springs coupling the mirror to the second frame so the mirror can rotate about a first axis; and
the springs (hereafter "the second springs") couples the second frame to the second spring pads so the frame and the mirror can rotate about a second axis.

24. The method of claim 23, wherein:
said etching a first surface of a device wafer further forms:
  first and second beam structures extending along the second axis from opposite sides of the first frame, the first spring pads being located within the first and the second beam structures;
  a plurality of first stationary comb teeth extending from a first stationary pad, the first stationary comb teeth being located on a first side of the second axis; and
  a plurality of second stationary comb teeth extending from a second stationary pad, the second stationary comb teeth being located on a second side of the second axis;
said etching a second surface of the device wafer further forms:
  third and fourth beam structures extending along the second axis from opposite sides of the second frame, the third and the fourth second beam structures coinciding with the first and the second beam structures on the first surface of the device wafer, the second springs connecting the third and the fourth beam structures to the second spring pads for rotating the mirror about the second axis;
  a plurality of first rotating comb teeth extending from the third and the fourth beam structures on the first side of the second axis, the first rotating comb teeth being interdigitated out-of-plane with the first stationary comb teeth for rotating the mirror about the second axis; and
  a plurality of second rotating comb teeth extending from the third and the fourth beam structures on the second side of the second axis, the second rotating comb teeth being interdigitated out-of-plane with the second stationary comb teeth for rotating the mirror about the second axis.

25. The method of claim 24, wherein:
at least one second spring is located between the mirror and another second spring; and
at least one of the second springs and at least one of the second spring pads are located within the third and the fourth beam structures.

26. The method of claim 24, wherein:
said etching a second surface of the device wafer further forms:
  a plurality of third stationary comb teeth extending from a first inner edge of the second frame on a first side of the first axis;
  a plurality of fourth stationary comb teeth extending from a second inner edge of the second frame on a second side of the first axis;
  a plurality of third rotating comb teeth extending from a first outer edge of the mirror on the first side of the first axis, the third rotating comb teeth being interdigitated in-plane with the third stationary comb teeth for rotating the mirror about the first axis; and
  a plurality of fourth rotating comb teeth extending from a second outer edge of the mirror on the second side of the first axis, the fourth rotating comb teeth being interdigitated in-plane with the fourth stationary comb for rotating the mirror about the first axis.

27. The method of claim 26, wherein:
the second frame comprises an inner frame and an outer frame;
the third and the fourth stationary comb teeth extend from two opposing inner edges of the inner frame;
one of the first springs connects the mirror to the outer frame;
the third beam structure is connected to outer frame; and
the fourth beam structure comprises an inner beam portion and two outer beam portions, the inner beam portion being connected to the inner frame and the two outer beam portions being connected to the outer frame.

28. The method of claim 27, wherein:
one second spring connects a distal end of the third beam structure to one second spring pad for receiving a first electrical potential for the first, the second, the third, and the fourth rotating comb teeth;
another second spring connects a distal end of the fourth beam structure to another second spring pad for receiving a second electrical potential for the third and the fourth stationary comb teeth; and
said etching a second surface of the device wafer further forms windows to the first and the second stationary pads for receiving third and fourth electrical potentials to the first and the second stationary comb teeth.

29. The method of claim 26, wherein:
one of the first springs connects the mirror to a spring pad portion of the second frame electrically insulated from remainder of the second frame;
the third beam structure is connected to the second frame; and
the fourth beam structure comprises an inner beam portion and two outer beam portions, the inner beam portion being connected to the spring pad portion and the two outer beam portions being connected to the second frame.

30. The method of claim 29, wherein:
one second spring connects a distal end of the third beam structure to one second spring pad for receiving a first electrical potential for the first and the second rotating comb teeth and the third and the fourth stationary comb teeth;
another second spring connects a distal end of the fourth beam structure to another second spring pad for receiving a second electrical potential for the third and the fourth rotating comb teeth; and said etching a second surface of the device wafer further forms windows to the first and the second stationary pads for receiving third and fourth electrical potentials to the first and the second stationary comb teeth.

31. The method of claim 24, wherein:

the first frame comprises a first half on the first side of the second axis and a second half on the second side of the second axis;

said etching a first surface of the device wafer further forms:
- a plurality of third stationary comb teeth extending from an inner edge of the first half of the first frame;
- a plurality of fourth stationary comb teeth extending from an inner edge of the second half of the first frame;
- a third spring connecting the first half of the first frame to one first spring pad; and
- a fourth spring connecting the second half of the first frame to another first spring pad, the third and the fourth springs being located within the first and the second beam structures.

32. The method of claim 31, wherein:

one of the first springs connects the mirror to a spring pad portion of the second frame electrically insulated from remainder of the second frame;

the third beam structure is connected to the second frame; and the fourth beam structure comprises an inner beam portion and two outer beam portions, the inner beam portion being connected to the spring pad portion and the two outer beam portions being connected to the second frame.

33. The method of claim 32, wherein:

one second spring connects the third beam structure to one second spring pad for receiving a first electrical potential for the first and the second rotating comb teeth;

another second spring connects to the fourth beam structure to another second spring pad for receiving a second electrical potential for the third and the fourth rotating comb teeth;

said etching a second surface of the device wafer further defines first and second windows in the second surface to the first and the second stationary pads for receiving third and fourth electrical potentials to the first and the second stationary comb teeth, respectively; and the third and the fourth beam structures define third and fourth windows to said one first spring pad and said another first spring pad for receiving fifth and sixth electrical potentials for the third and the fourth stationary comb teeth, respectively.

34. The method of claim 33, wherein:

the first springs connect the mirror to the second frame;

the third and the fourth beam structures are connected to the second frame;

one second spring connects a distal end of one of the third and the fourth beam structures to one second spring pad for receiving a first electrical potential for the first, the second, the third, and the fourth rotating comb teeth;

said etching a second surface of the device wafer further defines first and second windows in the second surface to the first and the second stationary pads for receiving second and third electrical potentials to the first and the second stationary comb teeth, respectively; and the third and the fourth beam structures define third and fourth windows to said one first spring pad and said another first spring pad for receiving fourth and fifth electrical potentials for the third and the fourth stationary comb teeth, respectively.

35. The method of claim 28, wherein the first and the second axes are aligned in a same direction.

36. The method of claim 1, wherein the support wafer is transparent.

37. The method of claim 1, further comprising:

forming a hole through the support wafer, wherein said aligning comprises looking through the hole in the support wafer for the features on the first surface of the device wafer.

38. The method of claim 3, prior to said bonding, further comprising:

processing the support wafer to form two substantially rectangular recesses along the length of the support wafer and two mirror cavities near the midsection of the support wafer.

39. The method of claim 3, prior to said bonding, further comprising:

processing the support wafer to form a substantially H-shaped recess and two mirror cavities near the midsection of the support wafer.

40. The method of claim 3, wherein:

said etching a first surface of the device wafer further forms a plurality of stationary comb teeth extending from a support pad, the plurality of stationary comb teeth interdigitated out-of-plane with the plurality of rotating comb teeth; and said etching a second surface of the device wafer further forms a plurality of additional stationary comb teeth extending from the plurality of stationary comb teeth on the first surface of the device wafer, the additional stationary comb teeth being interdigitated in-plane with the rotating comb teeth, the additional stationary comb teeth being thinner than the rotating comb teeth and the stationary comb teeth.

41. A method for forming a MEMS (micro-electro-mechanical system) device, comprising:

etching a first surface of a device wafer to form a plurality of first spring pads;

etching a second surface on the other side of the device wafer to form a mirror, a plurality of second spring pads, a beam structure extending from the mirror, a plurality of springs connecting the beam structure to the second spring pads, and a plurality of rotating comb teeth extending from the beam structure, wherein said etching a second surface comprises directly aligning features on the second surface with features on the first surface.

42. The method of claim 41, further comprising a step selected from the group consisting of:

prior to said etching a second surface, bonding the first surface of the device wafer to a surface of a support wafer; and after said etching a second surface, bonding the first surface of the device wafer to the surface of the support wafer.

43. The method of claim 42, wherein, when the first surface of the device wafer is bonded to the surface of the support wafer after said etching a second surface of the device wafer:

said etching a first surface of a device wafer and said etching a second surface of the device wafer further form a perimeter pad that holds elements in the first support layer and the device layer together; and the method further comprises, after said bonding, etching the second surface of the device wafer to electrically insulate the rotational comb teeth from other elements in the first support layer and the device layer.

* * * * *